US012528680B1

(12) United States Patent
Siedlak et al.

(10) Patent No.: US 12,528,680 B1
(45) Date of Patent: Jan. 20, 2026

(54) PLATFORM APPARATUSES

(71) Applicant: SLIP ROBOTICS INC., Dacula, GA (US)

(72) Inventors: Dennis Jacob Siedlak, Sandy Springs, GA (US); Christopher Rand Smith, Dacula, GA (US); John Martin Jakomin, Lawrenceville, GA (US); Matthew Marcum, Tucker, GA (US); Simon Valbuena, Duluth, GA (US); Joe Petroni, Atlanta, GA (US); William Spencer Waguespack, Atlanta, GA (US); Jeffrey King, Atlanta, GA (US)

(73) Assignee: SLIP ROBOTICS INC., Norcross, GA (US)

( * ) Notice: Subject to any disclaimer, the term of this patent is extended or adjusted under 35 U.S.C. 154(b) by 193 days.

(21) Appl. No.: 18/455,100

(22) Filed: Aug. 24, 2023

Related U.S. Application Data

(60) Provisional application No. 63/400,558, filed on Aug. 24, 2022.

(51) Int. Cl.
| | |
|---|---|
| *B66F 9/06* | (2006.01) |
| *B65G 67/02* | (2006.01) |
| *B66F 9/065* | (2006.01) |
| *B66F 9/07* | (2006.01) |
| *B66F 9/075* | (2006.01) |
| *F15B 13/04* | (2006.01) |
| *F15B 15/10* | (2006.01) |
| *F15B 20/00* | (2006.01) |
| *G05D 1/00* | (2006.01) |
| *G05D 1/02* | (2020.01) |
| *B60B 19/00* | (2006.01) |
| *G01G 19/08* | (2006.01) |

(52) U.S. Cl.
CPC .............. *B66F 9/063* (2013.01); *B65G 67/02* (2013.01); *B66F 9/065* (2013.01); *B66F 9/07559* (2013.01); *F15B 13/0401* (2013.01); *F15B 15/103* (2013.01); *F15B 20/00* (2013.01); *G05D 1/0214* (2013.01); *B60B 19/003* (2013.01); *G01G 19/083* (2013.01)

(58) Field of Classification Search
CPC ...... B66F 9/063; B66F 9/065; B66F 9/07559; B65G 67/02; F15B 13/0401; F15B 15/103; F15B 20/00; G05D 1/0214; B60B 19/003; G01G 19/083
See application file for complete search history.

(56) References Cited

U.S. PATENT DOCUMENTS

2021/0206470 A1\* 7/2021 Braverman ............. B64C 3/185

\* cited by examiner

*Primary Examiner* — Rodney A Butler
(74) *Attorney, Agent, or Firm* — Bradley Arant Boult Cummings LLP; Adam J. Thompson, Esq.; Micah B. Hensley, Esq.

(57) ABSTRACT

A robotic platform apparatus can include a chassis with a front edge, a rear edge, and a top surface. The robotic platform apparatus can include multiple omnidirectional wheels coupled to the chassis. The robotic platform apparatus can include a brake system comprising multiple lifting legs. The lifting legs can be configured to extend until the lifting legs make contact with a surface below the robotic platform apparatus and lift the omnidirectional wheels off the surface. An air bag can expand to extend the lifting legs. The robotic platform apparatus can include a processor configured to control the path of travel and operation of the brake system.

20 Claims, 34 Drawing Sheets

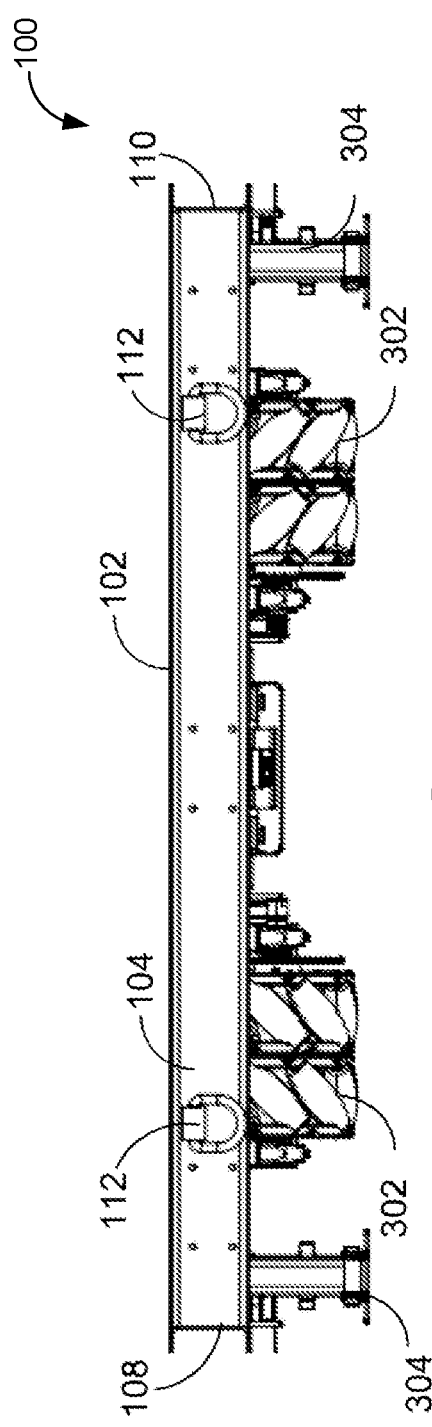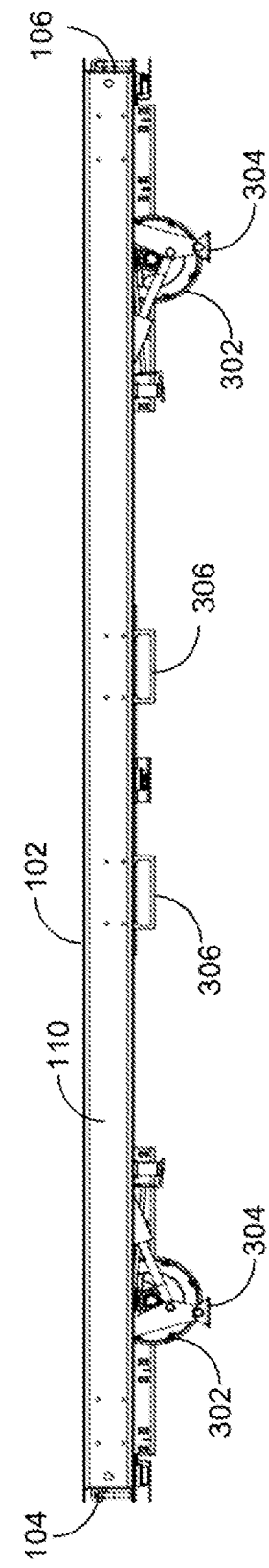

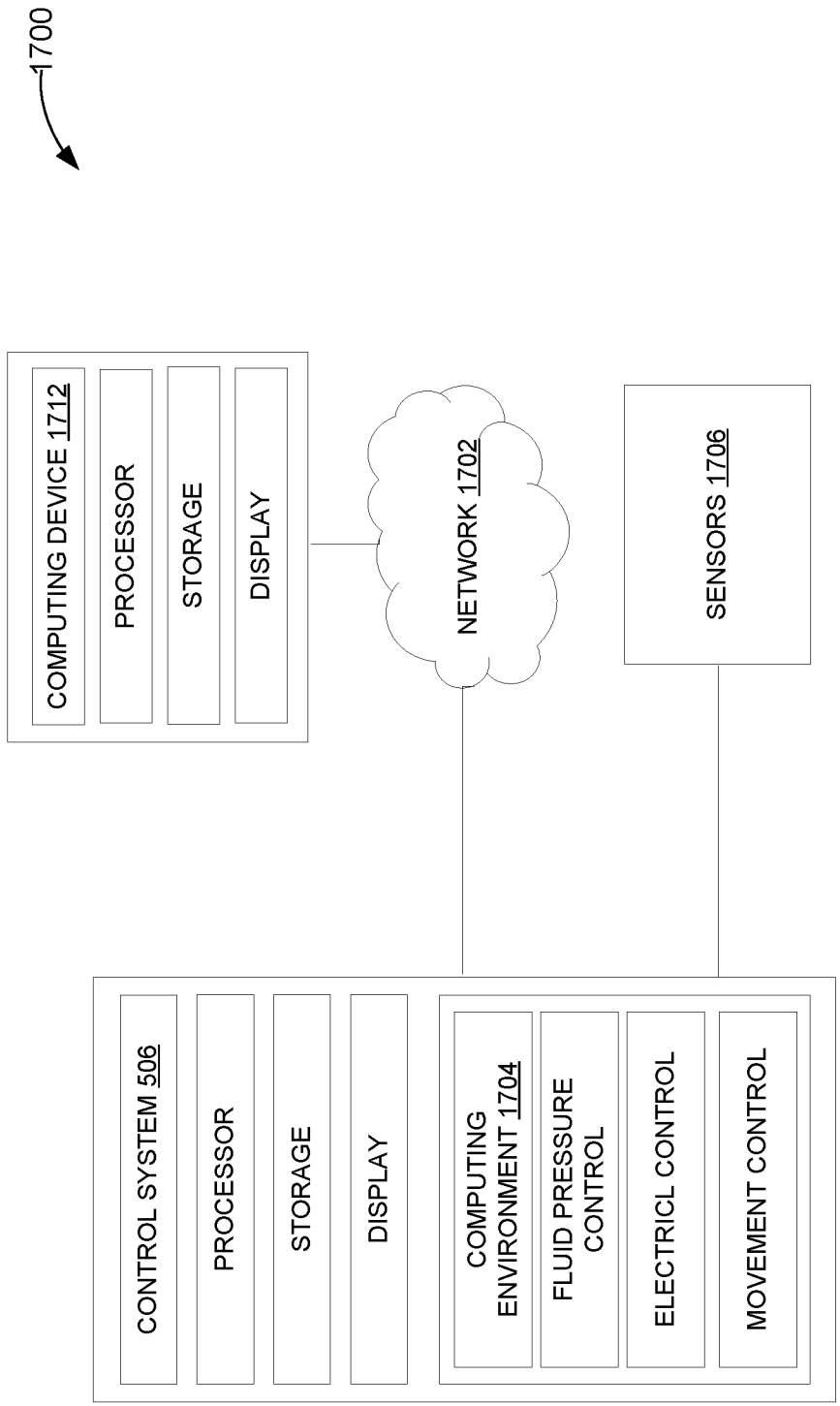

PLATFORM APPARATUSES

CROSS REFERENCE TO RELATED APPLICATIONS

This application claims the benefit of, and priority to, U.S. Provisional Patent App. No. 63/400,558, filed on Aug. 24, 2022, entitled "Platform Apparatuses," the entirety of which is incorporated by reference as if fully set forth herein.

TECHNICAL FIELD

The present devices and apparatuses relate generally to platform-based apparatuses, and more particularly to mechanized platforms for automated loading and unloading of semi-trailers or transporting cargo.

BACKGROUND

Over 40% of trucking routes take less than two hours to drive. In these cases, the time to load and unload the truck, about thirty minutes on each end, becomes a factor in labor cost, truck driver utilization, and route lead time. The total trucking process (e.g., loading product onto a trailer, hauling the trailer to the end destination, and unloading the product) is inefficient in that, ultimately, the product is hauled by the truck for only a small portion of the total transport time, and the majority of the time consists of loading and unloading of the transport cargo into and out of the truck. The loading and unloading times being the majority of the time occurs generally because forklifts must load trucks one pallet at a time. By decreasing the amount of time needed for loading and unloading trailers, the utilization of the trailers in hauling product increases, thus increasing the efficiency of the total trucking process.

Therefore, there is a long-felt but unresolved need for an apparatus or system that improves the ability and efficiency to transport cargo and decreases the loading and unloading processes of a trailer or container at a loading dock.

BRIEF SUMMARY OF THE DISCLOSURE

Briefly described, and according to one embodiment, aspects of the present disclosure generally relate to systems and apparatuses for the utilization of a manual or automated platform to decrease the loading and unloading times for goods into and out of a trailer at a loading dock.

In various embodiments, an automated platform may autonomously move around a site, loading dock, dock leveler, and/or trailer to transport goods. In one or more embodiments, the automated platform may be loaded with goods in various containers, such as pallets, boxes, or free-standing, and, once loaded, navigate a path from a loading area onto a trailer autonomously. In some embodiments, once the automated platform is loaded onto the trailer, the automated platform may utilize a fluid pressure system to extend legs to the ground with enough force so that the automated platform wheels are not touching the ground in the trailer, which stabilizes the automated platform while it is being hauled to a different site. The fluid pressure system can be or include a hydraulics system and/or a pneumatics system. In at least one embodiment, once the trailer is at the different site, the automated platform may autonomously unload itself out of the trailer and navigate over a dock leveler, through the loading dock, and to an unloading area. In one embodiment, the automated platform loading and unloading saves time and labor costs by efficiently and autonomously navigating into and out of the trailer with the goods on the automated platform.

In at least one embodiment, the fluid pressure system of the automated platform can be combined or otherwise in communication with a braking system. In various embodiments, the braking system may facilitate locking the wheels of the automated platform in place to restrict their movement. In some embodiments, the braking system acts similarly to a parking brake. In one or more embodiments, the braking system may act independently from the fluid pressure system. For example, the braking system may engage while the fluid pressure system is disengaged. In another example, the braking system and the fluid pressure system may activate simultaneously to provide maximum stability during transportation and other instances. In another example, the automated platform includes at least one of the braking system or the fluid pressure system (e.g., the braking system with the fluid pressure system omitted or vice versa).

The braking system can include a brake engagement system. In various embodiments, the brake engagement system can be engaged to promote braking of the wheels. In one or more embodiments, the brake engagement system can disengage to promote free movement of the wheels. In at least one embodiment, an electrical control system can manage the engagement and disengagement of the braking system, amongst other capabilities discussed in further detail herein. The brake engagement system can include a brake cable actuation system, which can include one or more cables (e.g., one per wheel of the automated platform). In one or more embodiments, the brake cable actuation system provides and transfers the necessary forces to disengage and/or engage the braking system. That is to say, the brake cable actuation system can provide force to disengage the braking system, or in an alternative configuration, the brake cable actuation system can provide force to engage the braking system. Alternatively or in addition to the brake engagement system and the brake actuation system, the braking system can include a pneumatic braking system. In various embodiments, legs can be fitted on either side or both sides of each wheel on the automated platform. When retracted, the legs may not extend beyond the edge of the wheel. The legs can be extended by a pneumatic system, with air as the working fluid. In various embodiments, the legs can be extended by the expansion of an air bag. The extended legs can lift the wheels out of contact with the ground to, for example, provide stabilization and/or a braking effect. When the air bag is emptied, the legs can be retracted by return springs. Retracting the return springs can return the wheels into contact with the ground.

In certain embodiments, the braking system can be an additional braking system incorporated into the automated platform for increased security during transportation. For example, the automated platform can include a speed reduction braking system and the braking system. Continuing this example, the speed reduction braking system can engage during movement to reduce the speed of the automated platform. Continuing this example, the braking system can be engaged once the automated platform has come to a full stop to restrict further movement of the automated platform.

In certain embodiments, the platform may be mechanized and can be driven via a remote control by an operator. This enables the platform to be moved in any direction or along any path as desired. In other embodiments, the platform may include software intelligence that enables automated and autonomous driving based on a set of provided instructions or parameters. For example, the platform may autonomously move from a loading dock into a shipping or trucking container, avoid any walls or edges of the container via sensors, stop at the front of the container, and then settle itself based on an understanding that the platform is safely within the container.

In multiple embodiments, the automated platform may be sized such that the automated platform, or multiple automated platforms, may fit into a trailer. In one or more embodiments, trailers have standardized lengths and widths, and standardized weight capacities that may limit the size and weight of the automated platform. In particular embodiments, the automated platform may include edge extensions. In various embodiments, the edge extensions are incorporated into the surface of the automated platform. In one or more embodiments, the edge extensions can increase the total surface area of the automated platform. For example, the edge extensions can expand outward from the top surface of the automated platform to accommodate for larger payloads, crates, or any particular object. The edge extensions may extend outwardly from the automated payload to increase the width of the automated platform. In some embodiments, the edge extensions are adjustable to variable lengths. In at least one embodiment, the edge extensions can include bolts that are configured to selectively loosen to allow for changing the total width of the automated platform. In one or more embodiments, the bolts can be tightened to lock the edge extensions into place at the desirable width specified by the specific task.

In at least one embodiment, the automated platform can include modular features. In particular embodiments, the modular features can facilitate adding or subtracting particular parts of the automated platform to optimize its use for specific scenarios. In at least one embodiment, the modular features can include length extensions to vary the length of the automated platform for specific shipping requirements. For example, the automated platform can expand from a 12-foot length to a 16-foot length by adding length extensions to the end of the automated platform.

In some embodiments, the fluid pressure system may push an automated platform in the air so that a second automated platform may fit underneath the raised automated platform. In many embodiments, an automated platform may be stacked on another automated platform for transporting multiple automated platforms in a single trailer or for efficient storage in a warehouse, factory, or similar facility, such that the automated platforms occupy less floor space.

In several embodiments, the automated platform may utilize omni-directional wheels (e.g., mecanum wheels) and/or omni-directional drive (e.g., wheels that can be individually rotated in place) so that the automated platform may more easily navigate through physical spaces. In certain embodiments, the wheels can adjust to vary the track width of the automated platform. In some embodiments, the track width can be defined as the distance between the distal ends of the wheels. In one or more embodiments, the automated platform can adjust the width of its wheels to properly align and traverse through an area of a specific width.

In at least one embodiment, the automated platform utilizes sensors to collect obstacle data that is utilized to avoid obstacles while navigating through the site. In various embodiments, the automated platform includes the electrical control system. The electrical control system may include one or more sensors, communication devices, a movement control system, computer hardware, and hardware interfaces for determining actions associated with the automated platform. In certain embodiments, the sensors incorporated into the electrical control system can include, but are not limited to, a 3D depth camera, a monocular camera, an ultrasonic ranging sensor, a RADAR, a 2D or 3D light detection and ranging (LiDAR) sensor, a range sensor, an inertial measurement unit (IMU), a geolocation receiver or transceiver, a temperature sensor, a pressure sensor, a humidity sensor, a microphone, a gas detection sensor or system, and/or any other desired sensor. In at least one embodiment, the electrical control system can include a weight sensing system. The weight sensing system may determine the total weight of payloads transported by the automated platform. For example, the weight sensing system may measure the total weight of the payload, the center of gravity of the payload, the distribution of the payload across the automated platform, stress exerted on the wheels and other components of the system, downward force produced by the payload, weight shifts during transportation, and any other information associated with the weight of the payload.

In various embodiments, the automated platform(s) and controller(s) at a given site may communicate together to form an ad hoc local mesh network. In at least one embodiment, an automated platform transported to a site may join the ad hoc local mesh network created by the other automated platform(s) and controller(s) already at the site. In other embodiments, each site may have a local mesh network so that an automated platform at a given site can connect to the local mesh network and communicate with other automated platforms and users via controllers. In one or more embodiments, the commands may be sent from the controllers to the automated platform via the ad hoc mesh network using local private Wi-Fi, local public Wi-Fi, cellular network communications, near field communications (e.g., Bluetooth), and/or other similar communication paths. In some embodiments, users may send commands to the automated platform, such as a location to navigate to, through the local mesh network, and the automated platform may communicate with a cloud database or other automated platforms to receive mapping information for the site, speed limits for the site, and other information that the automated platform may utilize to navigate to the location.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 4A illustrates a front view of an exemplary automated platform, according to one embodiment of the present disclosure;

FIG. 4B illustrates a side view of an exemplary automated platform, according to one embodiment of the present disclosure;

FIG. 17 illustrates an example computing architecture, according to one embodiment of the present disclosure.

DETAILED DESCRIPTION

Figure 1:
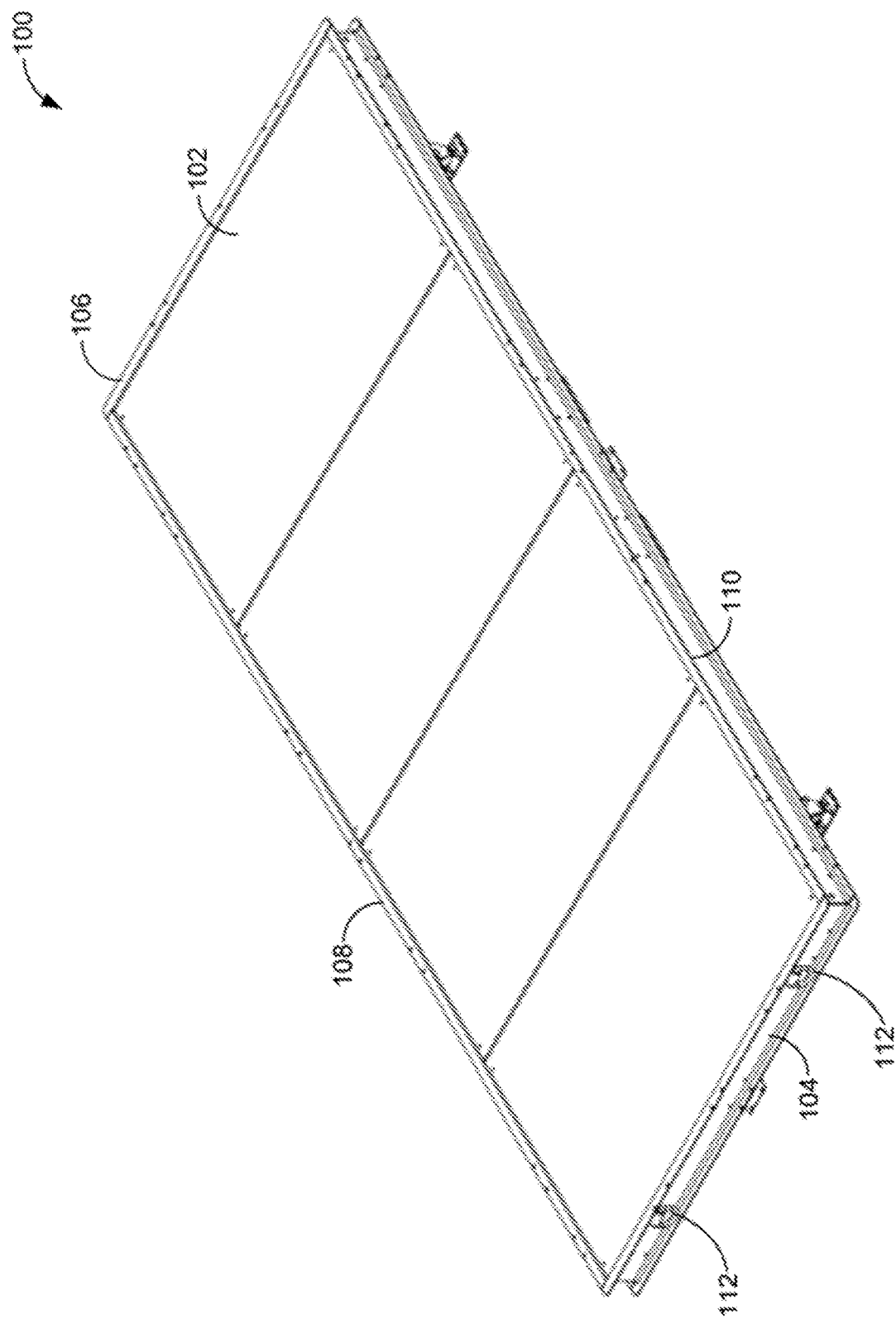
FIG. 1 illustrates a top perspective view of an exemplary automated platform, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Throughout this disclosure, various aspects of the disclosed technology can be presented in a range format (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" or "from approximately 1 to approximately 6" includes the values 1, 6, and all values therebetween. Likewise, a range described as being "between 1 and 6" or "between approximately 1 and approximately 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to and are not intended to imply that the objects so described should be in a given sequence, either temporally, spatially, in ranking, or in any other manner.

Overview

Aspects of the present disclosure generally relate to systems and apparatuses for the utilization of a manual or automated platform to decrease the loading and unloading times for goods into and out of a trailer at a loading dock. In various embodiments, an automated platform may autonomously move around a site, loading dock, dock leveler, and/or trailer to transport goods. In one or more embodiments, the automated platform may be loaded with goods in various containers, such as pallets, boxes, or free-standing, and, once loaded, navigate a path from a loading area onto a trailer autonomously. In some embodiments, once the automated platform is loaded onto the trailer, the automated platform may utilize a fluid pressure system (e.g., hydraulics and/or pneumatics) to extend legs to the ground with enough force so that the automated platform wheels are not touching the ground in the trailer, which stabilizes the automated platform while it is being hauled to a different site. In at least one embodiment, once the trailer is at the different site, the automated platform may autonomously unload itself out of the trailer and navigate over a dock leveler, through the loading dock, and to an unloading area.

In at least one embodiment, the automated platform can include a braking system. The braking system may act as a supplemental braking mechanism to restrict movement in the wheels of the automated platform. For example, the braking system can be substantially similar to a parking brake. In some embodiments, the braking system can be paired with the fluid pressure system to promote stabilization of the automated platform. In at least one embodiment, the automated platform can utilize the fluid pressure system, the braking system, or a combination of the two to secure the automated platform in a fixed location. The braking system may be activated to keep the wheels from rotating. In some embodiments, the braking system can keep the automated platform from moving, rolling, rotating, or performing any particular motion. For example, the braking system can activate to restrict the motion of the automated platform during transportation in a truck, trailer, and/or any particular vehicle. Continuing this example, the braking system can restrict motion of the automated platform caused by forces associated with an abrupt stop of the transportation vehicle, as the gearbox and/or motor of the automated platform may not be able to sufficiently restrict motion of the automated platform (e.g., permitting the automated platform to shift or otherwise move during transportation) or withstand the force (e.g., resulting in damage to the gearbox and/or motor).

In one or more embodiments, the braking system can include a brake engagement system. The brake engagement system can include a pulling cable, a puller fulcrum, a brake plate, an engagement arm, an engagement limit switch, a disengaged limit switch, a sprocket, a movement block, a rigid stopping plate, and a brake cable actuation system. In various embodiments, the automated platform can engage the braking system when in a stopped position. In various embodiments, the brake cable actuation system can engage or disengage the braking system by pushing on or pulling on the pulling cable. In at least one embodiment, the pulling cable can rotate the engagement arm about the puller fulcrum. As the engagement arm moves away from the wheel, the engagement arm may retract the brake plate from the sprocket and disengages the braking system. In various embodiments, as the engagement arm moves towards the wheel, the engagement arm pushes the brake plate into the sprocket and engages the braking system.

In various embodiments, the braking system can be a fluid pressure system. In one or more embodiments, the braking system can include a pneumatic braking system. In various embodiments, the pneumatic braking system can use air as the working fluid. The pneumatic braking system can include lifting legs. Legs can be fitted on either side or both side of each wheel or each pair of wheels on the automated platform. In various embodiments, when retracted, the legs do not extend beyond the edge of the wheel rim. For example, the wheel rim can include a hub to which rollers attach (e.g., if the wheel is a mecanum wheel), and the rollers can extend past the edge of the wheel rim (e.g., the rollers can extend in a radially-outward direction relative to the hub's center). When retracted, the bottom of the legs (e.g., the feet) can be a distance from the ground that is less than or equal to the radius of the wheel rim. For example, when retracted, the bottom of the legs (e.g., the feet) can be positioned 6 inches or less (e.g., between 2 inches and 6 inches) from the surface below the automated platform. Thus, when retracted, the legs may not impact or decrease the approach angle (e.g., the maximum slope the automated platform may traverse onto). In other words, the wheels and automated platform can navigate over terrain with or without the extendable legs attached to the platform. In various embodiments, the legs can be positioned symmetrically on the automated platform.

In various embodiments, the legs can include a rubber foot. In at least one embodiment, the foot can extend from the retracted position to the extended position to lift the wheels of the platform off of the ground. For example, the vertical distance traveled by the foot when moving between the extending and retracted positions of the leg can be between approximately 0.3 inches and approximately 1 inch. The feet can have a large surface area to prevent the automated platform from slipping when the legs are extended (e.g., a surface area large enough to prevent slipping or shearing). For example, each foot can have a surface area of approximately 0.16 square inches to approximately 7 square inches. The rubber foot can have a Shore A hardness (e.g., durometer rating) between approximately 40 A and approximately 100 A.

In one or more embodiments, the pneumatic braking system can include a lifting assembly. The lifting assembly can include one or more air bags (e.g., one air bag per leg). In various embodiments, the air bags can be filled and expanded to extend the legs. That is to say, for example, that by expanding, the air bags can push against the leg and the chassis of the automated platform to thereby move the leg away from the chassis. The legs can be hingedly connected to the chassis of the automated platform (e.g., such that the legs pivot downward to the extended position and pivot upward to the retracted position). Alternatively, the legs can be slideably connected to the chassis of the automated platform (e.g., such that the legs slide downward in a generally vertical direction to the extended position and slide upward in a generally vertical direction to the retracted position). When the legs are extended, the legs can make contact with a surface below the automated platform (e.g., the surface that the wheels are resting on, such as a floor or the ground) and lift the wheels off of the surface. In various embodiments, the air bags can have a 1:2 to 1:7 times mechanical advantage while extending the legs. Once the air bag is de-pressurized and the air is released to the environment or a collection tank, the legs can be retracted. The legs can include springs. The springs can stretch when the legs are retracted. Once the air bag is de-pressurized, the tension force of the springs can return the legs back to a retracted position (e.g., in the retracted position, the legs do not extend beyond the outer edge of the wheels). Alternatively or in addition, the pneumatic assembly can include pistons to extend the legs (e.g., slideable legs discussed above). In one or more embodiments, the structure of the lifting mechanism does not extend the track width of the automated platform.

Each wheel can have a lifting assembly, which can include the lifting leg and the air bag. The lifting assembly can include an air line and a valve (e.g., a solenoid valve) in fluid communication with a central pneumatic control system. The central pneumatic control system can include an air tank and a compressor fluidly connected to each valve in the lifting assemblies. Since each wheel can have a separate air bag, air line, and valve, a leak in one lifting assembly may not affect the other lifting assemblies on the automated platform. Since each wheel can have a separate lifting assembly (e.g., air bag, air line, and valve), the pneumatic system can control each lifting assembly, including the air bags, individually. In various embodiments, each lifting assembly can include an emergency release valve. The emergency release valves can be accessible from the front and back of the automated platform. In at least one embodiment, the release valves can be used to de-pressure all the air bags and allow for the automated platform to be towed in the event of a failure or accident. In various embodiments, the air bags and the air tank can be shielded by blocker plates to prevent puncture.

The air bags can be filled individually or all at once. In at least one embodiment, the central pneumatic control system can control the flow of air to the air bags. In various embodiments, the central pneumatic control system can include a high flow valve (e.g., high flow solenoid). The high flow valve can fill all of the air bags simultaneously. For example, the high flow valve can fill all of the air bags with air from the tank or a compressor. In at least one embodiment, the central pneumatic control system can include a manifold, which can direct the working fluid to each solenoid in each lifting assembly. The central pneumatic control system (or the individual airlines for each air bag) can include a one way valve to prevent the flow of working fluid back into the tank. According to various embodiments, the appropriate valves or combination of valves can achieve a flow coefficient of more than approximately 0.2 gallons per minute divided by the square root of the difference in pressure. According to various embodiments, the appropriate valves or combination of valves can prevent working fluid from flowing from the tank to the manifold or from the manifold to the tank when the pressure difference is less than approximately 200 PSI.

The central pneumatic control system can monitor the pressure in the tank and in each air bag. If the pressure in an air bag falls below a threshold (when the corresponding leg is in, or transitioning to, the extending position), the valve to the air bag can be opened and the compressor can refill the bag. In various embodiments, the tank can refill the air bags. If the pressure in the tank falls below a threshold, the compressor can be used to fill the air bags. In some embodiments, the compressor will refill the tank when the automated platform is stationary. The central pneumatic control system can communicate with the electrical control system and/or movement control system (e.g., to receive operational instructions from the electrical control system or movement control system).

In certain embodiments, the platform may be mechanized and can be driven via a remote control by an operator. This enables the platform to be moved in any direction or along any path as desired. In other embodiments, the platform may include software intelligence that enables automated and autonomous driving based on a set of provided instructions or parameters. For example, the platform may autonomously move from a loading dock into a shipping or trucking container, avoid any walls or edges of the container via sensors, stop at the front of the container, and then settle itself based on an understanding that the container is safely within the container.

In one or more embodiments, if two sites are sufficiently close, the automated platform may transport goods from one site to the other site by moving between sites (e.g., does not get loaded onto a trailer).

In multiple embodiments, the automated platform may be sized such that the automated platform, or multiple automated platforms (e.g., two automated platforms arranged side by side across the width of a trailer), may fit into a trailer. In one or more embodiments, trailers have standardized lengths and widths, and standardized weight capacities that may limit the size and weight of the automated platform. In one or more embodiments, the automated platform includes edge extensions and/or modular features. With the edge extensions attached to the automated platform, the width of the automated platform can be between approximately 80 inches (e.g., to accommodate two 40 inch wide pallets) to approximately 99 inches (e.g., such that the automated platform can fit within a standard 53 foot trailer), as non-limiting example. The automated platform may include a modular chassis that facilitates removing or adding particular components (e.g., one or more width extensions, one or more length extensions) to the automated platform for optimizing its use in particular scenarios. In certain embodiments, the edge extensions can extend from the top surface of the automated platform to increase the width of the automated platform. For example, the edge extensions can preside within and/or on top of the automated platform. Continuing this example, the edge extensions can be attached to the automated platform via a plurality of bolts. Continuing this example, the bolts can be tightened to secure, or loosened to unsecure, the edge extensions to, or from, the automated platform. Further continuing this example, in an unsecured position, the edge extensions can be placed at a desired position to increase the width of the automated platform. Further continuing this example, once the desired position is selected, the bolts can be fastened or tightened to secure the edge extensions and set the desired width of the automated platform. The edge extension may be completely removed to reduce the weight and/or size of the automated platform. In at least one embodiment, the modular features can include length extensions to vary the length of the automated platform for specific shipping requirements. For example, the automated platform can expand from a 12-foot length to a 16-foot length by adding length extensions to the end of the automated platform. Notably, the disclosed technology is not limited to these example dimensions, as various other lengths (and widths) are contemplated. In some embodiments, the hydraulic system may push an automated platform in the air so that a second automated platform may fit underneath the raised automated platform.

The edge extensions can be fully adjustable with a straight slot to attach to the automated platform. The edge extensions can include castellations to provide more rigid, fixed positions for the edge extension on the automated platform. The edge extensions can include chamfers on the corners to help the automated platform when entering or exiting a trailer. For example, the chamfers can allow for glancing contact between the automated platform and the trailer doors. For example, the chamfers can allow for the automated platform to slide past the trailer door. In some embodiments, the edge extensions have a coefficient of friction between approximately 0.29 and approximately 1. An edge extension can be located along each side of the automated platform. The edge extensions can secure to the automated platform via the same attachment points used to secure the payload, as a non-limiting example. The edge extensions can secure to the automated platform via bolts. The bolts can be located on the edge extension such that not all bolts need to be removed to slide or rotate the edge extension out of the way to access the automated platform.

In some embodiments, the automated platform with the edge extensions can have a length between approximately 200 and approximately 212 inches. With edge extensions, the automated platform can fit ten 40 inch by 48 inch pallets. With edge extensions, three automated platforms can fit inside a standard 53 foot trailer.

Lips or other retaining features can be included around the edge of the chassis or edge extensions. The lips or other retaining features can help prevent cargo from sliding off of the automated platform while loading, unloading, or transport. The lips features can be a continuous lip around the edge of the automated platform low enough that a forklift can move a payload onto the automated platform. Alternatively or in addition, the lip can have breaks at strategic positions such that forks can avoid the lips while moving payloads onto the automated platform.

The edge of the chassis or the edge extensions can couple with an E-track for securing a payload to the automated platform. The edge of the chassis or the edge extensions can include cutouts or bolt holes for securing common E-track receivers. In several embodiments, the automated platform may utilize omni-directional wheels so that the automated platform may more easily navigate through physical spaces. In one or more embodiments, the width of the wheel base (e.g., in width direction, in length direction) can be adjusted to optimize the transportation of the automated platform. For example, the automated platform can reduce the distance between opposite wheels to allow the wheels to roll on thinner platforms. In some embodiments, the automated platform can reduce the distance between two oppositely placed wheels to fit on a ramp of 5 feet. For example, one or more of the wheels can be connected to the chassis via a rail system that permits the wheels to be selectively moved among a plurality of locations in the width direction and/or length direction (i.e., relative the automated platform). In at least one embodiment, the automated platform utilizes sensors to collect obstacle data that is utilized to avoid obstacles while navigating through the site. In various embodiments, the automated platform includes the electrical control system. The electrical control system may include, or be in electrical communication with, one or more sensors, communication devices, a movement control system, computer hardware, and/or hardware interfaces for determining actions associated with the automated platform. In certain embodiments, the sensors incorporated into the electrical control system can include, but are not limited to, a 3D depth camera, a LiDAR sensor, a range sensor, an IMU, a geolocation receiver or transceiver, a temperature sensor, a pressure sensor, a humidity sensor, a microphone, and/or a gas detection sensor. In at least one embodiment, the electrical control system can include a weight sensing system. The weight sensing system may determine the total weight of payloads transported by the automated platform. For example, the weight sensing system may measure the total weight of the payload, the center of gravity of the payload, the distribution of the payload across the automated platform, stress exerted on the wheels and other components of the system, downward force produced by the payload, weight shifts during transportation, and any other information associated with the weight of the payload.

In various embodiments, each site may have a local mesh network so that an automated platform at a given site can connect to the local mesh network and communicate with other automated platforms and users via controllers. In some embodiments, users may send commands to the automated platform, such as a location to navigate to, through the local mesh network, and the automated platform may communicate with a cloud database or other automated platforms to receive mapping information for the site, speed limits for the site, and other information that the automated platform may utilize to navigate to the location. In at least one embodiment, the automated platform may utilize data received from the sensors to create the mapping information. In one or more embodiments, a first automated platform at a site may share created mapping information with a second automated platform at the given site, such that the second automated platforms may combine the created mapping information received from the first automated platform with mapping information created by the second automated platform to create a composite map of the given site (e.g., a map or map data including information from the first automated platform and the second automated platform). In many embodiments, the automated platforms at a given site may update the map of the given site by receiving updated mapping information from the sensors. In one embodiment, the automated platform may also send the mapping information and/or map to a controller node such that the map can be shared over the local mesh network. In several embodiments, the mapping information may include metadata including specific site location information, such as, but not limited to, dock numbers, loading area numbers, and other specific site location information to support autonomous movement of the automated platform.

Exemplary Embodiments

Referring now to the figures, for the purposes of example and explanation of the fundamental processes and components of the disclosed systems and methods, reference is made to FIG. 1, which illustrates an exemplary, high-level overview of one embodiment of the automated platform 100. As will be understood and appreciated, the exemplary, high-level overview shown in FIG. 1 represents merely one approach or embodiment of the present system, and other aspects are used according to various embodiments of the present system.

As shown in FIG. 1, a top perspective view of an exemplary automated platform 100 is shown, according to one embodiment of the present disclosure. In various embodiments, the automated platform 100 may receive and transport goods into and out of a trailer at a loading dock. The platform may also be used to move goods around in a warehouse, or between warehouses or buildings, particularly where only short distances are required. In some embodiments, the goods may be in boxes, on pallets, and/or in other packaging, or may not be in or on packaging. In many embodiments, the automated platform 100 includes a top surface 102 for receiving and transporting the goods, a bottom surface 502 (see FIG. 5), a front side 104, a back side 106, and sides 108 and 110. In at least one embodiment, the automated platform 100 may also include one or more motors for operating one or more wheel modules 302, an electrical control system, a battery for powering the one or more motors and communication module, a plurality of sensors to detect ambient conditions and enable certain automated functionality, and a hydraulics module.

In multiple embodiments, the automated platform 100 may be constructed of one or more materials that allow the automated platform 100 to hold the maximum weight capacity of a trailer (e.g., 40,000 pounds, 44,000 pounds, 48,000 pounds, etc.). In some embodiments, if two or more automated platforms 100 are loaded into a trailer, the combined weight capacity of the two or more automated platforms 100 may hold the maximum weight capacity of the trailer. In one or more embodiments, the top surface 102 may support the weight capacity and provide sufficient friction to keep the goods in place throughout the loading/hauling/unloading processes. In at least one embodiment, the top surface 102 may be wood (e.g., plywood), aluminum, steel, or other similar materials. In one embodiment, the top surface 102 may include a high friction paint painted onto the surface of the top surface 102, or may include some other frictional material, such as rubber, cork, etc. In at least one embodiment, the front side 104, back side 106, and sides 108 and 110 may fixedly connect to the top surface 102 via connection elements (e.g., bolts, nails, screws, etc.). In some embodiments, the front side 104, back side 106, and sides 108 and 110 may be made of steel (e.g., C-channel steel) or other materials that can support the weight of the goods. In a certain embodiments, the front side 104, back side 106, and sides 108 and 110 may include bumpers to protect the automated platform 100 from damage in the case of a collision with the automated platform 100 (e.g., a forklift driving into the automated platform 100) by absorbing the contact of the collision. In one or more embodiments, the front side 104, back side 106, and sides 108 and 110 may include attachment points 112, such as, but not limited to, towing rings, fasteners, D-rings, handles, and other similar features, for further securing the goods to the automated platform 100 or attaching additional components to the automated platform 100. As described herein, the front side 104, back side 106, and opposing sides 108 and 110 may collectively be referred to as the "perimeter surface" of the platform. In certain embodiments, the perimeter surface acts as a skirt that extends downwardly from the top surface 102 to add rigidity to the platform and also to act as a protective shield for internal components of the platform.

In certain embodiments, a standard trailer may carry cargo of up to 50,000 pounds. In some embodiments, if multiple automated platforms fit inside a trailer for hauling, then the weight capacity of each of the multiple automated platforms 100 may be generally equal to the maximum weight capacity of the trailer divided by the number of multiple automated platforms 100. For example, in one embodiment, if three automated platforms 100 are loaded inside a trailer, and the trailer has a maximum weight capacity of 48,000 pounds, then each of the automated platforms 100 may have a weight capacity of 16,000 pounds. In other embodiments, the automated platform 100 may have a larger weight capacity than the weight capacity of a standard trailer if the automated platform 100 is used to only move goods around in a warehouse, or between warehouses or buildings (e.g., the automated platform 100 is not loaded onto a trailer).

In several embodiments, the automated platform 100 also includes an electrical control system to facilitate the movement of the automated platform 100. In one or more embodiments, the electrical control system may include one or more sensors, communication devices, a movement control system, computer hardware, and hardware interfaces. In some embodiments, the electrical control system may be IoT-enabled to communicate via Bluetooth, near-field communications, LTE/cellular/5G communications, and/or other similar communication methods.

In various embodiments, the one or more sensors may provide navigation data, safety sensing, weight and payload information, and additional monitoring data. In one or more embodiments, the one or more sensors may collect sensor data and send the sensor data to the movement control system via a local ad hoc mesh network or other network communication system (e.g., IoT system, Wi-Fi, etc.). In at least one embodiment, the one or more sensors may include one or more obstacle detection sensors 504 (see FIG. 5), such as, but not limited to, 2D or 3D light detection and ranging (LiDAR) sensors, ultrasonic ranging sensors, monocular cameras, three-dimensional (3D) cameras, infrared (IR) sensors, global positioning system (GPS) unit, one or more environmental sensors, temperature sensors, voltage sensors, current sensors, pressure sensors, and/or other similar sensors. In at least one embodiment, the electrical control system can include other sensors, such as a range sensor, a humidity sensor, a microphone, a gas detection sensor or system, and any other applicable sensors. In some embodiments, the voltage sensors and current sensors may detect whether the automated platform 100 is charging, and if so, the voltage sensors and current sensors may not allow the automated platform to move. In certain embodiments, the voltage sensors may also measure the battery voltage and send a signal to the automated platform 100 and/or controller to communicate when the automated platform 100 should be charged.

In particular embodiments, the electrical control system can employ sensors to measure onboard systems and surroundings of the automated platform 100. For example, the gas detection system can employ electrochemical gas sensors to measure the quantity of particular gases in a trailer. Continuing this example, the automated platform 100 can constantly monitor for leaks in payloads carrying gas products using the gas detection system. In one or more embodiments, the electrical control system can perform actions based on the recorded data from the sensors in real time. For example, the electrical control system can send an alert to the driver, a related distribution company, and/or any other recipient that a refrigerated payload has exceeded a threshold temperature as measured through the temperature sensors of the automated platform 100. In another example, the pressure sensors of the automated platform 100 can measure if the cabin of an aircraft transportation vehicle has depressurized before, during, and/or after a flight. The pressure sensors of the electrical control system may measure pressure applied to the automated platform 100 or to a specific portion or area of the automated platform. For example, if an excess pressure is applied to the automated platform 100, the electrical control system may send an exceeded pressure warning to the driver and/or other recipient (e.g., the distribution company managing the automated platform 100) or if the measured pressure at two or more locations on the automated platform 100 exceeds a threshold difference, which can be indicative of the load of the automated platform 100 being uneven or lopsided. The humidity sensors of the automated platform 100 may measure the total humidity present in the transportation vehicle. In particular embodiments, the electrical control system can send an alert to the driver and/or the distribution company that the humidity of the transportation vehicle exceeds a certain threshold humidity. For example, the electrical control system can send a repair request when the salinity levels and/or the humidity levels exceed a threshold to safeguard the automated platform 100 and any particular payload against corrosion, oxidation, and/or other defects associated with high levels of salinity and/or humidity. The electrical control system can employ microphones installed on the automated platform 100 to determine transportation specific issues. For example, the electrical control system can analyze sounds measured through the microphones to determine excess movement of payloads, improper payload securing, reckless driving, reckless payload management, and/or any other particular event associated with the automated platform 100 (e.g., handling and/or transportation of the payload of the automated platform 100).

In many embodiments, the navigation data may be provided to the electrical control system by the obstacle detection sensors 504, such as, but not limited to, LiDAR sensors, 3D cameras, and/or IR sensors. In at least one embodiment, the LiDAR sensors may sense one or more obstacles in or near a traveling path of the automated platform 100 (e.g., the walls of the trailer while autonomously navigating inside the trailer), collect data from sensing the one or more obstacles, and send the data to the movement control system. In some embodiments, the LiDAR sensors may be mounted in the middle of the front side 104, back side 106, and sides 108 and 110. In certain embodiments, the LiDAR sensors are inset slightly for protection and a better field of view. In one or more embodiments, the 3D cameras may be mounted on the front side 104, the back side 106, and/or the sides 108 and 110 of the automated platform 100. In one embodiment, the 3D cameras may observe the ground around the automated platform 100 to ensure the ground is drivable, and may also to log video recordings of all automated platform 100 motion for future analysis or machine learning algorithm development. In certain embodiments, the one or more LiDAR sensors may collect information associated with movement of payloads and/or the automated platform 100 during transportation. For example, the one or more LiDAR sensors can collect payload movements during transportation. Continuing this example, the electrical control system can analyze the collected LiDAR sensor data to determine if the payload is properly secured, driving activities of the transportation vehicle, loading and unloading procedures of the payloads, and/or any other activity associated with the movement of payloads on the automated platforms 100. Continuing this example, the electrical control system can produce a report in real-time describing particular care characteristics of the transportation company, transportation route, and/or any metrics for measuring the transportation quality of the payloads and/or the automated platform 100. In particular embodiments, the electrical control system can produce quality scores associated with historical data collected form the LiDAR sensors and other onboard sensors. For example, the electrical control system can determine a route quality score based on historical data of a route. Data for calculating route quality scores can include, but are not limited to, road conditions, number of turns, average speed during transportation, number of traffic lights and/or stops, average traffic time, average route time total, and number of speed bumps encountered. In various embodiments, the one or more LiDAR sensors can detect changes to the transportation vehicle. For example, the one or more LiDAR sensors can detect accidents, unexpected door openings, and other particular movements. In some embodiments, the cameras can take a photo or video before, during, and after transportation. For example, if the automated platform 100 is transported in a trailer, the cameras can take a photo or video when the trailer door is opened.

In several embodiments, the LiDAR sensors and 3D cameras may generate one or more point clouds from the collected data that is utilized to detect obstacles and communicate the locations of the obstacles to the controller and/or the automated platform 100. In at least one embodiment, the 3D cameras may provide additional navigation information via stereoscopic video frames and/or an infrared (IR) point cloud. In some embodiments, the collected data and/or point cloud may be utilized to identify obstacles at the movement control system and/or computer hardware of the automated platform 100. In particular embodiments, the LiDAR sensors and 3D cameras can detect and record payload unloading, door openings, payload loading procedures, and payload tampering. In certain embodiments, the electrical control system can create reports on quality control metrics based on the data collected from the LiDAR sensors and 3D cameras. In one or more embodiments, the automated platform 100 may utilize the collected data and/or one or more point clouds to identify the trailer and/or trailer door, and create commands for the automated platform to move into the trailer. In one embodiment, machine learning algorithms may also be utilized by the automated platform 100 to determine additional information about the obstacles detected by the LiDAR sensors and 3D cameras, such as, but not limited to, whether the obstacles are humans, static, etc., and also may read written information on obstacles, such as, but not limited to, tags on pallets containing pallet information, dock numbers, warehouse information, etc.

In various embodiments, the LiDAR sensors and 3D cameras may also provide safety sensing for electrical control system. In one or more embodiments, the LiDAR data is utilized by the electrical control system to autonomously navigate into the trailer and also stop the automated platform 100 if the automated platform gets too close to an obstacle (e.g., wall, person laying down, box, etc.). In some embodiments, the LiDAR sensors may be mounted about 4 to 12 inches off of the ground so that the LiDAR sensors can identify a person in the prone position while not reducing the ground clearance of the automated platform 100. In many embodiments, additional one or more LiDAR sensors and/or IR sensors may also be located on the front side 104, the back side 106, and/or the sides 108 and 110 of the automated platform 100 to further detect obstacles. In one embodiment, if the sensors detect an obstacle, the automated platform 100 may not drive into the obstacle, as part of the safety measures of the automated platform.

In multiple embodiments, the weight and payload information may be provided by the environmental sensors. In some embodiments, the environmental sensors may include GPS sensor(s), temperature sensor(s), pressure sensor(s), humidity sensor(s), inertial measurement unit (IMU) to acceleration sensor(s), and/or weight sensor(s). In one or more embodiments, each of the GPS sensors, temperature sensors, pressure sensors, humidity sensors, inertial measurement unit (IMU) to acceleration sensor, and/or weight sensor may provide insight into the automated platform 100 transit usage and conditions. In at least one embodiment, the electrical control system may include payload and transport condition requirements (e.g., temperature requirements inside the trailer, weight of the goods on the automated platform 100), and the environmental sensors may collect data that validates that the payload and transport condition requirements were maintained throughout the loading/hauling/unloading process. In one embodiment, the GPS sensors may determine some transport conditions, such as the time the automated platform 100 transported the payload, whether the transportation of the payload stayed on schedule, the path the automated platform 100 traveled, etc. In one or more embodiments, the IMU and GPS sensors can determine excessive vibrations, poor driving, and other movements associated with the automated platform 100.

In several embodiments, the movement control system controls the automated platform 100 and communicates with the one or more sensors and communication devices. In one or more embodiments, the movement control system may receive data from the one or more sensors and control the movement of the automated platform 100 based on the received data. In at least one embodiment, the movement control system may include a computer operating a robotic operating system (ROS) software application, and a microcontroller (e.g., Arduino microcontroller) that controls hardware interfaces and sensor handling. In one or more embodiments, the ROS may plan a path for the automated platform 100 to travel that avoids obstacles and reaches a destination. In certain embodiments, the one or more sensors monitor the travel information of the automated platform 100 (e.g., location, speed, acceleration) as the automated platform 100 travels along the path, and send the travel information to the ROS system, which utilizes the travel information to recalculate wheel speeds to maintain the automated platform on the path. In some embodiments, the movement control system is connected to a cloud server via IoT communications (e.g., a MQTT IoT bridge). In one embodiment, the movement control system receives and sends commands from a local controller through a mesh network module (e.g., a ZigBee module), which may be supplemented by a LAN connection that can act as a backup to the mesh network. In at least one embodiment, the microcontroller may receive the wheel speed information from the ROS system and utilized a control system 506 (e.g., sensors to measure the actual wheel speed) to compute the actual wheel speeds. In certain embodiments, the microcontroller may utilize the actual wheel speeds and a control algorithm to determine an amount of power from a motor to align the actual wheel speed with the recalculated wheel speeds. In one embodiment, the microcontroller may also utilize additional information, such as, but not limited to, payload weight, weather information, etc., to adjust the power input to the wheels to better align the actual wheel speeds to the recalculated wheel speeds.

In multiple embodiments, the movement control system may include artificial intelligence/machine learning algorithms such that the automated platform 100 may be fully autonomous. In some embodiments, the automated platform 100 may autonomously navigate a loading dock, docking location, storage area, dock leveler, trailer, and/or other areas of a site to which the automated platform 100 may be commanded to travel. In one or more embodiments, the machine learning algorithms may include a system to detect the trailer and/or trailer door based on the distance between the side walls of the trailer. In many embodiments, the automated platform 100 may also capture sensor data from each of the one or more sensors while the automated platform 100 is moving, and the captured data may be a training set for a machine learning perception system. In at least one embodiment, the machine learning perception system may be trained to detect a position and width of a dock leveler, determine an importance level for detected obstacles (e.g., detect that an obstacle is a human and give the human obstacle a high importance level rating so that the automated platform 100 does not hit or move near the human obstacle), and/or detect undrivable surfaces (e.g., rough surfaces, debris on surface, etc.).

In several embodiments, each automated platform 100 may include a mesh network module that is designed to interact with industrial mesh networks via network nodes. In at least one embodiment, each docking location may include an ad hoc local mesh network to which the mesh network module connects when the automated platform 100 arrives to the docking location. In many embodiments, the mesh network module may also include an LTE connection to facilitate authentication between network nodes through a cloud provider. In one or more embodiments, once a mesh network module on a newly arrived automated platform 100 connects to the ad hoc local mesh network at the docking location, the newly arrived automated platform 100 can be commanded from a manual remote controller that is also connected to the local mesh network, an on-site autonomous controller, or a cloud-based orchestrator. In certain embodiments, the automated platforms 100 that are on the same local ad hoc mesh network may share information about the current docking location (e.g., map of docking location, speed limits, Wi-Fi passwords, etc.) through the ad hoc network.

In various embodiments, the automated platform 100 may include a scannable code (e.g., a QR code, RFID, or bar code). In some embodiments, a user with a remote controller may scan the scannable code on the automated platform 100 with the remote controller to connect the remote controller to the automated platform 100. In many embodiments, upon scanning the scannable code with the remote controller, the remote controller connects to the automated platform 100 via a mesh network address for the automated platform 100. In certain embodiments, once connected, the remote controller and automated platform 100 may exchange commands, information, E-stop status, and heartbeat messages to maintain safe control of the automated platform 100. In at least one embodiment, the remote controller may utilize one or more dead-man switches to maintain the automated platform 100 in a non-estopped state. For example, in one embodiment, the one or more of the dead-man switches may be held down before the user is able to cause the automated platform 100 to move, and if the user stops holding down the one or more dead-man switches, the automated platform 100 may automatically stop moving. In one or more embodiments, an E-stop command may be built into the mesh network or software so that any failure on either the remote controller's or automated platform's CPU will not result in a loss of safety. In many embodiments, the E-stop status is the current status of the E-stop command.

In multiple embodiments, the automated platform 100 may be designed to move in formation in relation to other automated platforms 100. For example, in one embodiment, if three automated platforms 100 arrive to a docking location, a user may scan the scannable code on a first automated platform 100 (e.g., the automated platform 100 nearest to the trailer door) to connect the firsts automated platform with the local ad hoc mesh network. Continuing with the example, in at least one embodiment, once all automated platforms 100 in the trailer are connected to the local ad hoc mesh network, each automated platform 100 may understand the location of the automated platform (e.g., the position relative to the other automated platforms 100 in the trailer) using the 3D cameras, scannable codes, and/or RFID readers or tags to identify the immediately neighboring automated platforms 100. Still continuing with the example, in some embodiments, once the automated platforms 100 know the positioning of each automated platform 100 in the trailer, the automated platforms 100 may autonomously coordinate the unloading process (e.g., navigating each automated platform 100 off of the trailer).

In several embodiments, the automated platform 100 may also include a GPS unit so that the location of the automated platform 100 can be tracked and managed. In some embodiments, the GPS unit may send location information to a system user, so that the system user may know, in real time, the location of the automated platform 100. In at least one embodiment, the system user may know the location of every automated platform 100 in circulation, whether or not each automated platform 100 is in transit or in a facility.

Figure 2:
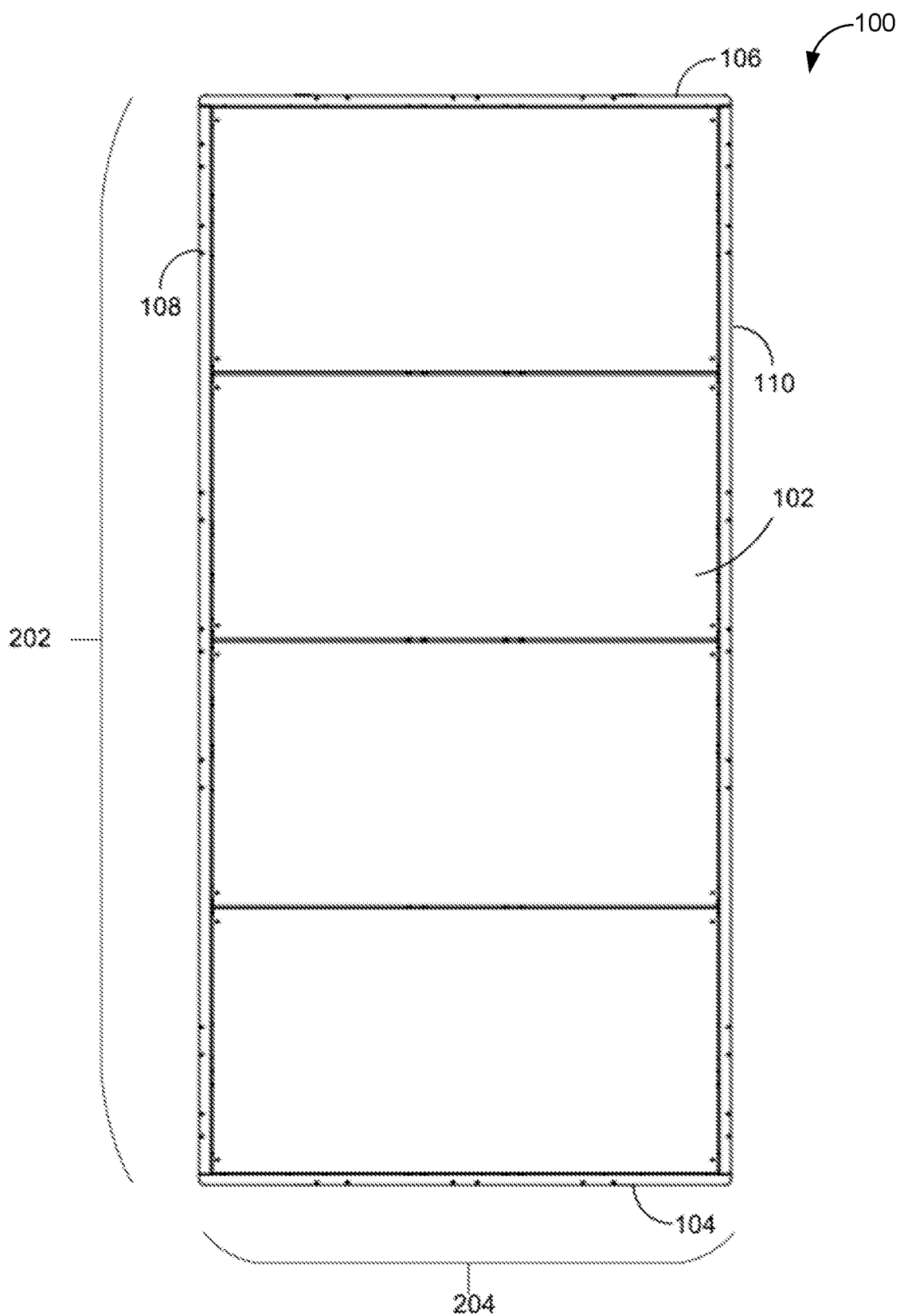
FIG. 2 illustrates a top view of an exemplary automated platform, according to one embodiment of the present disclosure.

As shown in FIG. 2, a top view of an exemplary automated platform 100 is shown, according to one embodiment of the present disclosure. In multiple embodiments, the front side 104, the back side 106, and the sides 108 and 110 may connect so that the automated platform is a quadrilateral shape. In one embodiment, the quadrilateral shape may be a rectangle. In other embodiments, the platform may have any shape suitable for desired end use cases, including triangles, circles, or other polygons. In some embodiments, the automated platform 100 may have a length 202 and a width 204 so that the automated platform 100 fits inside a trailer. In at least one embodiment, the length 202 (e.g., the length of the sides 108 and 110) may be between four and forty-eight feet (e.g., 4 feet, 8 feet, 16 feet, 25 feet, 40 feet, etc.). In one or more embodiments, the width 204 (e.g., the length of the front side 104 and the back side 106) may be between 2 and 8.5 feet (e.g., 2 feet, 4 feet, 5 feet, 8.5 feet, etc.), such that the automated platform 100 can fit inside the doors and width of the trailer. In one or more embodiments, the width 204 can be 80 inches so that the automated platform 100 can accommodate two 40 inch wide pallets. In certain embodiments, the front side 104, the back side 106, and the sides 108 and 110 may be sized such that more than one automated platforms may fit inside a trailer. In certain embodiments, the width 204 can be 99 inches so that the automated platform 100 can fit within a standard 53 foot trailer. For example, in one embodiment, three automated platforms 100 having dimensions of 16 feet (or just under) in length and 8 feet (or just under) in width may fit inside a trailer having a length of 48 feet and a width of 8.5 feet.

In various embodiments, the automated platform 100 may have a surface area that fits one or more pallets. In one embodiment, a standard pallet has dimensions of 48 inches long and 40 inches wide. As shown in greater detail in connection with FIG. 8, some embodiments may be configured to fit a specific number of pallets, such as 8 pallets, or 6 pallets, or any other number as desired. For these embodiments, the specific sizing and shape of the platform is important for its end use case. In at least one embodiment, the automated platform 100 may be sized to hold 1-26 pallets.

In multiple embodiments, the automated platform 100 may include one or more transport modules attached to the top surface 102, front side 104, back side 106, and/or sides 108 and 110 to optimize the automated platform 100 for transporting specific goods. In one or more embodiments, the one or more transport modules may include a rack module, a conveyor module, a Gaylord module, a liquid module, a refrigerated module, a baled holder module, and a cart module. In at least one embodiment, the conveyor module may include conveyor belts on the top surface 102 of the automated platform 100 to cycle pallets to specific areas on the automated platform 100 or to cycle pallets to one or more additional automated platforms 100. For example, in one embodiment, the pallets may be fed onto a first automated platform 100 with a conveyor module, and the first automated platform 100 may cycle the pallets to a second automated platform 100 via the conveyor module. In certain embodiments, the automated platform 100 with a conveyor module may integrate with existing conveyor belt systems.

In several embodiments, the automated platform 100 may also include a forklift operatively connected to its front side 104, the back side 106, and/or the sides 108 and 110 so that the automated platform 100 may load pallets onto itself via the operatively connected fork lift. In this embodiment, the automated platform 100 may also include the conveyor module on the top surface 102, so that when the forklift loads a pallet onto the top surface, the pallet is loaded onto a conveyor belt system that can cycle the pallet to a different part of the automated platform 100.

Figure 3A:
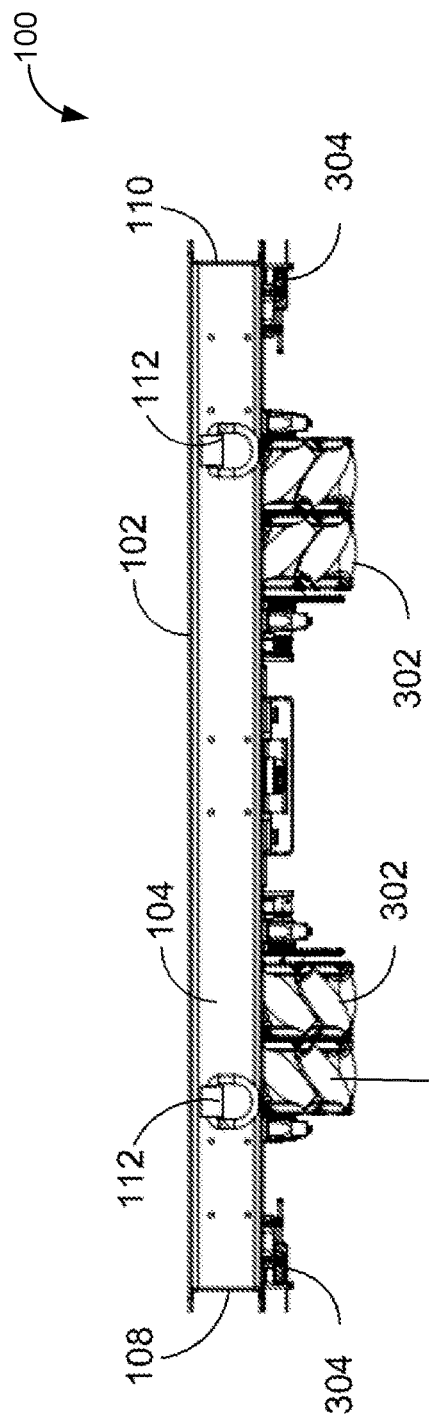
FIG. 3A illustrates a front view of an exemplary automated platform, according to one embodiment of the present disclosure.

As shown in FIG. 3A, a front view of an exemplary automated platform 100 is shown, according to one embodiment of the present disclosure. In several embodiments, the automated platform 100 includes one or more wheel modules 302 and hydraulic system 304. In one or more embodiments, each of the one or more wheel modules 302 may include one or more wheels, a motor, and suspension (see FIGS. 7A-7C for further details).

In certain embodiments, each of the one or more wheel modules 302 may have two wheels driven by a single motor to allow the wheels to handle the weight of the goods. In one or more embodiments, the number of wheels per one or more wheel modules 302 and number of one or more wheel modules 302 per automated platform 100 may change if the automated platform 100 is designed to carry heavier or lighter payloads. In certain embodiments, the platform 100 may include four wheel modules 302. In other embodiments, the platform may include more than four wheel modules as desired to provide additional stability and force distribution to the platform.

In several embodiments, the one or more wheels may be mecanum wheels, which enable instantaneous holonomic movement. In some embodiments, the one or more wheels may be other omni-directional wheel types or a powered rotating castor, or a more standard tank drive setup. In various embodiments, the omni-directional wheels may include multiple rollers 303. In many embodiments, the automated platform 100 may have four wheel modules 302, with two wheel modules 302 closer to the front side 104 and two wheel modules 302 closer to the back side 106. In at least one embodiment, the two wheel modules 302 closer to the front end 104 and the two wheel modules 302 closer to the back side 106 may be a certain widths apart (the "track width") from each other. In one or more embodiments, the track width, defined as the widest portion of the automated platform within 6 inches of the ground, is an important measure to ensure that the automated platform 100 can navigate a 6 foot wide dock leveler when a truck is parked at the worst possible lateral offset. In one embodiment, the track width (width between the outermost parts of the wheels) may be less than six feet. In some embodiments, wider track widths may be appropriate if targeting wider dock levelers or requiring more precision from the trailer's parking precision.

In various embodiments, the motor is connected to the one or more wheels via a chain drive to provide a cheaper gear reduction than a transmission while also providing a mechanical fuse in case of a motor overpower or wheel impact loading. In some embodiments, the motor may be a permanent magnet DC motor due to its relatively low cost and widespread availability, or may be brushless DC or AC motors to provide efficiency improvements.

In many embodiments, the maximum power output from the motors may generally equal the requirement to drive the fully loaded automated platform 100 up a dock leveler's slope and a slanted loading dock. For example, in one embodiment, the maximum power output may be approximately equal to 4800 total watts of power. In some embodiments, each motor may have a maximum power output of 500 watts to 1500 watts, depending on the size of the automated platform 100.

In multiple embodiments, each of the one or more wheel modules 302 is connected to the automated platform 100 via a hinged passive spring damper suspension that permits compliance in the lengthwise direction. In one embodiment, the suspension is sized to ensure that all wheels remain on the ground with an unloaded to fully loaded automated platform 100 while going over the dock leveler.

In certain embodiments, the wheel modules 302 may instead utilize an active suspension where the load to each wheel module 302 is measured, fed back to a microcontroller, and then adjusted to ensure constant equal force on all of the one or more wheels. In one embodiment, the wheel module 302 may include additional load sensing components (e.g., weight sensors) within the suspension to adjust the active suspension to ensure constant equal force on all of the one or more wheels. In one or more embodiments, the load sensing components may determine that the automated platform 100 is loaded unevenly by sensing the weight of the payload(s) on the automated platform 100 at or near each wheel module 302, and may cause a message to be sent to an operator to reload the payload(s) on the automated platform 100.

Figure 3B:
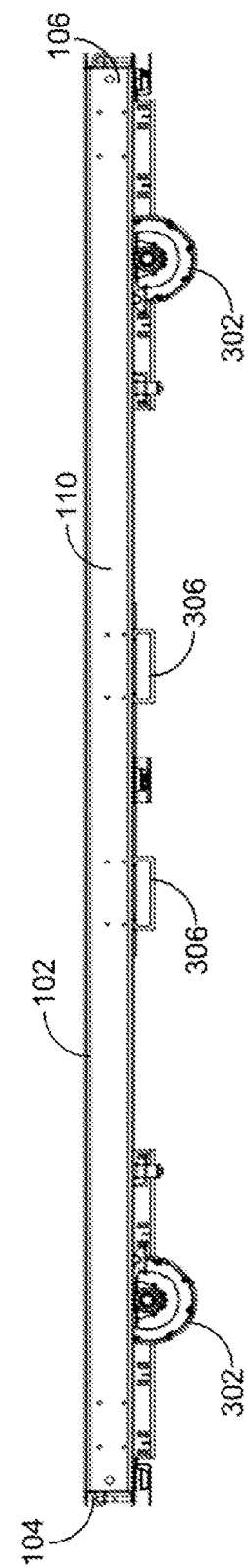
FIG. 3B illustrates a side view of an exemplary automated platform, according to one embodiment of the present disclosure.

As shown in FIG. 3B, a side view of an exemplary automated platform 100 is shown, according to one embodiment of the present disclosure. As shown in FIGS. 3A and 3B, the hydraulics are not engaged. In at least one embodiment, the automated platform 100 may include forklift pockets 306 and 602 (see FIG. 6). In one embodiment, the forklift pockets 306 and 602 may define an opening such that forks on a forklift can go through the forklift pockets 306 and 602. In some embodiments, the forklift pockets 306 and 602 may stabilize the forks on a forklift (or multiple forklifts) so that the forklift(s) can lift and transport the automated platform 100. In one or more embodiments, the automated platform 100 may be lifted by forklift(s) via the forklift pockets 306 and 602 and placed on top of another automated platform 100 for more efficient storage or for transporting multiple automated platforms 100 on top of one another. For example, in one embodiment, an automated platform 100 may fail, and so one or more forklifts may lift the failed automated platform 100 onto another automated platform 100 so that the failed automated platform can be transported.

Figure 3C:
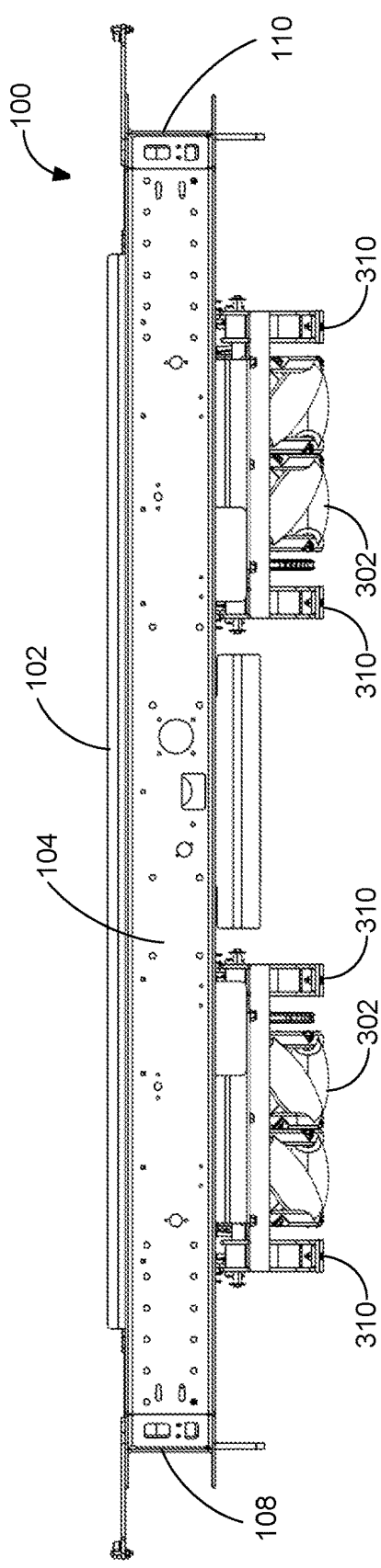
FIG. 3C illustrates a front view of an exemplary automated platform, according to one embodiment of the present disclosure.

As shown in FIG. 3C, a front view of an exemplary automated platform 100 is shown, according to one embodiment of the present disclosure. In several embodiments, the automated platform can include one or more wheel modules 302 and the pneumatic system 310. The pneumatic system 310 can be the braking system (or a portion of the braking system) for the automated platform 100. As will be understood, the pneumatic system 310 can replace or be included in addition to the hydraulic system 304. In various embodiments, the pneumatic system 310 can be positioned on either or both sides of the wheel modules 302. As shown in FIG. 3C, the pneumatic system 310 is not engaged. The pneumatic system 310 may not expand the track width of the wheel modules 302.

Figure 3D:
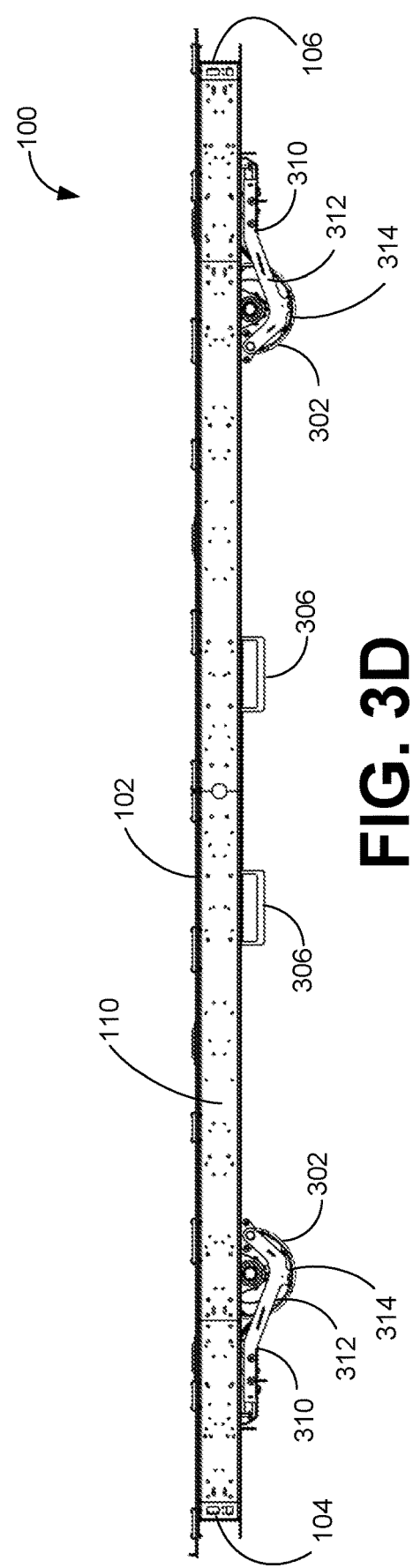
FIG. 3D illustrates a side view of an exemplary automated platform, according to one embodiment of the present disclosure.

As shown in FIG. 3D, a side view of an exemplary automated platform 100 is shown, according to one embodiment of the present disclosure. The pneumatic system 310 can include lifting legs 312. In various embodiments, the lifting legs 312 can be positioned on either or both sides of the wheel modules 302. As shown in FIG. 3D, the lifting legs 312 can be in a retracted position. When the lifting legs 312 are in a retracted position, the wheel modules 302 can contact the ground and move the automated platform 100. In various embodiments, the lifting legs 312 do not extend beyond the edge of the wheel modules 302. When retracted, the lowermost portion of the lifting leg 312 can be located at a height such that the lowermost portion of the lifting leg does not extend beyond the edge of the wheel rim (e.g., the wheel rim of the wheel modules 302). For example, the wheel rim can include the hub to which the rollers attach (e.g., if the wheel module 302 is or includes a mecanum wheel). For example, when in the retracted position, the lowermost portion of the lifting legs 312 can be positioned a distance from the ground that is less than or equal to the radius of the wheel rim for the wheel module 302. For example, if the wheel rim is 12 inches, the lowermost portion of the lifting legs 312 can be positioned 6 inches or less from the ground. Alternatively or in addition, the lowermost position of the lifting legs 312 can be positioned at a height that is less than or equal to the radius of the wheel (or the radius of the wheel rim). Alternatively or in addition, the lowermost portion of the lift leg 312, when in the retracted position, can be positioned at a height that is greater than or equal to one fourth of the radius of the wheel (or the radius of the wheel rim), greater than or equal to one third of the radius of the wheel (or the radius of the wheel rim, and/or less than or equal to one half of the radius of the wheel (or the radius of the wheel rim). Alternatively or in addition, the lowermost portion of the lift leg 312, when in the retracted position, can be positioned at a height that is greater than or equal to a height equal to the wheel rim radius subtracted from the wheel radius (e.g., the height of the rollers extending radially past the wheel rim). Because the lifting legs 312 do not extend beyond the edge of the wheel module 302, the lifting legs may not impact or decrease the approach angle (e.g., the maximum slope the automated platform 100 may traverse onto). In other words, the wheels and automated platform can navigate over terrain with or without the extendable legs attached to the automated platform 100. The lifting legs 312 can include a foot 314. The foot 314 can be a rubber foot with a Shore A hardness (e.g., durometer rating) of approximately 40 A to approximately 100 A. The rubber foot 314 can have a sufficiently large surface area to prevent the automated platform 100 from slipping when the legs 312 are extended. For example, each foot 314 can have a surface area of approximately 0.16 inches squared to 7 inches squared.

As shown in FIG. 4A, a front view of an exemplary automated platform 100 is shown, according to one embodiment of the present disclosure. In various embodiments, in FIGS. 4A and 4B, the hydraulic system 304 is engaged such that the automated platform is contacting the ground with the hydraulics and not the wheel modules 302.

In several embodiments, the hydraulic system 304 may lift the automated platform 100 up off of the wheels to secure the automated platform from movement. In some embodiments, the hydraulic system 304 may be utilized when the automated platform 100 is within a trailer during transit so that the automated platform cannot move, or at other times when a user does not want the automated platform 100 to move (e.g., while loading goods onto the automated platform 100). In many embodiments, the base of the hydraulic system 304 is fitted with load cells to monitor the weight of the payload on the platform to prevent overloading the automated platform 100 and/or trailer, to provide weight and distribution information to the electrical control system, and to provide information about the payload to be used for usage-based pricing. In at least one embodiment, the hydraulic system 304 may also be utilized to raise the automated platform 100 so that the components and sensors on the automated platform 100 may be safely tested. In one or more embodiments, the hydraulic system 304 may be utilized to stack automated platforms 100 above each other to allow transport of a larger number of robots per truck. In one embodiment, ancillary hydraulic systems may be included that utilize hydraulic power, such as, but not limited to, hydraulic load restraints, powered shelving to facilitate stacking, pallet lifting or moving mechanisms, and other integrations with other warehouse or loading equipment.

In multiple embodiments, the hydraulic system 304 is sized such that the hydraulic system 304 can lift the full payload plus automated platform 100 weight off of the floor and beyond the full stroke of the wheel suspension. In one embodiment, the hydraulic system 304 uses a pressure rating of about 3600 PSI to provide the necessary force to lift the full payload.

In several embodiments, the hydraulic system 304 utilizes four cylinders mounted near the contact points of the wheels, which allows for the chassis strength to be concentrated in the same locations.

In at least one embodiment, the hydraulic system 304 utilizes a hinged-arm motion to extend (e.g., in use) and retract (e.g., not in use). In some embodiments, when the hydraulic system 304 is not in use (e.g., retracted), the wheels are the point of contact with the ground, and the hydraulic system 304 is retracted into a cavity under the automated platform 100. In one or more embodiments, when the hydraulic system 304 is in use to stabilize the automated platform 100, a cylinder arm is extended from a cylinder, which causes the hinged-arm to rotate towards the ground. As the hinged-arm contacts the ground, the cylinder arm continues to extend, which lifts the wheels of the automated platform 100 off of the ground.

In certain embodiments, the hydraulic system 304 may not fully lift the automated platform 100 off of the wheel modules 302, but instead may provide enough downward force through the hydraulic legs to keep the automated platform 100 in place during transit in a trailer, while a payload is being loaded onto or unloaded off of the automated platform 100, and/or while the automated platform 100 is not in use. In another embodiment, the hydraulic legs may extend outwardly towards the side walls of the trailer rather than extending downwards to the ground. In this embodiment, the hydraulic legs may contact and press against the side walls of the trailer to provide stability during transit. In yet another embodiment, the hydraulic system 304 may cause the automated platform 100 to lower over the wheel modules 302 such that platform skirt contacts the ground. In some embodiments, the automated platform 100 may use brakes on the wheel modules 302, which may be used in addition to the hydraulic system 304 or without a hydraulic system 304. In multiple embodiments, the automated platform 100 may not utilize hydraulics to move the legs of the hydraulic system 304 to the ground, but instead may utilize gear drives, an electric motor, or an electrohydraulic actuator to drive the legs to the ground.

Figure 4C:
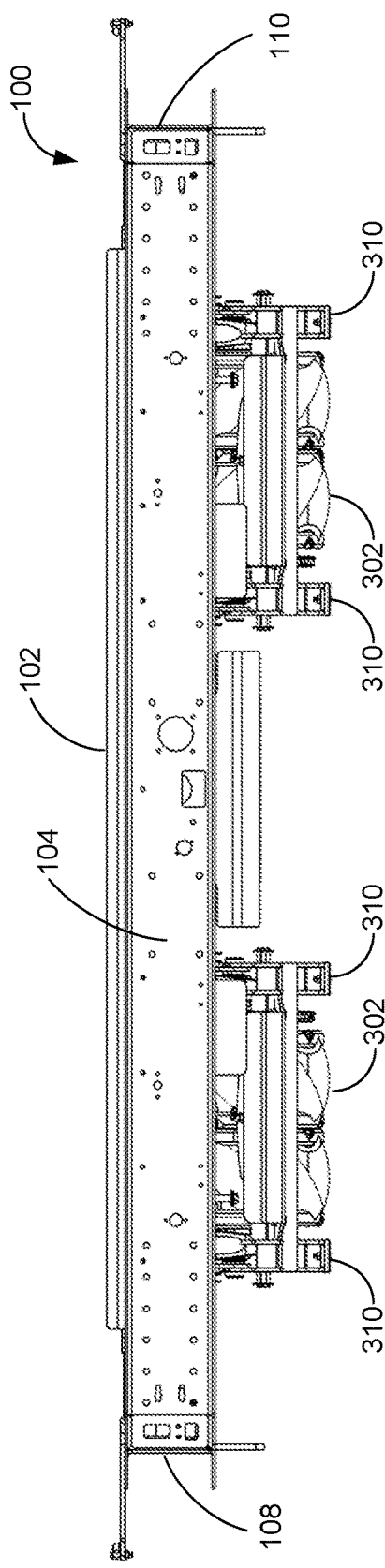
FIG. 4C illustrates a front view of an exemplary automated platform, according to one embodiment of the present disclosure.

As shown in FIG. 4C, a front view of an exemplary automated platform 100 is shown, according to one embodiment of the present disclosure. In various embodiments, in FIGS. 4C and 4D, the pneumatic system 310 is engaged such that the lifting legs 312 of the pneumatic system 310 are in contact with the surface below the automated platform 100. In various embodiments, when the pneumatic system 310 is engaged and the lifting legs 312 are extended, the lifting legs 312 can lift the wheel modules 302 out of contact with the surface below the automated platform 100.

Figure 4D:
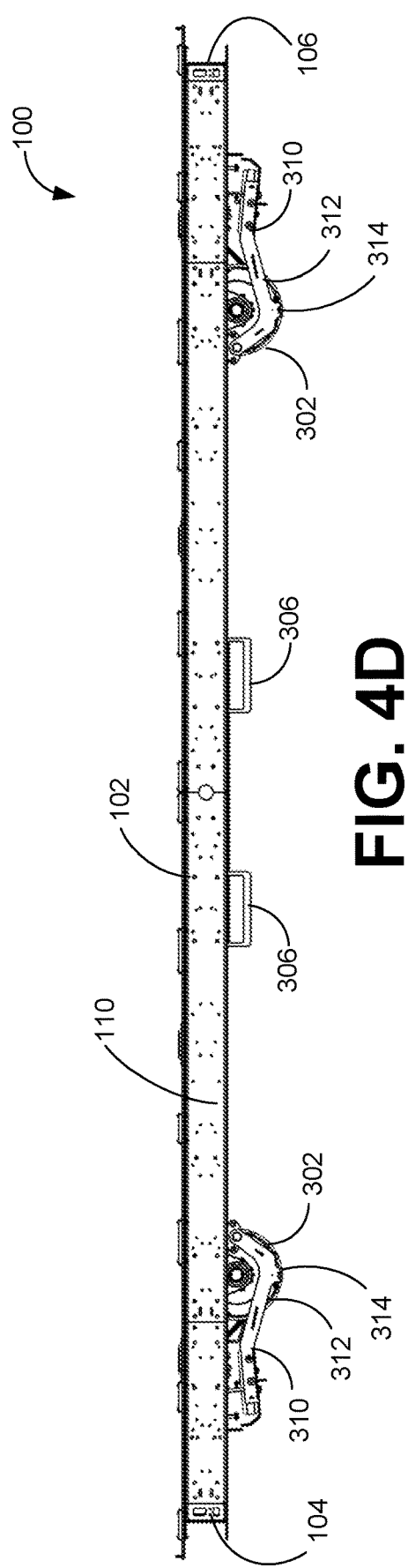
FIG. 4D illustrates a side view of an exemplary automated platform, according to one embodiment of the present disclosure.

As shown in FIG. 4D, a side view of an exemplary automated platform 100 is shown, according to one embodiment of the present disclosure. When the pneumatic system 310 is engaged, the lifting leg 312 extends downward in an extended position. When the lifting legs 312 are in an extended position, the lifting legs 312 can act as brakes for the automated platform 100. In various embodiments, when the lifting legs 312 are extended, the foot 314 can be in contact with the surface below the automated platform 100.

Figure 5A:
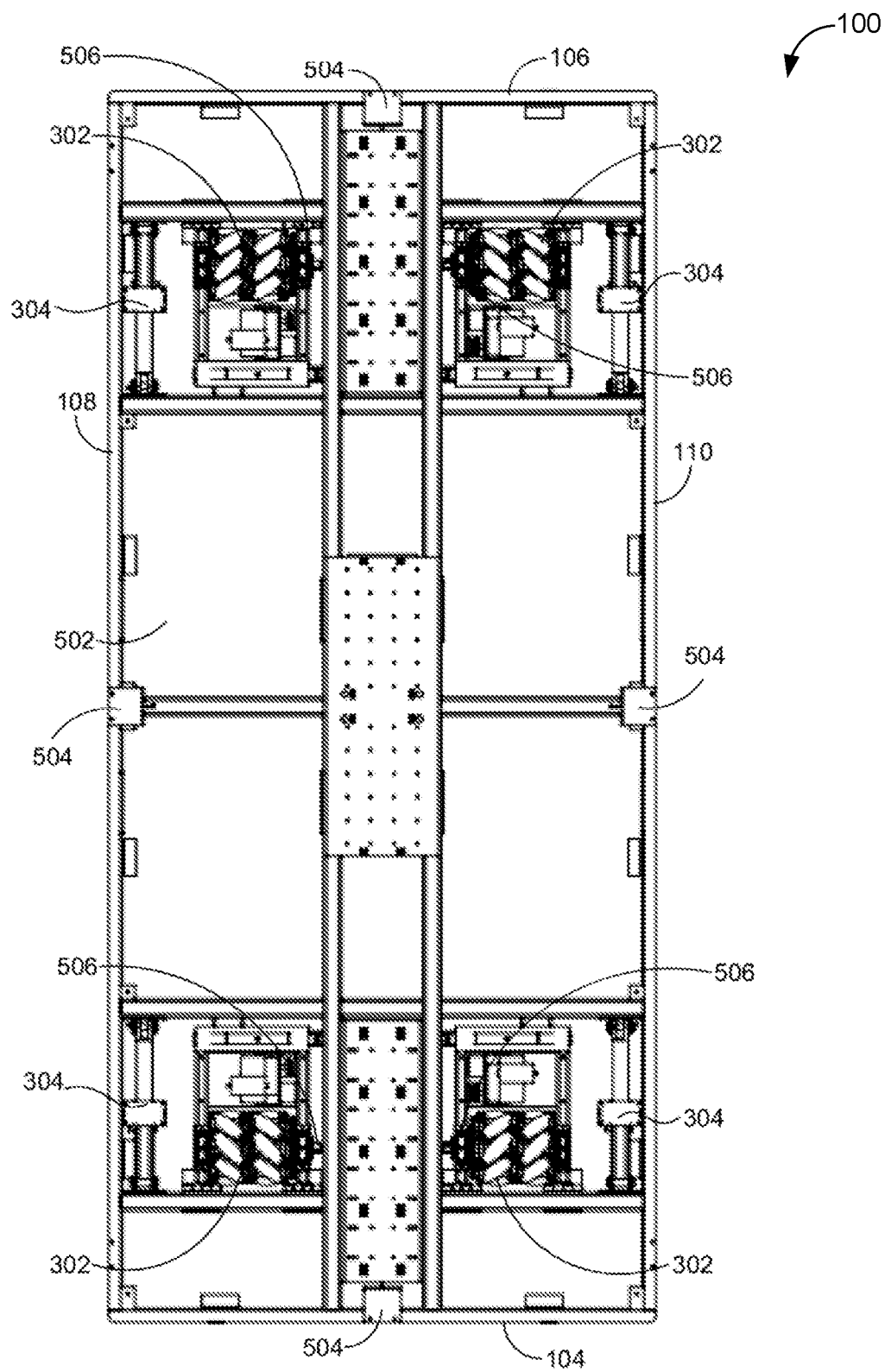
FIG. 5A illustrates a bottom view of an exemplary automated platform, according to one embodiment of the present disclosure.

As shown in FIG. 5A, a bottom view of an exemplary automated platform 100 is shown, according to one embodiment of the present disclosure. In various embodiments, the automated platform 100 also includes a bottom surface 502, obstacle detection sensors 504, and/or control system 506.

In at least one embodiment, the control system 506 may receive commands from the controller, movement control system, or electrical control system for controlling the direction and speed each wheel of the wheel module 302 turns.

Figure 5B:
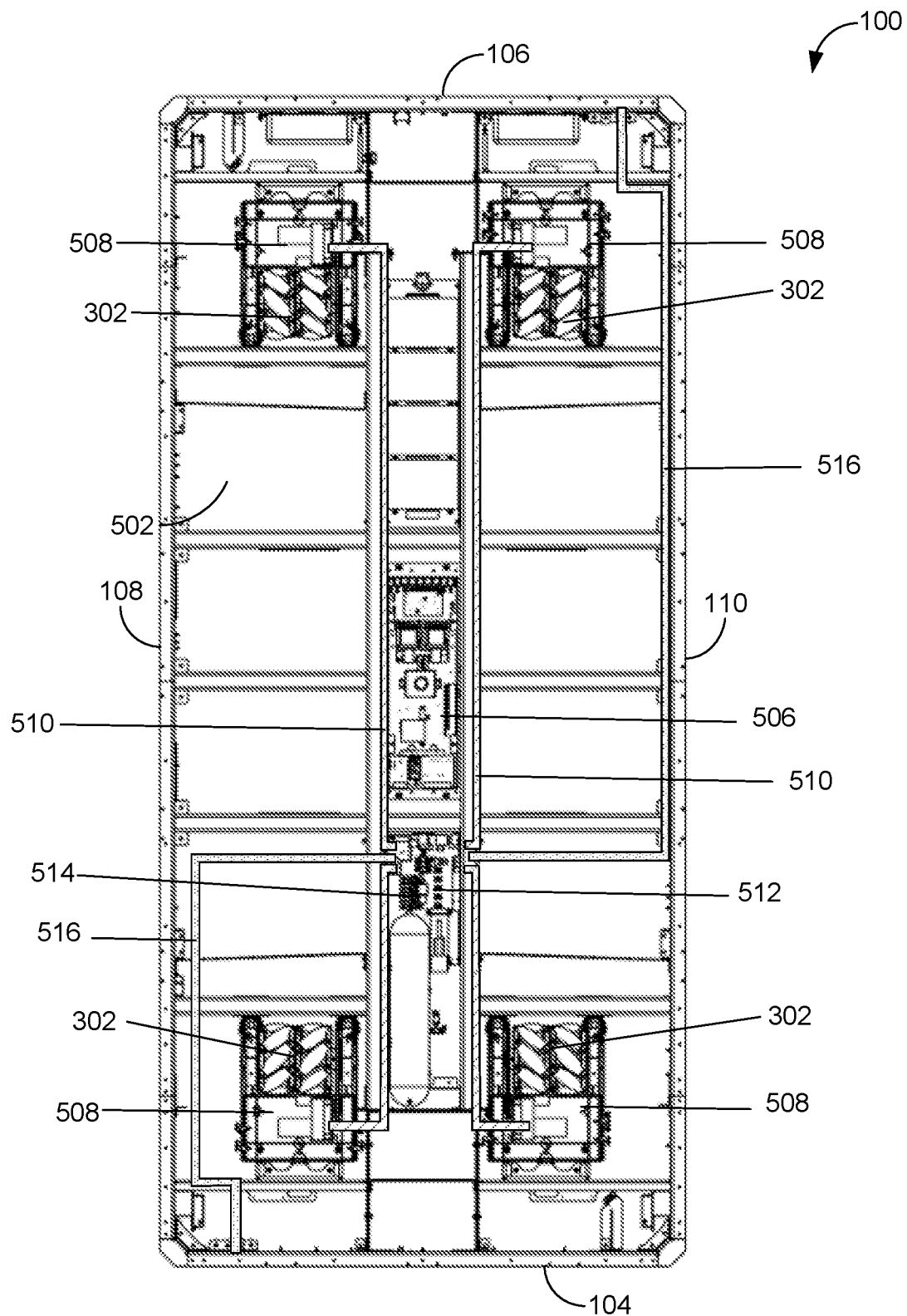
FIG. 5B illustrates a bottom view of an exemplary automated platform that schematically illustrates a pneumatic system, according to one embodiment of the present disclosure.

As shown in FIG. 5B, a bottom view of an exemplary automated platform 100 is shown, according to one embodiment of the present disclosure. In various embodiments, the automated platform 100 can include the lifting assemblies 508. The lifting assemblies can include the lifting legs 312 and be included in the pneumatic system 310. A lifting assembly 508 can be positioned adjacent to each wheel module 302. In various embodiments, the automated platform 100 can include at least one lifting assembly 508 corresponding to each wheel module 302. The lifting assemblies 508 can include an air bag shielded by a blocker plate. When the air bag expands, the expansion of the air bag can extend the lifting legs 312 such that the lifting legs 312 can be in an extended position and make contact with the surface below the automated platform 100. The air bags in the lifting assemblies can be connected to air lines 510. The air lines 510 can deliver the working fluid (e.g., any appropriate gas, air) to the air bags from the central pneumatic control system 512. Each lifting assemblies 508 can have a dedicated air line 510 (e.g., each air line 510 is directed to a single lifting assemblies 508).

The central pneumatic control system 512 can control the flow of working fluid (e.g., air) to each lifting assemblies 508. The central pneumatic control system 512 can monitor all of the lifting assemblies 508 and the air bags. For example, the central pneumatic control system 512 can monitor the pressure of all the air bags in the lifting assemblies 508. The central pneumatic control system 512 can include a pneumatic controller 514. In various embodiments, the pneumatic controller 514 and the control system 506 can be a computing device. The computing device can include any device capable of accessing a network including, but not limited to, a computer, smartphone, tablets, or other device. The computing device can include a processor and storage. The computing device can include a display on which various user interfaces can be rendered to allow users to configure, monitor, control, and command various functions of automated platform 100. In various embodiments, computing device can include multiple computing devices. Regardless, the computing device can include one or more processors and memory having instructions stored thereon that, when executed by the one or more processors, cause the computing device to perform one, some, or all of the actions, methods, steps, or functionalities provided herein. In various embodiments, the pneumatic controller 514 and the control system 506 be any device capable of accessing the mesh network, LTE, Bluetooth, or any other network communication system.

Figure 6:
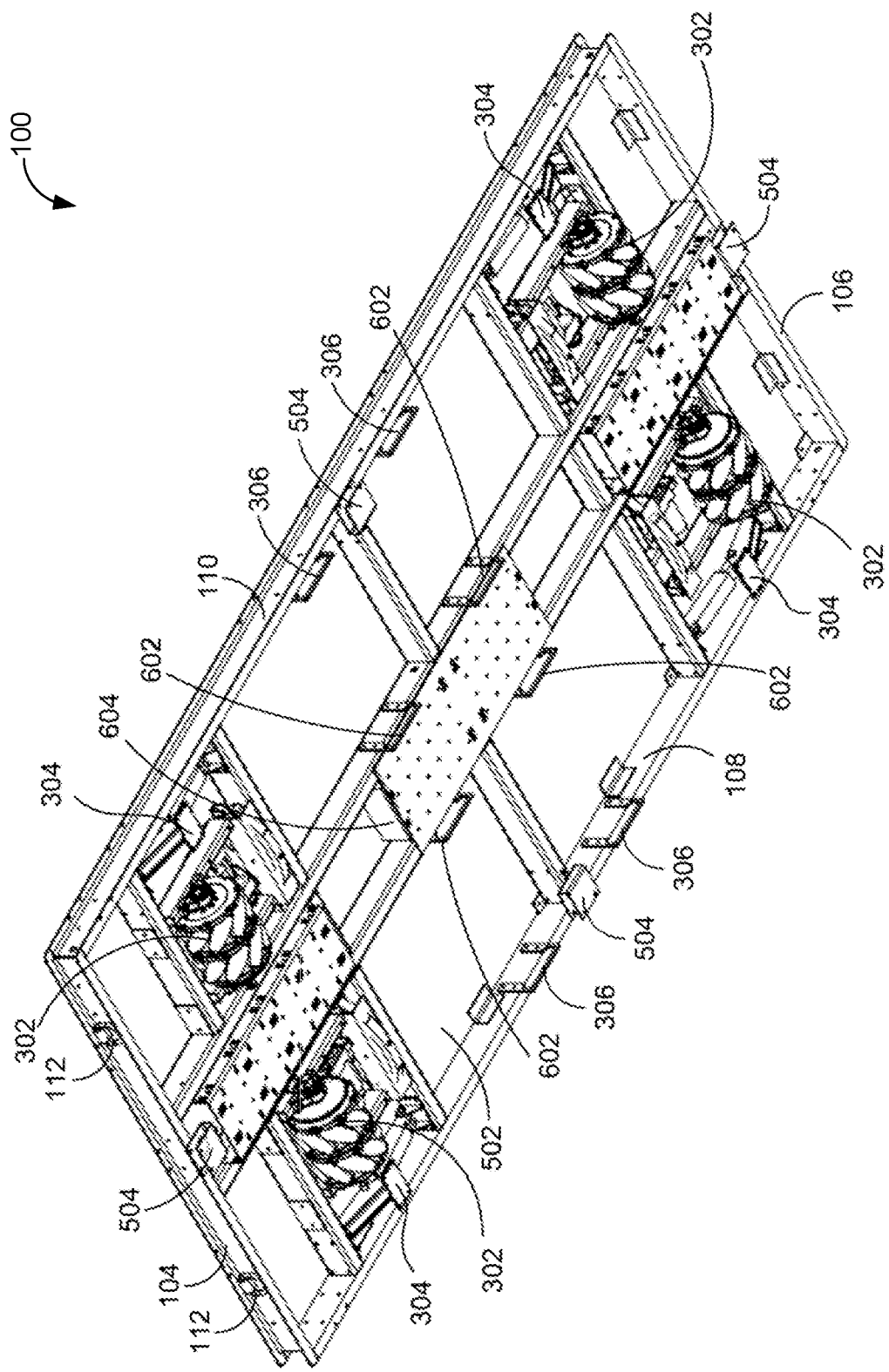
FIG. 6 illustrates a bottom perspective view of an exemplary automated platform, according to one embodiment of the present disclosure.

The lifting assemblies 508 can include the emergency release lines 516. Each lifting assemblies 508 can have a dedicated emergency release line 516. The emergency release lines 516 can be used to de-pressurize (e.g., manually release air from) an air bag such that the lifting leg 312 retracts and the wheel modules 302 can make contact with the underlying surface and roll. As shown in FIG. 6, a bottom perspective view of an exemplary automated platform 100 is shown, according to one embodiment of the present disclosure. In multiple embodiments, the automated platform 100 may also include forklift pockets 602 and computer module 604.

In one or more embodiments, the computer module 604 may include the environmental sensors, current sensors, voltage sensors, hydraulic pressure sensors (for measuring the payload weight), IoT components for collecting, storing, and sending sensor data to a network.

Figure 7A:
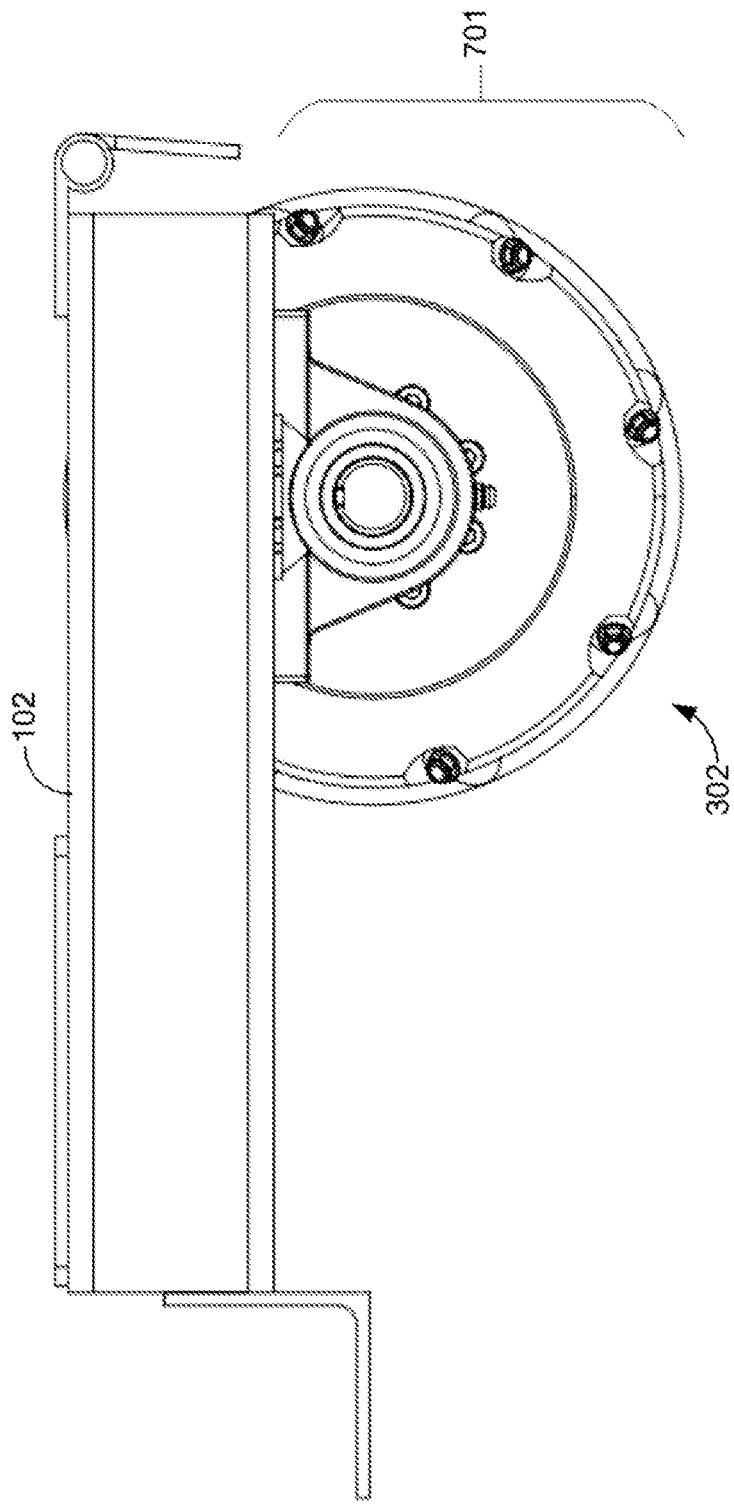
FIG. 7A illustrates a side view of an exemplary wheel system of an automated platform, according to one embodiment of the present disclosure.

As shown in FIG. 7A, a side view of an exemplary wheel module 302 of an automated platform 100 is shown, according to one embodiment of the present disclosure. In various embodiments, the wheels may be a certain diameter so that the bottom of the perimeter skirt of the automated platform 100 is a height 701 from the ground. In at least one embodiment, the height 701 may be such a height so that the one or more sensors, components, and hydraulics system 304 clear the ground while the automated platform 100 is moving. In one or more embodiments, the height 701 may be at least two inches (e.g., two inches, 6 inches, 12 inches, etc.).

Figure 7B:
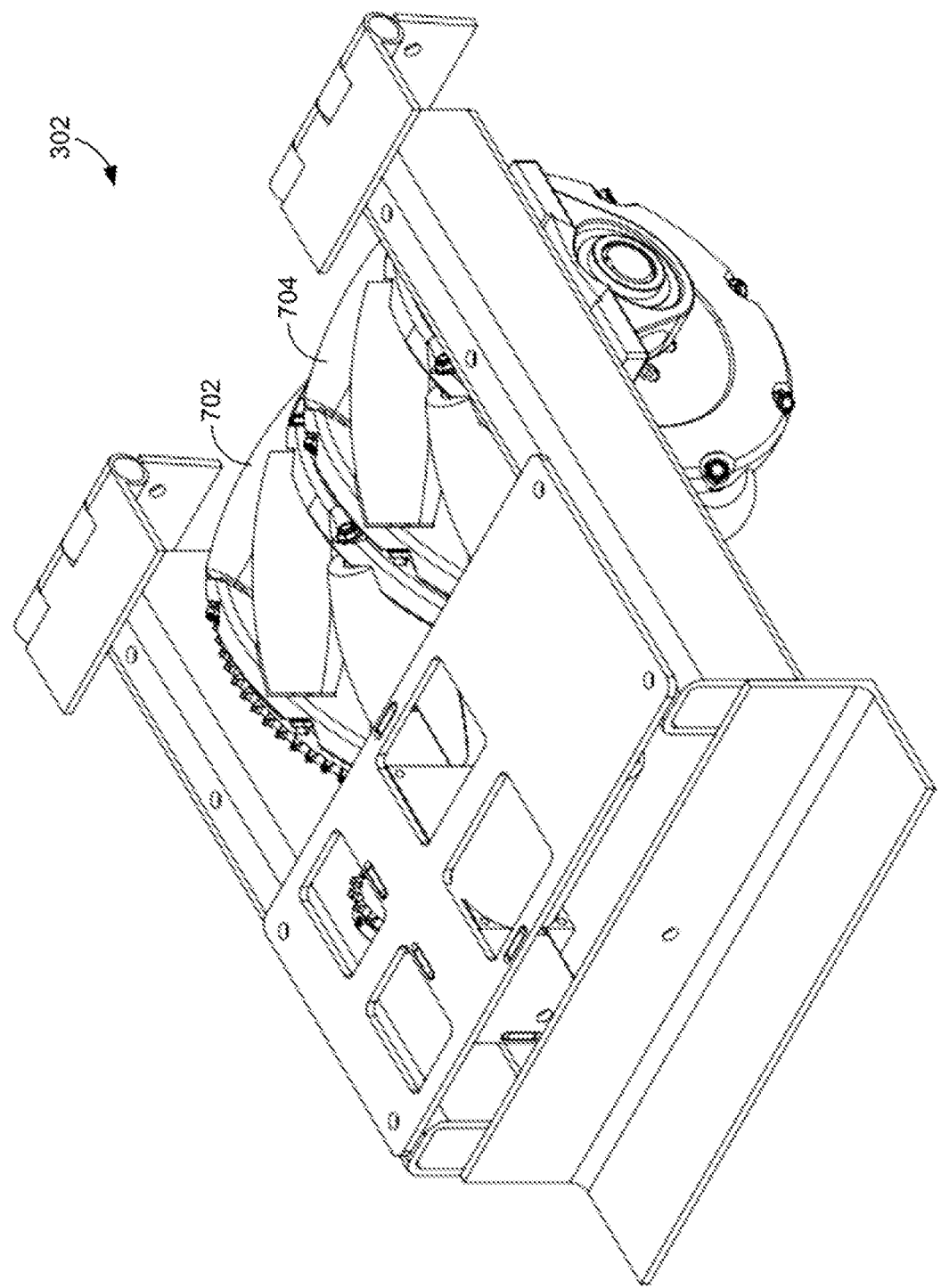
FIG. 7B illustrates a top perspective view of an exemplary wheel system of an automated platform, according to one embodiment of the present disclosure.

As shown in FIG. 7B, a perspective view of an exemplary wheel module 302 of an automated platform 100 is shown, according to one embodiment of the present disclosure. In several embodiments, the wheel module 302 may include a first wheel 702 and a second wheel 704 (also "wheels 702 and 704"). In one or more embodiments, the wheel module 302 may include only one wheel, or may include more than two wheels. In some embodiments, the wheels 702 and 704 may rotate in the same direction and at the same speed.

Figure 7C:
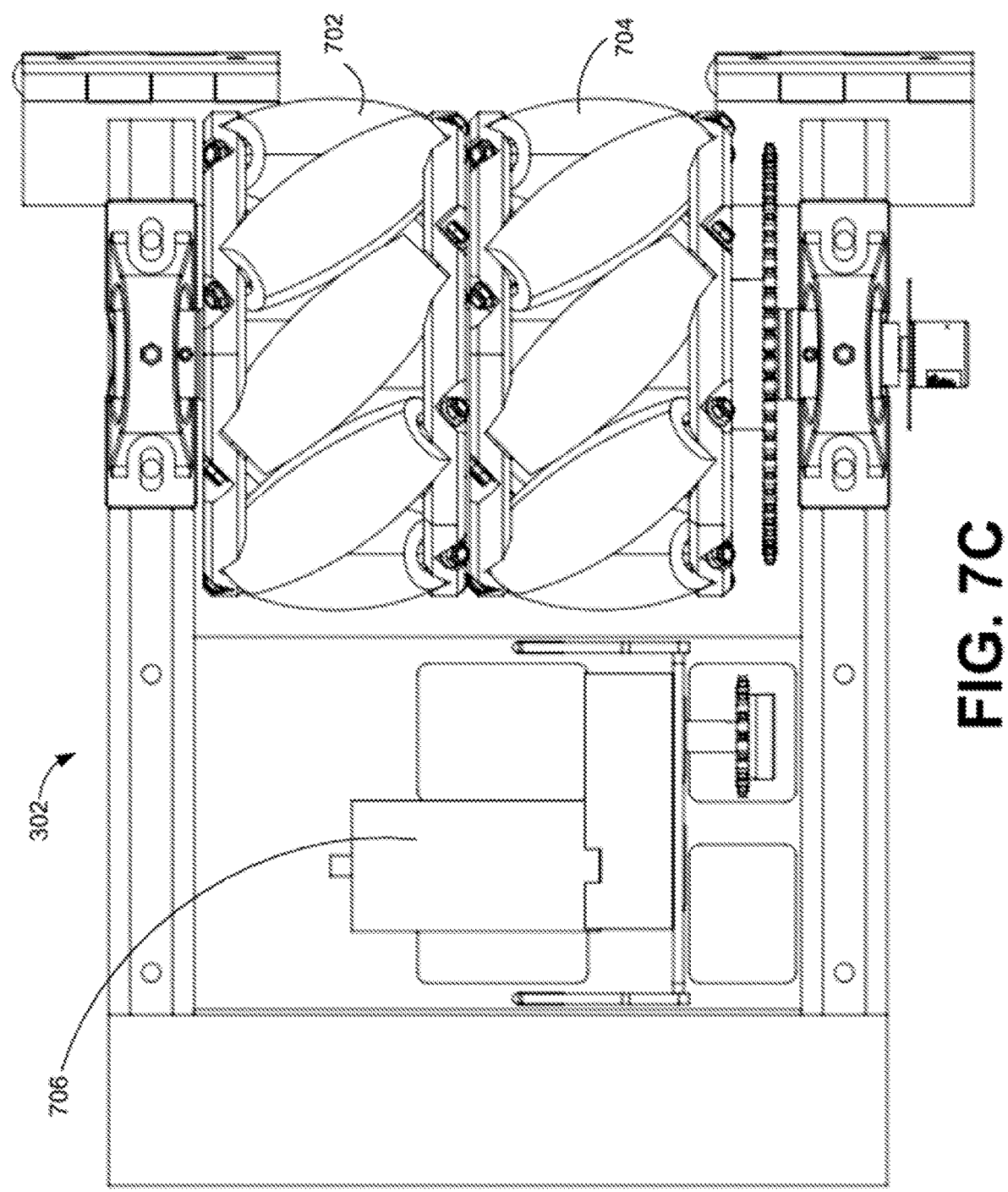
FIG. 7C illustrates a bottom view of an exemplary wheel system of an automated platform, according to one embodiment of the present disclosure.

As shown in FIG. 7C, a bottom view of an exemplary wheel module 302 of an automated platform 100 is shown, according to one embodiment of the present disclosure. In multiple embodiments, the wheel module 302 includes a motor 706. In one or more embodiments, the motor 706 is attached to (or proximate to) the bottom surface 502 such that there is ample ground clearance between the motor 706 and the ground.

Figure 7D:
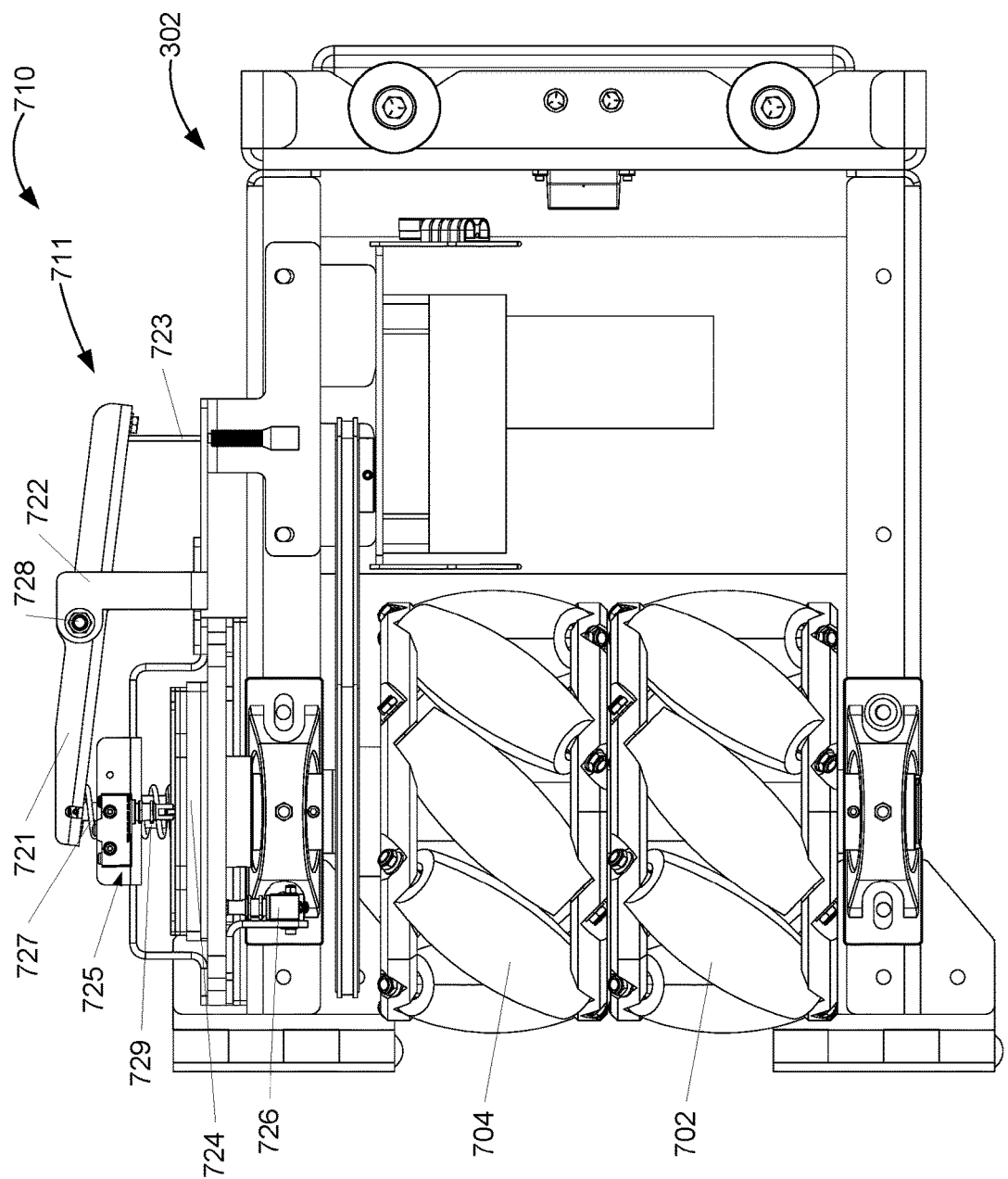
FIG. 7D illustrates a bottom view of a braking system, according to one embodiment of the present disclosure.

As shown in FIG. 7D, illustrated is a bottom view of a braking system 710, according to one embodiment of the present disclosure. In various embodiments, the braking system 710 can function as a parking brake for the automated platform 100. In various embodiments, the braking system 710 can activate to keep one or more wheels (e.g., wheels 702 and/or 704) from rotating. For example, the braking system 710 may include one or more brake engagement systems 711, which can each restrict free movement of one or more wheels 702, 704 when the automated platform 100 is fully loaded and experiencing external forces during transportation. In another example, the braking system 710 can be engaged when payloads are loaded or unloaded from the automated platform 100. In one or more embodiments, the braking system 710 can be added to the wheel module 302 and/or to any particular wheel infrastructure of the automated platform 100. For example, in an automated platform 100 with four individual wheel modules 302, each wheel module 302 may include its own respective brake engagement system 711. In a system with more than one brake engagement system 711, each brake engagement system 711 may act independently or in unison or conjunction, depending on the need of the automated platform 100. In particular embodiments, the braking system 710 is paired with the hydraulic system 304 and the motor 706 of the wheel module 302 to restrict movement in the wheels 702, 704. For example, the motor 706 of the wheel module 302 can increase and decrease the rotations of the wheels 702, 704 when the automated platform 100 is moving by using regenerative braking and/or any particular method of braking. Continuing this example, the braking system 710 (e.g., the brake engagement system 711) can activate (e.g., when the wheels 702, 704 are in a stopped position) to prevent or inhibit the wheels 702, 704 from further rotating. In at least one embodiment, the braking system 710 can activate independently from the hydraulic system 304. For example, the braking system 710 can prevent or inhibit the wheels 702, 704 from rotating prior to activation of the hydraulic system 304. In one or more embodiments, the electrical control system and/or any particular computing system of the automated platform 100 can activate the braking system 710 and the hydraulic system 304 simultaneously to secure the automated platform in a particular position.

In particular embodiments, the braking system 710 (e.g., the brake engagement system 711) can include a braking arm 721, a puller fulcrum 722, a puller cable 723, a brake plate 724, a disengaged limit switch 725, an engaged limit switch 726, a braking spring 727, and other components discussed in further detail herein. In certain embodiments, the puller cable 723 connects to a brake cable actuation system 750 (see FIG. 7F) at one end and the braking arm 721 at an opposite end. That is to say, one end of the puller cable 723 (or combination of cables and/or other components) can attach to the brake cable actuation system 750 and an opposite end of the puller cable (or combination of cables and/or other components) can attach to the braking arm 721 such that force can be transferred from the brake cable actuation system 750 to the braking arm 721. Thus, the brake cable actuation system 750 can engage or disengage the braking system 710 by moving (e.g., releasing or pulling) the puller cable 723.

In one or more embodiments, the braking arm 721 is connected to the puller fulcrum 722. In at least one embodiment, the braking arm 721 can attach to the puller fulcrum 722 through a pivoting point 728. In some embodiments, a bolt, a pin, and/or any rigid material can extend through the puller fulcrum 722 and the braking arm 721 to rotatably secure the braking arm 721 to the puller fulcrum 722. The braking arm 721 may rotate relative the puller fulcrum 722 via the pivoting point 728. In various embodiments, the puller cable 723 can pull the braking arm 721 to rotate relative the puller fulcrum 722. For example, as the puller cable 723 pulls the proximal end of the braking arm 721, the distal end of the braking arm 721 rotates away from the wheels 702 and 704 (thus compressing the spring 727 and disengaging the brake engagement system 711).

In at least one embodiment, the braking arm 721 connects to the brake plate 724 through a brake connection 729. The braking arm 721 may engage or disengage the brake engagement system 711 by pushing or pulling the brake plate 724, respectively. For example, the brake engagement system 711 is disengaged when the brake cable actuation system 750 pulls the puller cable 723. Continuing this example, the proximal end of the braking arm 721 connected to the puller cable 723 can rotate towards the direction of motion of the puller cable 723 as the brake cable actuation system 750 pulls the puller cable 723. Further continuing this example, the distal end of the braking arm 721 rotates in a direction away from the wheels 702, 704. Further continuing this example, the rotating braking arm 721 can pull the brake connection 729 away from the wheels 702, 704. By pulling the brake connection 729 away from the wheels 702, 704, the brake plate 724 may disengage from a sprocket 731 attached to the wheels 702, 704. In some embodiments, once the brake plate 724 is fully removed from the sprocket 731, the brake engagement system 711 is disengaged. In various embodiments, when the brake engagement system 711 is disengaged, the brake plate 724 may compress the braking spring 727. In certain embodiments, the brake cable actuation system 750 can hold or maintain the tension in the puller cable 723 such that the compression of braking spring 727 is maintained.

In various embodiments, when the brake engagement system 711 is engaged, the brake cable actuation system 750 may release tension in the puller cable 723. In some embodiments, releasing tension in the puller cable 723 can allow the braking spring 727 to decompress or extend. As the braking spring 727 decompresses, the braking spring 727 can provide a force to the brake plate 724 to thereby push the brake plate 724 against the sprocket 731. In at least one embodiment, the braking spring 727 provides an engagement force that pushes the brake plate 724 into an engaged position (i.e., the braking spring 727 can be biased toward an engaged position in which case the braking spring 727 must be compressed for the brake engagement system 711 to become disengaged). The braking system 710 can include a rigid stopping plate 732, which can prevent the brake plate 724 from overextending (e.g., extending beyond a predetermined position). In some embodiments, pressing the brake plate 724 onto the sprocket 731 reengages the brake engagement system 711. In various embodiments, the braking spring 727 may be replaced with an actuating system that actively and/or directly pushes the brake plate 724 into an engaged position. In one or more embodiments, the braking system 710 may include various actuators to move the brake plate 724 and to pivot the braking arm 721 (e.g., rather than using the puller cable 723).

In one or more embodiments, the brake engagement system 711 can use the disengage limit switch 725 and the engage limit switch 726 to determine whether the brake plate 724 is engaged, such as by determining whether the brake plate 724 is located at a threshold engaged location or a threshold disengaged position. In particular embodiments, the disengage limit switch 725 and the engage limit switch 726 can be or include any particular push button limiting switch. In various embodiments, the disengage limit switch 725 and/or the engage limit switch 726 can include a laser proximity switch, an infrared range sensor, a time-of flight range sensor, a hall effect sensor, and/or any particular sensor that can measure the engagement and disengagement of the brake engagement system 711. In certain embodiments, the disengage limit switch 725 can restrict the movement of the brake plate 724 as it disengages from the rigid stopping plate 732. For example, as the braking arm 721 pulls the brake plate 724 away from the wheels 702, 704, the brake plate 724 can make contact with the disengage limit switch 725. In various embodiments, the disengage limit switch 725 can send an activation signal to the electrical control system when the brake plate 724 contacts the disengage limit switch 725.

On receiving the activation signal from the disengage limit switch 725, the electrical control system may disengage the brake cable actuation system 750. By disengaging the brake cable actuation system 750, the brake cable actuation system 750 applies force to the puller cable 723 and disengages the braking system 710. In various embodiments, the engage limit switch 726 can perform similar functionalities in the opposite direction. For example, as the brake cable actuation system 750 releases the puller cable 723 and the brake engagement system 711 begins to engage, the brake plate 724 may push into the rigid stopping plate 732.

In some embodiments, the electrical control system can stop the brake cable actuation system 750 from further releasing the puller cable 723 after receiving a signal from the engage limit switch 726 indicating that the engage limit switch 726 and the brake plate 724 are in contact. In at least one embodiment, the motor 706 can determine if the braking system 710 is engaged or disengaged. For example, the motor 706 can make small or subtle rotations after brake plate 724 engages and disengages. Continuing this example, the motor 706 can determine that the brake plate 724 is correctly engaged if the force produced by the subtle rotations is greater than the typical force applied to rotate the wheels 702 and 704 freely. Further continuing this example, the motor 706 can determine that the brake plate 724 is correctly disengaged if the force produced by the subtle rotations is equal to the typical force applied to rotate the wheels 702, 704 freely. In various embodiments, the motor 706 and/or the electrical control system can determine the force produce by the motor 706 by analyzing the current induced by the motor 706 and/or by using force sensors within, or in communication with, the motor 706.

Figure 7E:
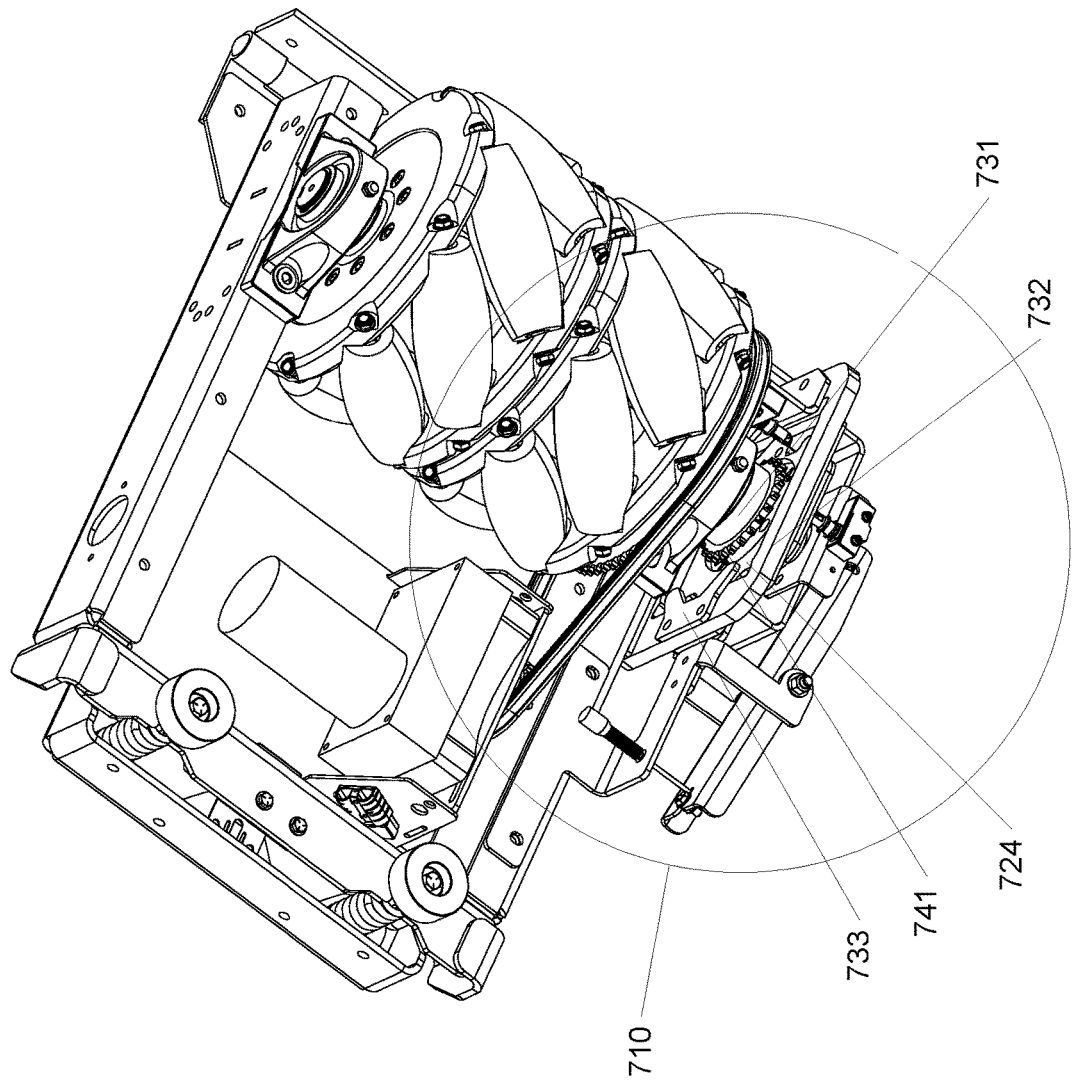
FIG. 7E illustrates a perspective view of a braking system, according to one embodiment of the present disclosure.

As shown in FIG. 7E, illustrated is a perspective view of the brake engagement system 711, according to one embodiment of the present disclosure. In some embodiments, the brake engagement system 711 can include a sprocket 731, a rigid stopping plate 732, and a restraining plate 733. In some embodiments, the sprocket 731 extends from the driving wheel shaft of the wheels 702, 704. For example, as the driving wheel shaft rotates, the sprocket 731 may rotate at the same rotational speed and in the same direction. In various embodiments, the sprocket 731 can include a series of teeth 741 around the circumference of the sprocket 731. In at least one embodiment, the brake plate 724 can include a first recess or aperture (referenced herein as "absence") that matches the shape and/or dimension of the exterior circumference or surface of the sprocket 731. In one or more embodiments, the brake plate 724 can mate with the sprocket 731 by enveloping some or all of the sprocket 731. In particular embodiments, the rigid stopping plate 732 can include a second recess or aperture (referenced herein as "absence") that is substantially similar to the exterior shape of the brake plate 724. In at least one embodiment, when the brake plate 724 mates with the sprocket 731, the rigid stopping plate 732 envelopes some or all of the brake plate 724. For example, when the brake engagement system 711 is engaged, the sprocket 731 can insert into the first absence of the brake plate 724 (or vice versa), and/or the brake plate 724 can insert into the second absence of the rigid stopping plate 732 or otherwise contacts the rigid stopping plate 732. In another example, when the brake engagement system 711 is disengaged, the sprocket 731 does not insert into the absence of the brake plate 724 and the brake plate 724 does not insert into, or otherwise contact, the rigid stopping plate 732. In at least one embodiment, when the brake engagement system 711 is disengaged, the sprocket 731 may rotate freely, allowing the wheels 702, 704 to rotate.

In various embodiments, the brake engagement system 711 can include at least one restraining plate 733. The restraining plate 733 may keep the brake engagement system 711 from pushing the brake plate 724 past the sprocket 731 and/or the rigid stopping plate 732. For example, in an engaged position, the brake plate 724 can push against the restraining plate 733 such that the restraining plate restricts further movement of the brake plate 724. In one or more embodiments, the brake engagement system 711 can include various restrain plates 733 located at various positions on the surface of the rigid stopping plate 732. For example, the brake engagement system 711 may include two oppositely positioned restraining plates 733 attached to the rigid stopping plate 732. In some embodiments, the restraining plates 733 may be excluded from the brake engagement system 711. The electrical control system may manage the brake cable actuation system 750 and limit the depth in which the brake plate 724 is pushed into the rigid stopping plate 732. In a scenario where the depth of the brake plate 724 is managed, the restraining plate 733 may be unnecessary.

In some embodiments, by mating with the brake plate 724, any rotation of the sprocket 731 is similarly induced into the brake plate 724, and vise-versa. In particular embodiments, the rigid stopping plate 732 restricts the rotation of the sprocket 731 by locking the brake plate 724 into a fixed position. For example, as the sprocket 731 rotates due to movements in the motor 706 and/or the automated platform 100, the sprocket 731 induces a rotation on the brake plate 724. Continuing this example, the rigid stopping plate 732 can restrict the rotation of the brake plate 724. As the rigid stopping plate 732 holds the position of the brake plate 724, the sprocket 731 may no longer rotate in any particular direction. In some embodiments, the wheels 702, 704 no longer rotate as the brake plate 724 restricts rotation of the sprocket 731.

In some embodiments, the motor 706 can induce subtle movements into the sprocket 731 prior to engaging the brake engagement system 711 to align the first absence of the brake plate 724 with the sprocket 731. For example, for the sprocket 731 to properly mate with the brake plate 724, the teeth 741 of the sprocket 731 may need to align with the first absence of the brake plate 724. In certain embodiments, the brake engagement system 711 may include sensors, such as cameras, to confirm if the sprocket 731 and the first absence of the brake plate 724 are properly aligned. In at least one embodiment, the brake cable actuation system 750 receives a signal to either disengage or engage the brake engagement system 711 if the sprocket 731 and the brake plate 724 are properly aligned. In at least one embodiment, the wheels 702, 704 may include a disk brake, drum brake, or other braking system to maintain the current position of the sprocket 731 prior to engaging or disengaging the brake engagement system 711. In various embodiments, the electrical control system can use historical data to rotate the wheels 702, 704 into a position where the brake plate 724 and the sprocket 731 properly aligned, allowing the brake engagement system 711 to engage or disengage accordingly. In various embodiments, the process of applying subtle rotations to the sprocket 731 to align with the brake plate 724 can be executed at all wheel modules 302 of the automated platform 100 independently or simultaneously until all brake engagement systems 711 are engaged. In at least one embodiment, the electrical control system may determine a successful disengagement and/or engagement if all disengage limit switches 725 and/or engage limit switches 726 are active, respectively.

Figure 7F:
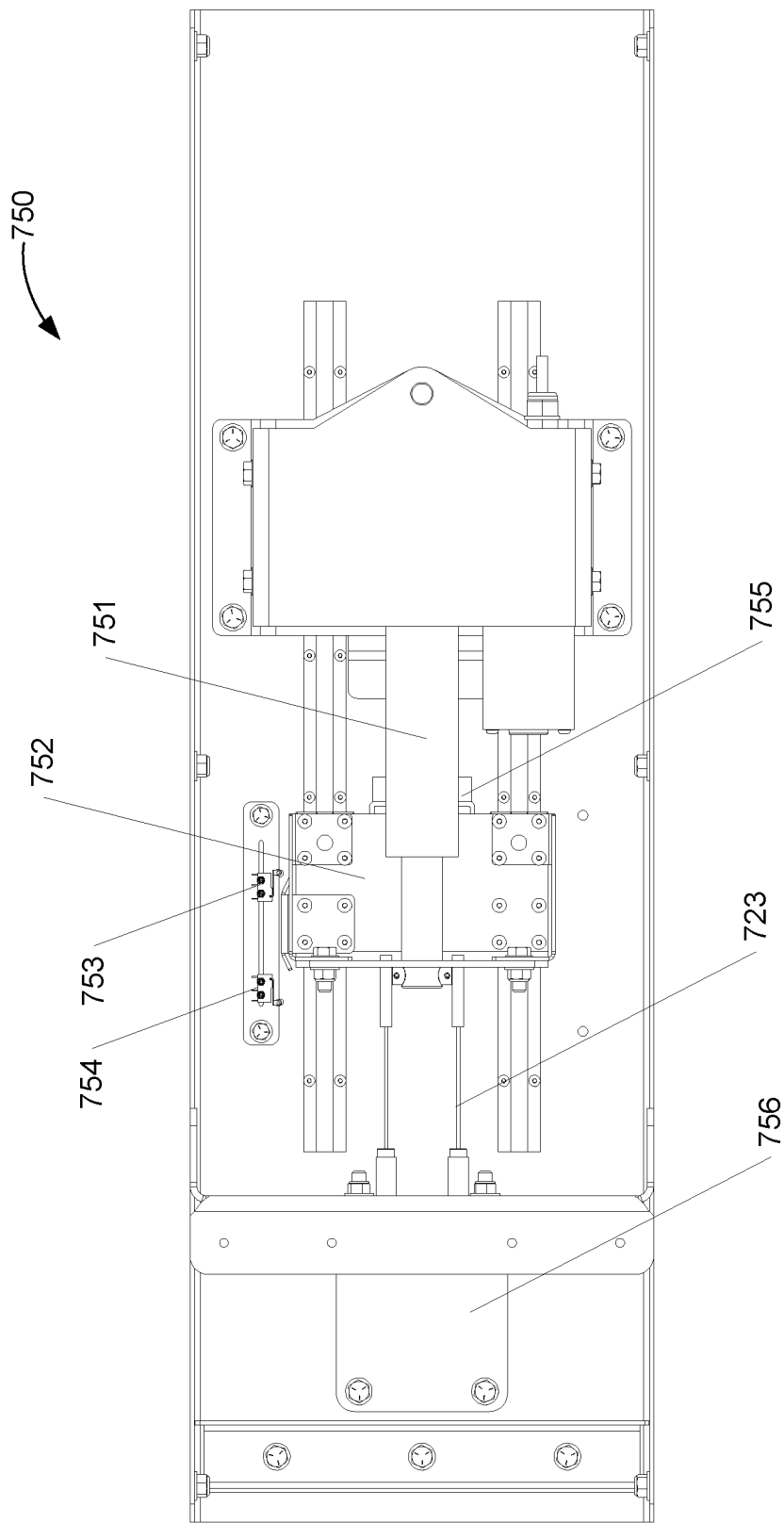
FIG. 7F illustrates a bottom view of the brake cable actuation system, according to one embodiment of the present disclosure.

As shown in FIG. 7F, illustrated is a bottom view of an exemplary brake cable actuation system 750, according to one embodiment of the present disclosure. In some embodiments, the brake cable actuation system 750 includes a linear actuator 751, a cable sled 752, a second disengage limit switch 753, a second engage limit switch 754, rescue cable connections 755, and a fixed cable plate 756. In some embodiments, the brake cable actuation system 750 can contract or release the puller cables 723 of the braking system 710. In at least one embodiment, the automated platform 100 can include at least one brake cable actuation system 750 for the brake engagement systems 711. For example, the brake cable actuation system 750 can connect to all brake engagement system 711 (e.g., corresponding to each wheel module 302 of the automated platform 100). In another example, each wheel module 302 of a four-wheeled automated platform 100 can include its own dedicated brake cable actuation system 750, which may or may not include puller cables 723, for example.

In some embodiments, the linear actuator 751 and the puller cables 723 can be rated for at least 15,000-pound payloads, 15,000-20,000 pound payloads, and/or less than 20,000-pound payloads. For example, the puller cables 723 can be manufactured from a galvanized braided wire cable that can withstand a force produced by a 15,000-pound payload on an incline of 7 degrees. In various embodiments, the inline actuator 761 can be manufactured to withstand similar force restraints. In at least one embodiment, the inline actuator 761 has a pulling force of at least 1,500 pounds, 1500-3,000 pounds, and/or less than 3,000 pounds. In certain embodiments, the linear actuator 751 and the puller cables 723 can withstand forces produced on the brake engagement system 711 when at least one of the brake engagement systems 711 fails. For example, the brake cable actuation system 750 can maintain a braked position of a fully loaded automated platform 100 even in the event of a failed braking system 710.

In another example, the braking spring 727 can be biased to engage the brake engagement system 711; in such a configuration, the braking system 710 can be configured to become engaged if one or more components of the braking system 710 (e.g., the linear actuator 751 and/or the puller cables 723) fails. In such a configuration, the brake engagement system 711 can be configured to compress the braking spring 727 to thereby disengage the brake engagement system 711.

In at least one embodiment, the brake cable actuation system 750 can disengage the braking system 710 by contracting the linear actuator 751. In various embodiments, contracting the linear actuator 751 pulls the movable cable sled 752 away from the fixed cable plate 756. As the moveable cable sled 752 progresses away from the fixed cable plate 756, the moveable cable sled 752 may pull on the puller cables 723. Contracting the puller cables 723 may disengage the brake engagement system 711. In at least one embodiment, the puller cables 723 extend through the fixed cable plate 756 and progress to the braking systems 710. In some embodiments, the brake cable actuation system 750 halts the inline actuator 761 when the moveable cable sled 752 and/or any other adequate component makes contact with the second disengage limit switch 753 or the second engage limit switch 754. To engage the braking systems 710, the linear actuator 751 may extend and push the moveable cable sled 752 towards the fixed cable plate 756. In certain embodiment, the tension reduction of the puller cable 723 causes the spring 727 to decompress and engage the brake plate 724. In at least one embodiment, the inline actuator 761 may hold any particular position along the movable path of the moveable cable sled 752. For example, the inline actuator 761 may hold the moveable cable sled 752 in a particular position before engaging the brake engagement system 711 to ensure the brake plate 724 and the sprocket 731 are properly aligned.

In at least one embodiment, the rescue cable connections 755 can allow a user to manually release the brake cable actuation system 750 (e.g., in the event that the automated platform 100 malfunctions or loses power). In one or more embodiments, at least one of the front side 104, the back side 106, and the lateral sides 108, 110 can include an access point for attaching to the rescue cable connections 755. In one or more embodiments, a lever, a bolt, a ratcheting winch, and/or any rotating device can extend from at least one of the sides of the automated platform 100 to connect directly to the rescue cable connections 755. In various embodiments, the lever can connect to the rescue cable connections 755 using rescue brake cables (not pictured). In one or more embodiments, the user can use any particular device to pull the lever. In some embodiments, pulling the lever pulls the rescue cable connections 755 through the rescue brake cables. By pulling the rescue cable connections 755, the linear actuator 751 is manually disengaged and the lever can pull or release the movable cable sled 752. In some embodiments, a user can engage or disengage the braking system 710 manually by adjusting the movable cable sled 752 accordingly. In at least one embodiment, once the breaking system 710 of the automated platform 100 is manually engaged or disengaged, the levers can be locked in place to maintain the current configuration of the breaking system 710.

Figure 7G:
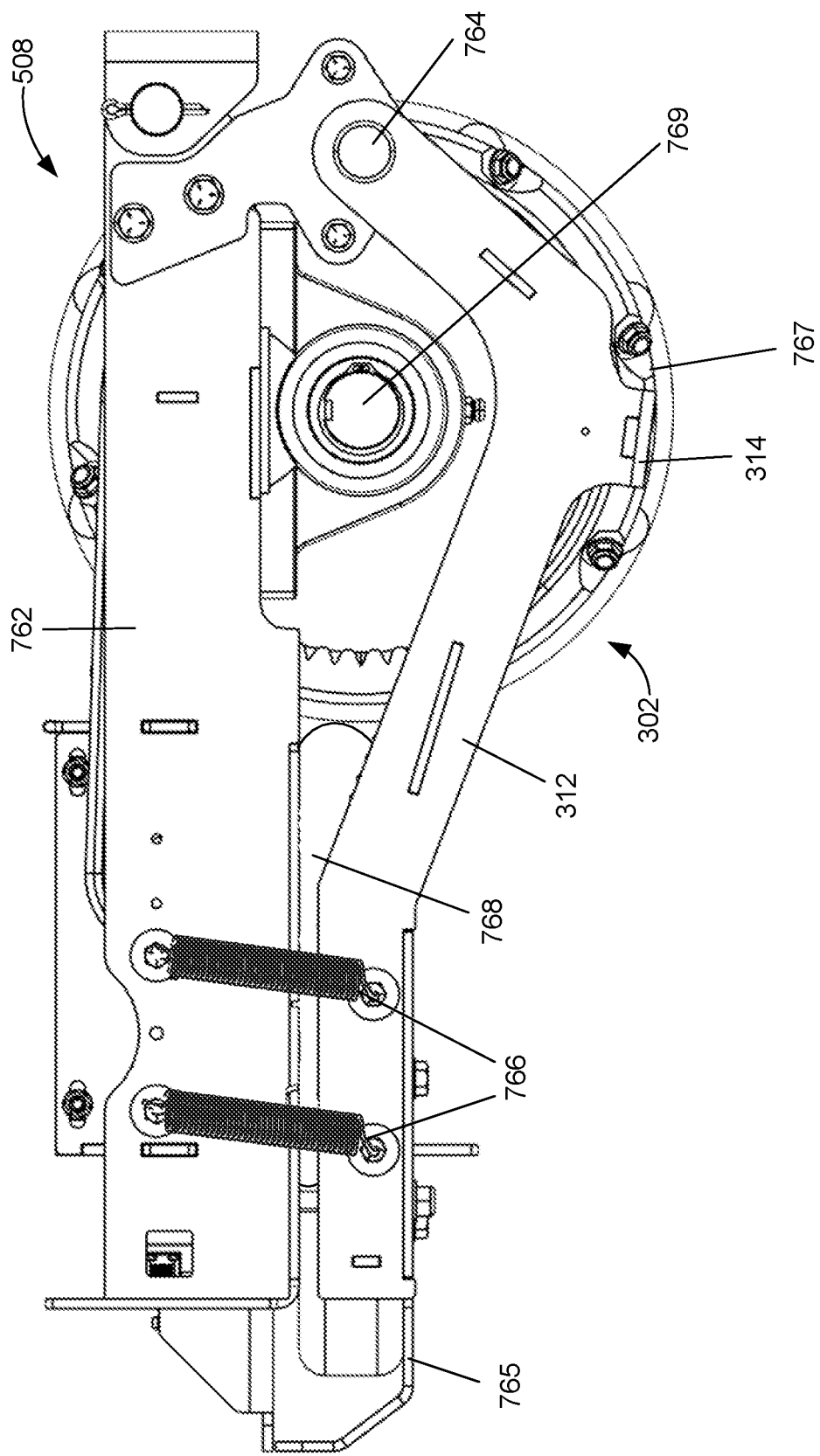
FIG. 7G illustrates a side view of an exemplary wheel system of an automated platform with a lifting leg in a retracted position, according to one embodiment of the present disclosure.
Figure 7H:
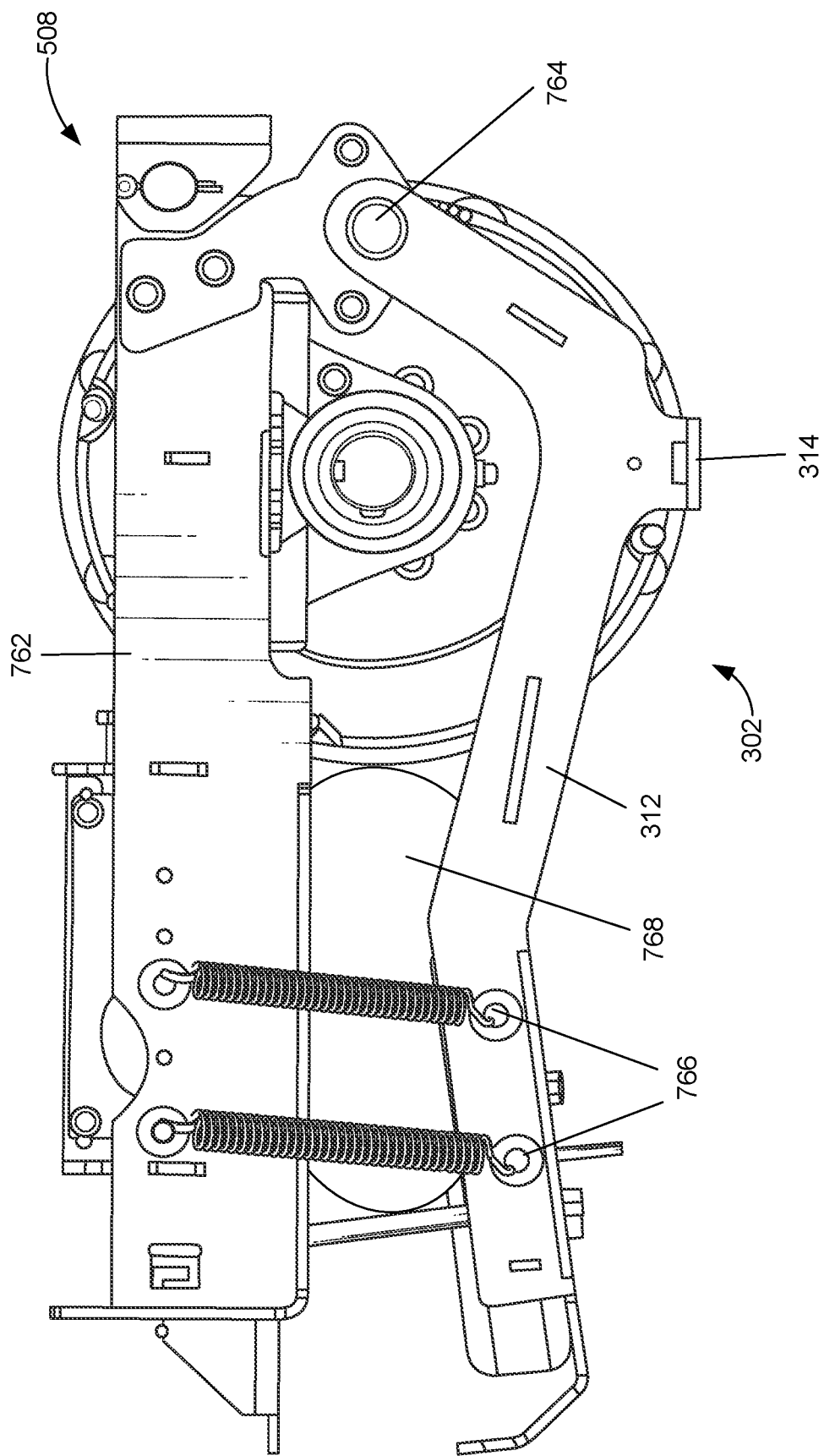
FIG. 7H illustrates a side view of an exemplary wheel system of an automated platform with a lifting leg in an extended position, according to one embodiment of the present disclosure.

As shown in FIG. 7G, a side view of an exemplary wheel module 302 and lifting assembly 508 is shown, according to one embodiment of the present disclosure. As shown in FIG. 7G, the lifting assembly 508 is shown in a retracted position. The lifting assembly 508 can include the lifting leg 312 and the foot 314. The lifting leg 312 can connect to the upper portion 762, which can be connected to the chassis (e.g., the lifting leg 312 can be in mechanical communication with the chassis via one or more intermediate components), or the lifting leg 312 can be connected to the chassis itself (e.g., via the pivot point 764 and return springs 766). The pivot point 764 can be or include a pivot, pin, or hinge such that the lifting leg 312 can rotate about the pivot point 764. The return springs 766 can include one or more springs. The return springs 766 can be connected to the lifting legs 312 at the opposite end of the pivot point 764. The return springs 766 can be any spring capable of returning the lifting legs 312 to the retracted position (e.g., a tension spring).

An air bag 768 can be in mechanical communication with the lifting leg 312. The air bag 768 can be positioned behind the lifting leg 312 (e.g., closer to the center of the wheel module 302 than the lifting leg 312, closer to the center of the chassis than the lifting leg 312). The air bag can expand via the working fluid (e.g., air) provided by the air line 510. As the air bag 768 expands, the air bag 768 can push the lifting leg 312 down (e.g., away from the chassis) until the foot 314 makes contact with the surface below the automated platform 100 or until the foot 314 and/or lifting leg 312 reach a predetermined extended position (which can lift the wheel module 302 out of contact with the underlying surface). As the lifting leg 312 extends, the return springs 766 can stretch. The air bag 768 can be made of any appropriate material to withstand the pressure of the working fluid and from the automated platform 100 (e.g., nylon). In various embodiments, the air bags can have an approximately 1:2 to approximately 1:7 times mechanical advantage while extending the lifting legs 312. Stated otherwise, the lifting leg 312 can function as a mechanical lever (e.g., as a class 1 lever) with the foot 314 acting as the fulcrum. In some examples, the ratio of the length of the effort side of the lever (e.g., the length of the lifting leg 312 between the foot 314 and the air bag 768) to the length of the resistance side of the lever (e.g., the length of the lifting leg 312 between the foot and the pivot point 764) can be approximately 3 to approximately 1. The air bags 768 can be shielded by blocker plates 765 to prevent accidental puncture. The blocker plates 765 can be a metal plate. The blocker plates 765 can be positioned on the sides of and underneath the air bags 768.

In various embodiments, the wheel module 302 can include wheel rim 767. The wheel rim 767 can be the outer edge of the wheel module 302 except for the rollers 303. When the lifting legs 312 are in a retracted position, the foot 314 can be positioned within the wheel rim 767. Since the foot 314 can be positioned within the wheel rim 767, the lifting leg 312 may not impact of increase the approach angle (e.g., the maximum slope the automated platform may traverse onto). If the foot 314 is positioned within the wheel rim 767, the foot 314 can be a distance from the ground of equal to or less than the radius of the wheel rim 767. For example, if the wheel rim 767 is 12 inches, the foot 314 can be positioned approximately 6 inches or less from the surface below the automated platform. The wheel module 302 can include the pillow blocks 769. The pillow blocks 769 can be a bearing housing (e.g., a pillow block bearing housing) for attaching the wheel module 302 to the chassis.

As shown in FIG. 7F, a side view of an exemplary wheel module 302 and lifting assembly 508 is shown, according to one embodiment of the present disclosure. As shown in FIG. 7F, the lifting assembly 508 is shown in an extended position. In the extended position, the air bag 768 can be expanded (e.g., pressurized). Once expanded, the air bag 768 can force the lifting leg 312 downward until the foot 314 makes contact with the surface below the automated platform 100 or until the foot 314 and/or lifting leg 312 reach a predetermined extended position (which can lift the wheel module 302 out of contact with the underlying surface). Alternatively or in addition, a piston or actuator can be used to move the lifting leg 312 to the extended position. By forcing the lifting leg 312 downward, the lifting leg 312 can lift the automated platform 100 such that the wheel module 302 is no longer in contact with the surface. In the extended position, the lifting legs 312 can act as the braking system. Alternatively or in addition, the lifting legs 312 can provide stabilization for the automated platform 100 such as during loading, unloading, or shipping. Furthering this example, the automated platform 100 (e.g., a remote or local controller) can be configured to automatically extend one, some, or all of the lifting legs 312 when it is determined (e.g., based on received instructions, based at least in part on data received from one or more sensors) that an object is being loaded onto the automated platform 100, an object is being unloaded off of the automated platform 100, the automated platform is parked in a shipping container (e.g., semi-trailer), or the occurrence of any other trigger event.

In various embodiments, extending the lifting legs 312 can stretch the return springs 766. The return springs 766 can remain stretched while the lifting legs 312 are in the extended position. Once the air bag 768 is emptied (e.g., de-pressurized), the force from the stretched return springs 766 can retract the lifting legs 312 until the lifting legs 312 are in the retracted position. Once the lifting legs 312 are in the retracted position, the wheel modules 302 can make contact with the surface. Alternatively or in addition, a piston or actuator can return (or help return) the lifting leg 312 to the retracted position.

Figure 7I:
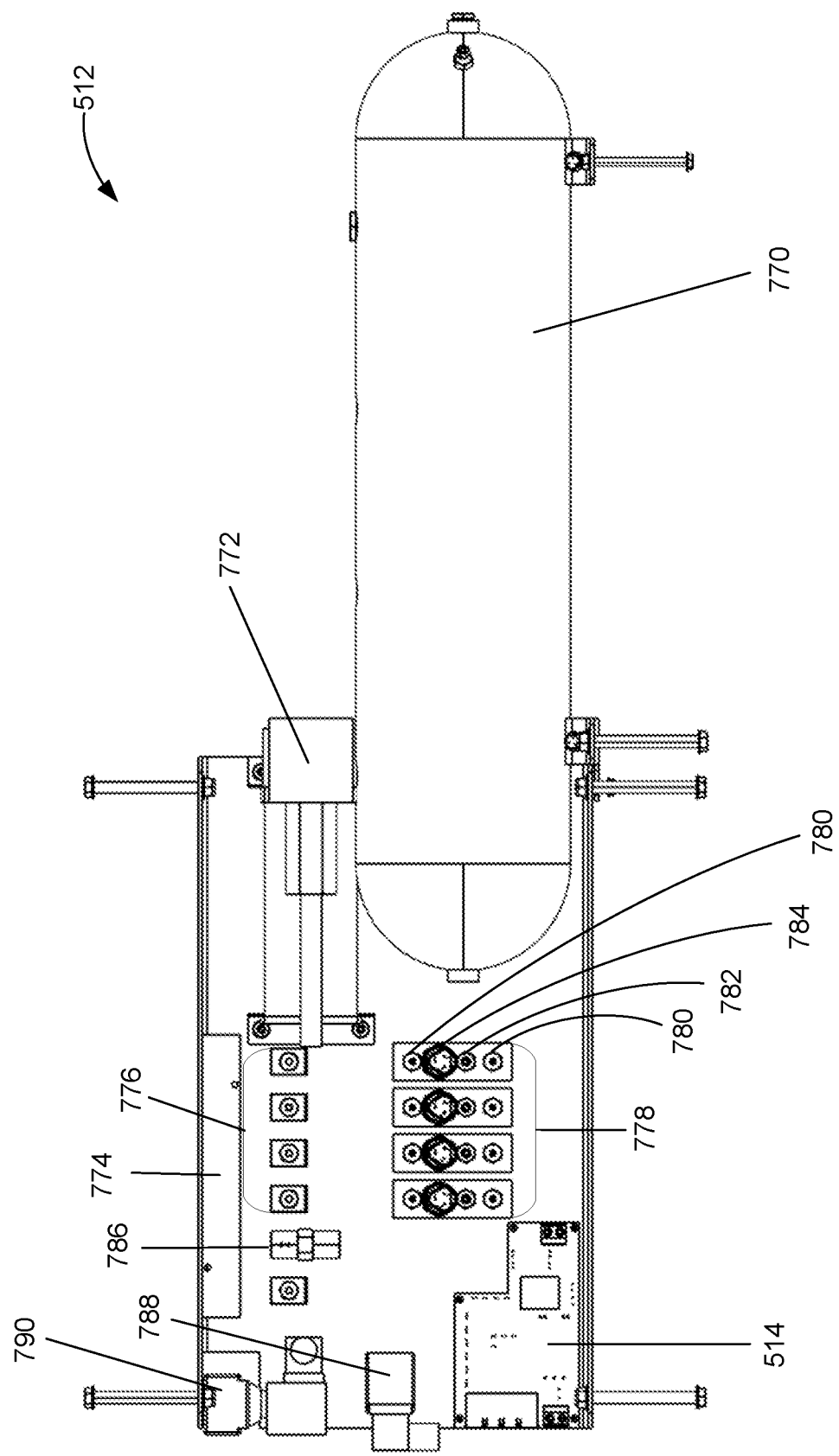
FIG. 7I illustrates a top view of the central pneumatic control system of an automated platform, according to one embodiment of the present disclosure.

As shown in FIG. 7I, a top view of an exemplary central pneumatic control system 512. The central pneumatic control system 512 can include the pneumatic controller 514. The pneumatic controller 514 can be or include any computing device. The pneumatic controller 514 can control the flow of the working fluid from the central pneumatic control system 512 to the air bags 768. The pneumatic controller 514 can monitor the pressure of the air bags 768 and the tank 770 (e.g., via one or more pressure sensors in fluid communication therewith). The tank 770 can be any tank or other container capable of containing the working fluid. The tank 770 can be used to contain and store the working fluid. For example, when the air bags 768 are emptied, the working fluid can be stored in the tank 770. The central pneumatic control system 512 can include the compressor 772. The compressor 772 can pressurize the working fluid if necessary. The compressor 772 can compress the working fluid (e.g., air) if collected from the environment. For example, if there is insufficient air in the tank 770 to pressurize the air bags 768, the compressor 772 can pressurize air from the environment to inflate the air bags 768. Alternatively or in addition, the compressor 772 can refill the tank 770 as needed.

The central pneumatic control system 512 can include the manifold 774. The manifold 774 can direct the working fluid from the tank 770 and/or the compressor 772 to the valves 776 for each air bag 768. The valves 776 can be any valve, for example, a solenoid valve. After the working fluid is directed through the valves 776, the working fluid can be directed to one or more air bag manifold 778. The air bag manifold(s) 778 can include one or more emergency releases 780, a connection 782 to one or more corresponding air bags 768, and/or a pressure transducer 784. The emergency releases 780 can connect to the emergency release lines 516. The emergency releases 780 can be used to de-pressurize an air bag 768 (e.g., based on instructions from a remote or local control and/or via manual release, such as by a user). For example, if any of the systems on the automated platform 100 fail, the emergency releases 780 can be used to de-pressurize the air bags 768. Once the air bags 768 are de-pressurized, the lifting legs 312 can retract and the wheel modules 302 can be used to roll (e.g., tow) the automated platform 100.

The connection 782 can connect to the air lines 512 used to direct the working fluid to the air bags 768. Each lifting assemblies 508 can have a dedicated air line 510 and connection 782 (e.g., each air line 510 is directed to a single lifting assembly 508). In the event that one air bag 768 leaks or is punctured, the other air bags 768 can continue to maintain pressure and remain expanded due to the individual air lines 512 and connections 782. Alternatively or in addition, the separate air lines 512 enable independent control of each individual air bag 768. The pressure transducer 784 can be any pressure transducer capable of measuring the pressure in one or more of the air bags 768. If the pressure in the air bags 768 falls below or exceeds a threshold, the pressure transducer 784 can send an alert to the pneumatic controller 514.

The central pneumatic control system 512 can include one or more check valves 786 and one or more high-flow valves 788. The check valve 786 can be any one-way valve. The high flow-valve 788 can be any high-flow valve, for example, a high-flow solenoid valve. The check valve 786 and the high-flow valve 788 can be used to fill the tank 770 (e.g., via the compressor 772). The high flow valve 788 can be used to fill all of the air bags on the automated platform 100 at once. For example, the high flow valve 788 can fill all of the air bags using working fluid stored in the tank 770 or pressurized working fluid from the compressor 772. The central pneumatic control system 512 can include an exhaust 790. The exhaust can release excess working fluid from the manifold 774.

Figure 8:
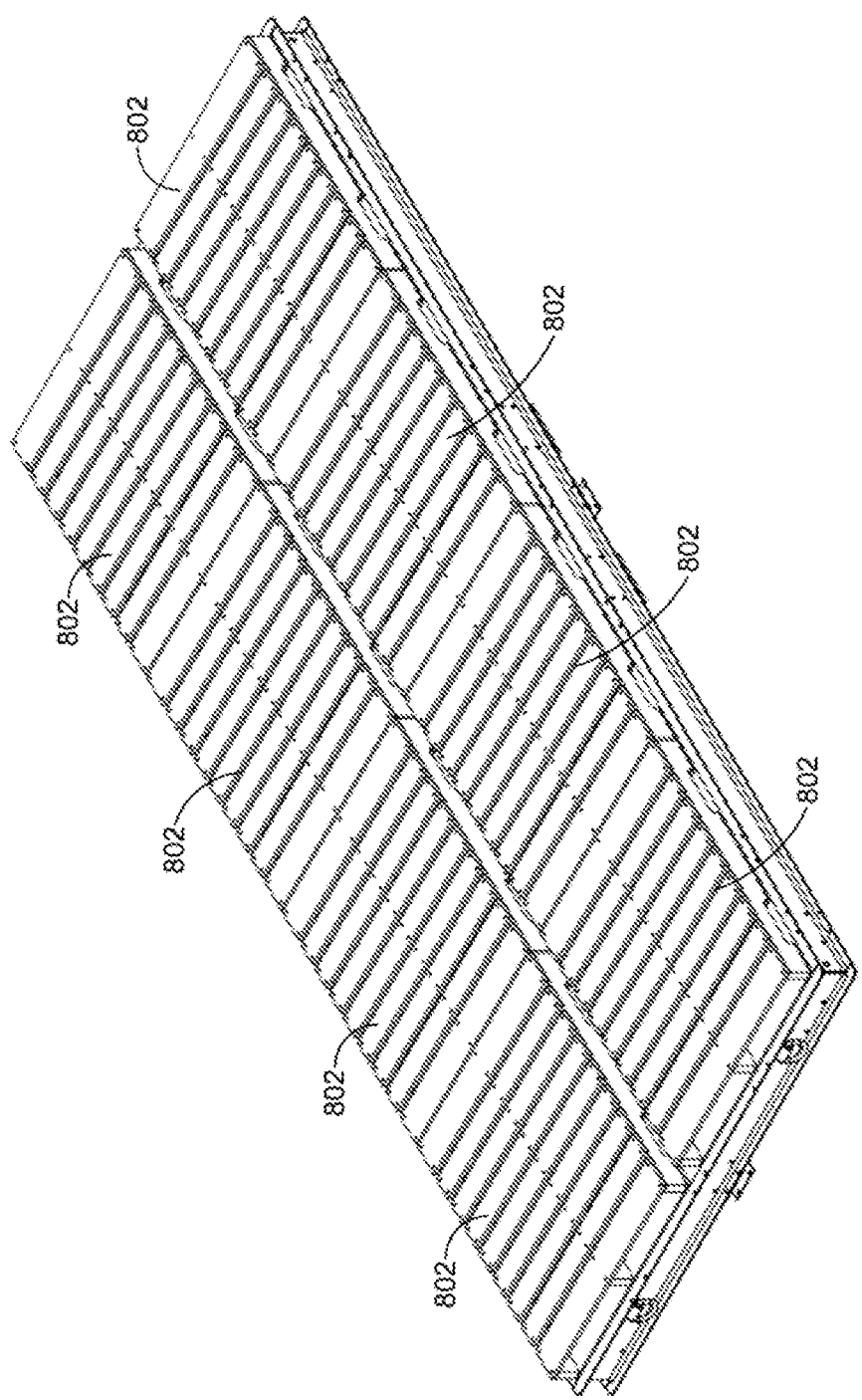
FIG. 8 illustrates a perspective view of an exemplary automated platform, according to one embodiment of the present disclosure.

As shown in FIG. 8, a perspective view of an exemplary automated platform 100 is shown, according to one embodiment of the present disclosure. In various embodiments, the automated platform 100 may hold one or more pallets 802 on top surface 102 of the automated platform 100. In some embodiments, depending on the size of the automated platform 100 and the size of the one or more pallets 802, the automated platform 100 may hold a wide range of one or more pallets 802 (e.g., 1 pallet, 10 pallets, 30 pallets, etc.). In at least one embodiment, the automated platform 100 may hold as many one or more pallets 802 as possible until the maximum weight capacity of the automated platform 100 is reached. For example, in one embodiment, as shown in FIG. 8, an automated platform 100 may hold eight pallets 802.

Figure 9A:
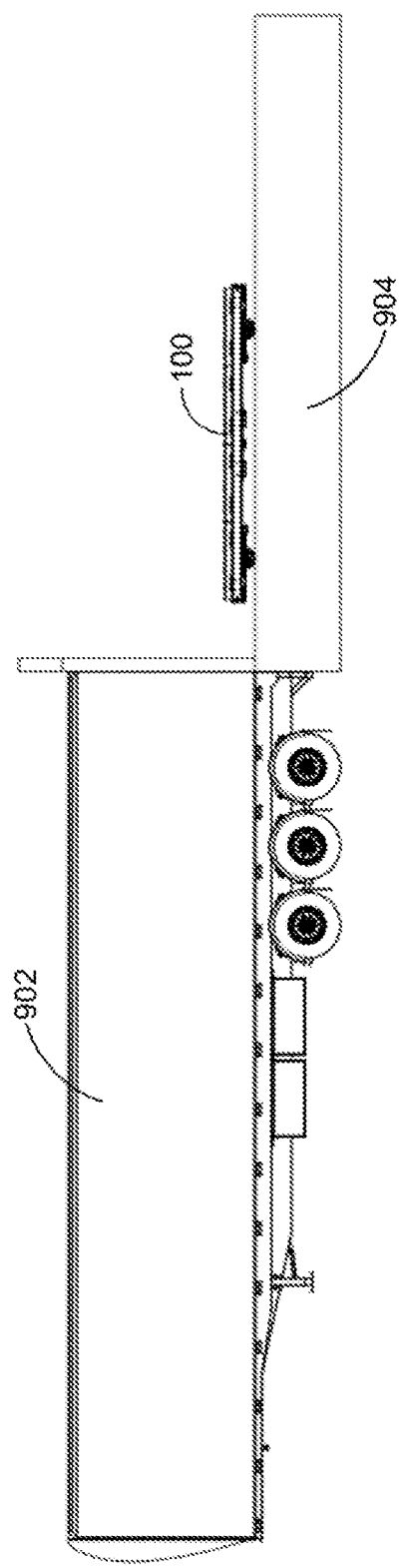
FIG. 9A illustrates a side view of an exemplary automated platform in the process of loading onto a trailer, according to one embodiment of the present disclosure.

As shown in FIG. 9A, a side view 900 of an exemplary automated platform 100 in the process of loading onto a trailer 902 is shown, according to one embodiment of the present disclosure. In several embodiments, the trailer 902 may be at a loading dock 904. In one or more embodiments, the automated platform 100 may detect the trailer 902 and a dock leveler (not shown) if present, and autonomously move towards and into the trailer 902.

Figure 9B:
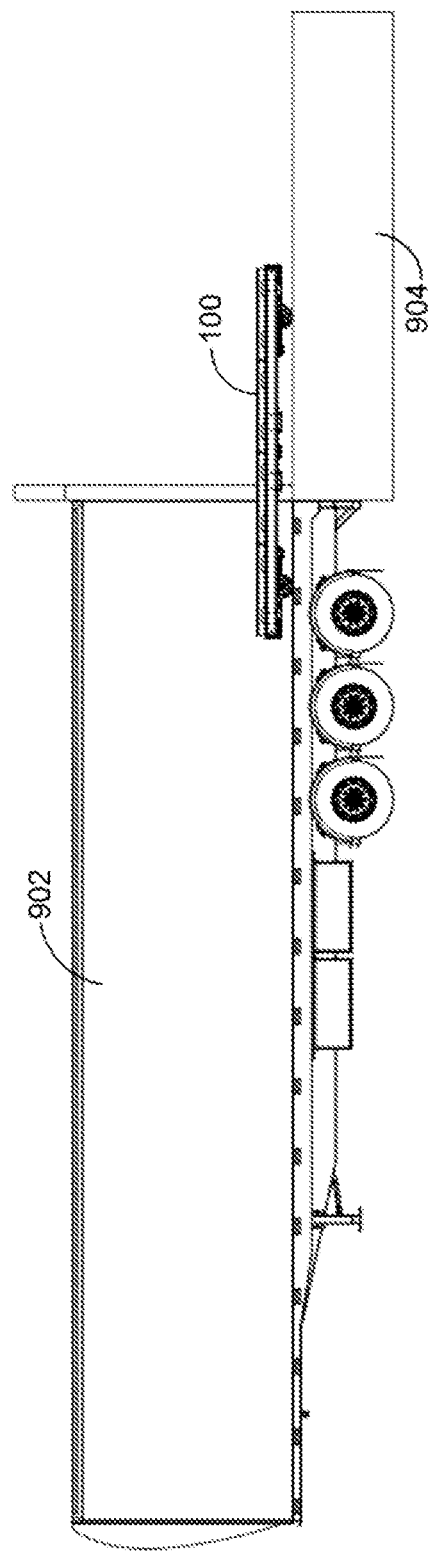
FIG. 9B illustrates a side view of an exemplary automated platform in the process of loading onto a trailer, according to one embodiment of the present disclosure.

As shown in FIG. 9B, a side view 900 of an exemplary automated platform 100 in the process of loading onto a trailer 902 is shown, according to one embodiment of the present disclosure. In many embodiments, as shown in FIG. 9B, the automated platform 100 is about halfway inside the trailer 902 and halfway on the loading dock 904.

Figure 9C:
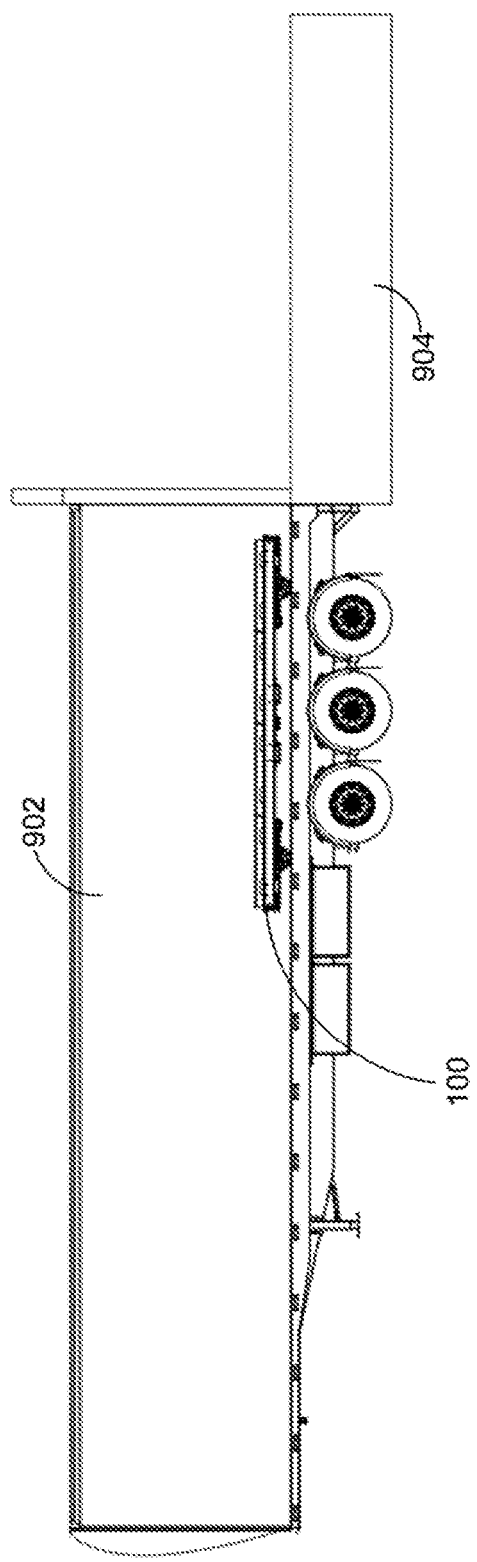
FIG. 9C illustrates a side view of an exemplary automated platform in the process of loading onto a trailer, according to one embodiment of the present disclosure.

As shown in FIG. 9C, a side view 900 of an exemplary automated platform 100 in the process of loading onto a trailer 902, according to one embodiment of the present disclosure. In one or more embodiments, as shown in FIG. 9C, the automated platform 100 is completely inside the trailer 902. In some embodiments, if multiple automated platforms 100 are being loaded into a trailer 902, the multiple automated platforms 100 may utilize the one or more sensors to determine the distance between the automated platforms 100 and the trailer walls and determine the distance between each of the automated platforms 100 so that the multiple automated platforms 100 may be loaded safely and without bumping or hitting the walls of the trailer 902 or the other automated platforms 100.

Figure 10A:
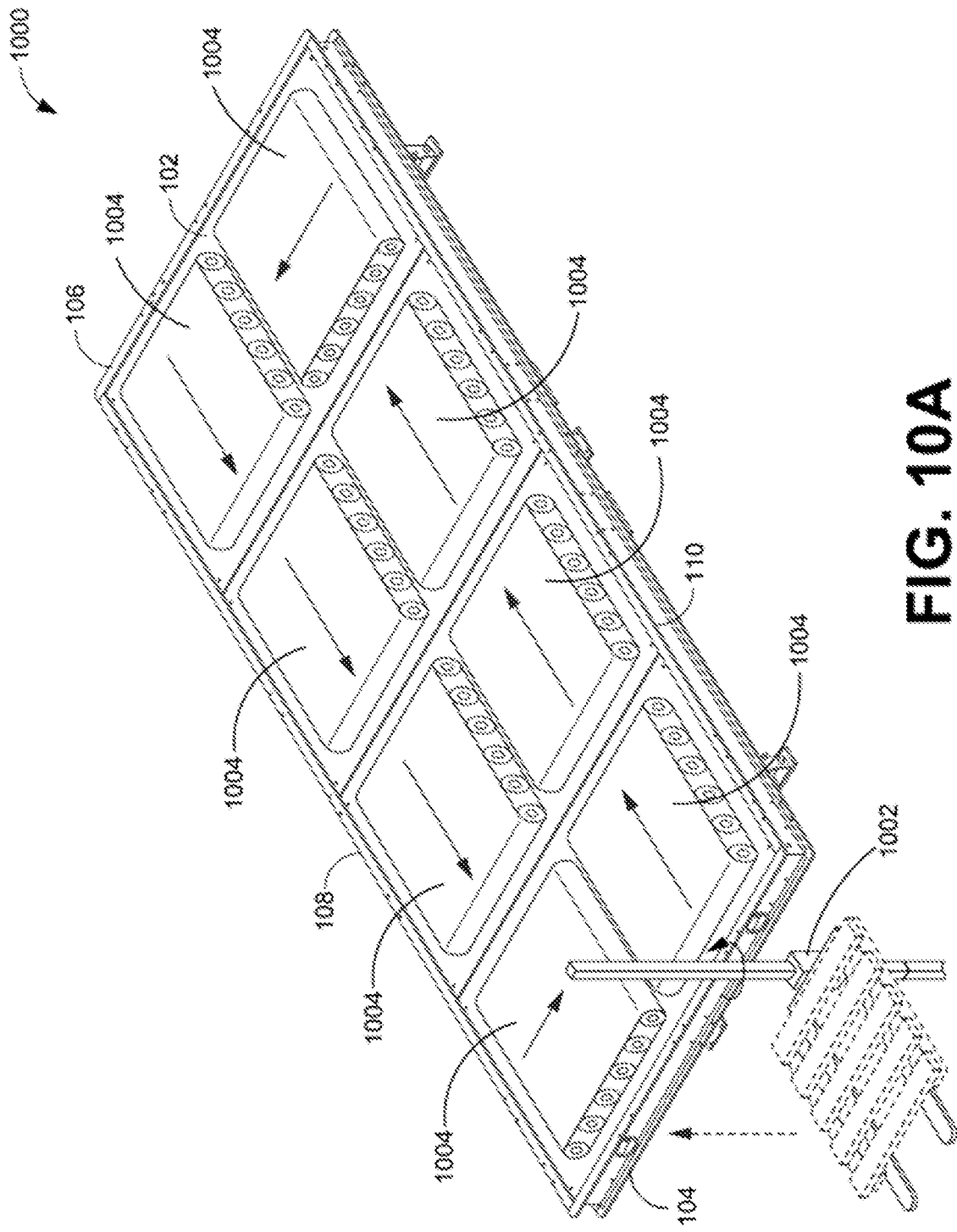
FIG. 10A illustrates a perspective view of an exemplary automated platform, according to one embodiment of the present disclosure.

As shown in FIG. 10A, a perspective view of an exemplary automated platform 1000 is shown, according to one embodiment of the present disclosure. In various embodiments, automated platform 1000 includes the top surface 102, a front side 104, a back side 106, and sides 108 and 110 (e.g., same or similar as automated platform 100). In several embodiments, the automated platform 1000 may also include a forklift 1002 operatively connected to the automated platform 1000 and/or conveyor belts 1004. In some embodiments, as shown in FIG. 10A, the forklift 1002 may be affixed to the perimeter surface. In at least one embodiment, the automated platform 1000 may include a track system (not shown) connected to the perimeter surface so that the forklift 1002 is not operatively connected at a fixed location on the automated platform 1000, but instead is attached to the track system so that the forklift 1002 can move around the perimeter surface of the automated platform 1000.

In multiple embodiments, the forklift 1002 may include components that allow the forklift 1002 to lift a pallet onto the automated platform 1000. In some embodiments, the components of the forklift 1002 may include forks, a support structure for guiding and supporting the forks during the lifting process, and a power system to provide the forklift 1002 with power to lift the pallet (e.g., a hydraulic system, motor system, etc.).

In several embodiments, the automated platform 1000 may utilize one or more sensors (e.g., 3D cameras, LiDAR, etc.) to maneuver the automated platform 1000 so that the forks of the forklift 1002 enter underneath a pallet. In one or more embodiments, the automated platform 1000 may determine, via one or more sensors that the forks of the forklift 1002 are properly placed underneath a pallet before lifting the pallet. In some embodiments, as the forklift 1002 lifts the pallet over the top surface 102 of the automated platform 1000, the forks rotate 180 degrees so that the pallet is directly over the automated platform 1000.

In various embodiments, the automated platform 1000 may also include conveyor belts 1004 affixed or operatively connected to the top surface 102. In many embodiments, as shown in FIG. 10A, the conveyor belts 1004 may be a series of separated conveyor belts 1004 that can move a pallet to a particular location on the automated platform 1000. In some embodiments, the conveyor belts 1004 may be programmed to only move in one direction (as shown by the arrows on each of the conveyor belts 1004 in FIGS. 10A and 10B), or the conveyor belts 1004 may be able to switch direction of movement in any direction (e.g., forward, backwards, sideways). In other embodiments, the conveyor belt 1004 may be a continuous, singular conveyor belt 1004. In other embodiments, the conveyor belt may be a single gravity conveyor or two separate gravity conveyors that are permanently angled in one direction or can be adjusted to different angles using a pneumatic actuator, hydraulic actuator, electronic actuator, or any other actuation system.

Figure 10B:
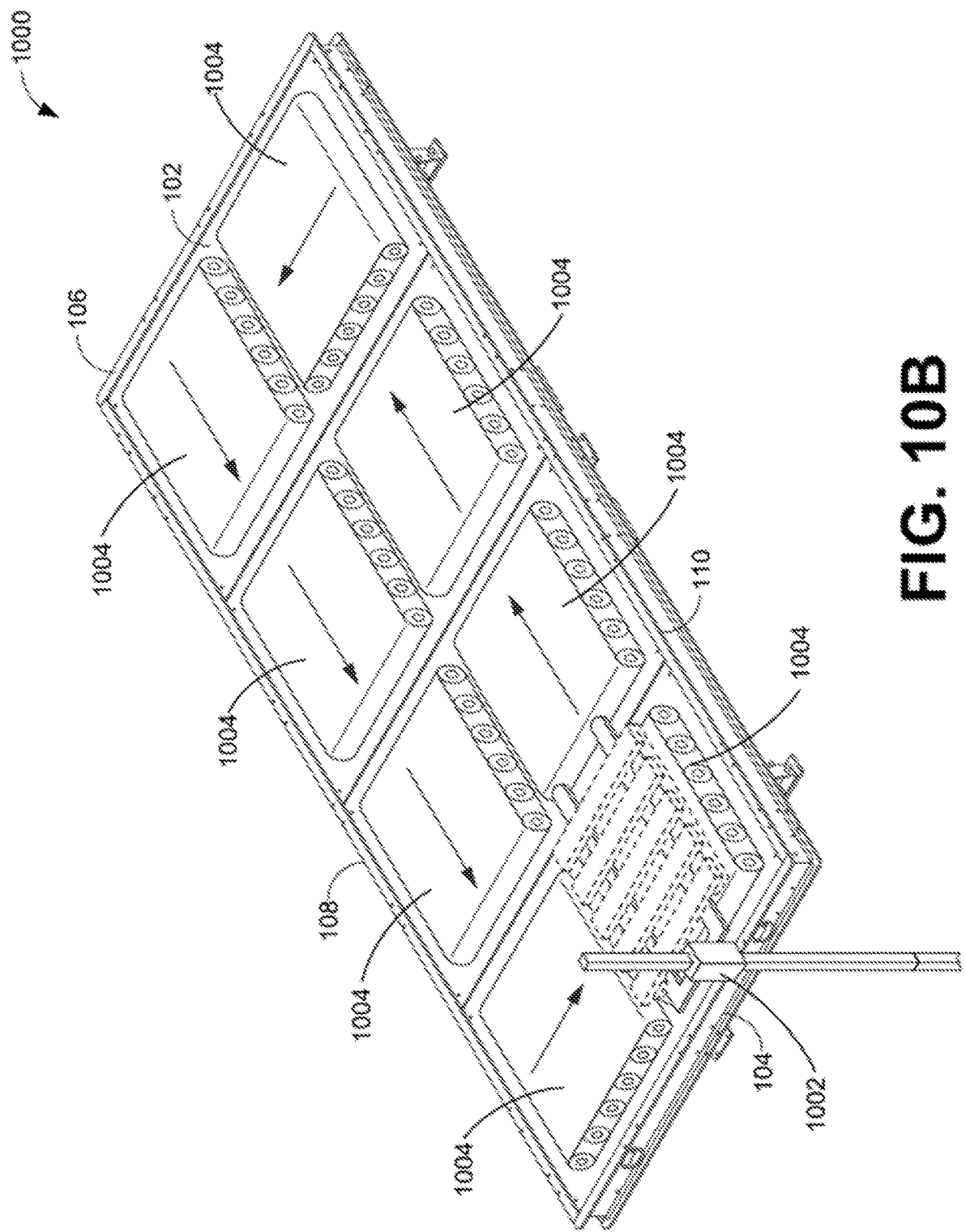
FIG. 10B illustrates a perspective view of an exemplary automated platform, according to one embodiment of the present disclosure.

In many embodiments, the conveyor belts 1004 (as shown in FIGS. 10A and 10B) may be individually powered on or off to move a loaded pallet to a certain location on the automated platform 1000. In some embodiments, the automated platform 1000 may receive a pallet at a designated conveyor belt 1004 and cause the pallet to be moved to a certain location. In one or more embodiments, the automated platform 1000 may utilize the weight sensors in the wheel module 302 to determine if a pallet has been moved to the certain location. In at least one embodiment, the automated platform 1000 may utilize patterns to load pallets onto the conveyor belts 1004. For example, in one embodiment, as shown in FIGS. 10A and 10B, a pallet may be loaded onto a first conveyor belt 1004, and the automated platform may cause the pallet to be moved via the conveyor belts 1004 in a circular pattern. In certain embodiments, the automated platform 1000 may utilize weight sensing to move pallets around the conveyor belts 1004 so that the weight of the pallets is distributed evenly across the automated platform 1000. In at least one embodiment, when the forklift 1002 has loaded the last pallet onto the conveyor belts 1004, if the automated platform 1000 is fully loaded (e.g., maximum amount of pallets loaded onto the automated platform 1000), the automated platform 1000 may not cause the conveyor belts 1004 to move, so that the last pallet stays on the forks of the forklift 1002.

In several embodiments, to unload the automated platform 1000, the automated platform 1000 may cause the conveyor belts 1004 to maneuver the pallets in such a way that the pallets are moved onto the forks of the forklift 1002. In some embodiments, the automated platform 1000 may cause the conveyor belts 1004 to move in the opposite direction from the loading process, so that the pallets may be maneuvered onto the forks of the forklift 1002.

As shown in FIG. 10B, a perspective view of an exemplary automated platform 1000 is shown, according to one embodiment of the present disclosure. In multiple embodiments, as shown in FIG. 10B, the forklift 1002 has lifted a pallet from the ground, rotated 180 degrees, and placed the pallet on a first conveyor belt 1004.

Figure 11A:
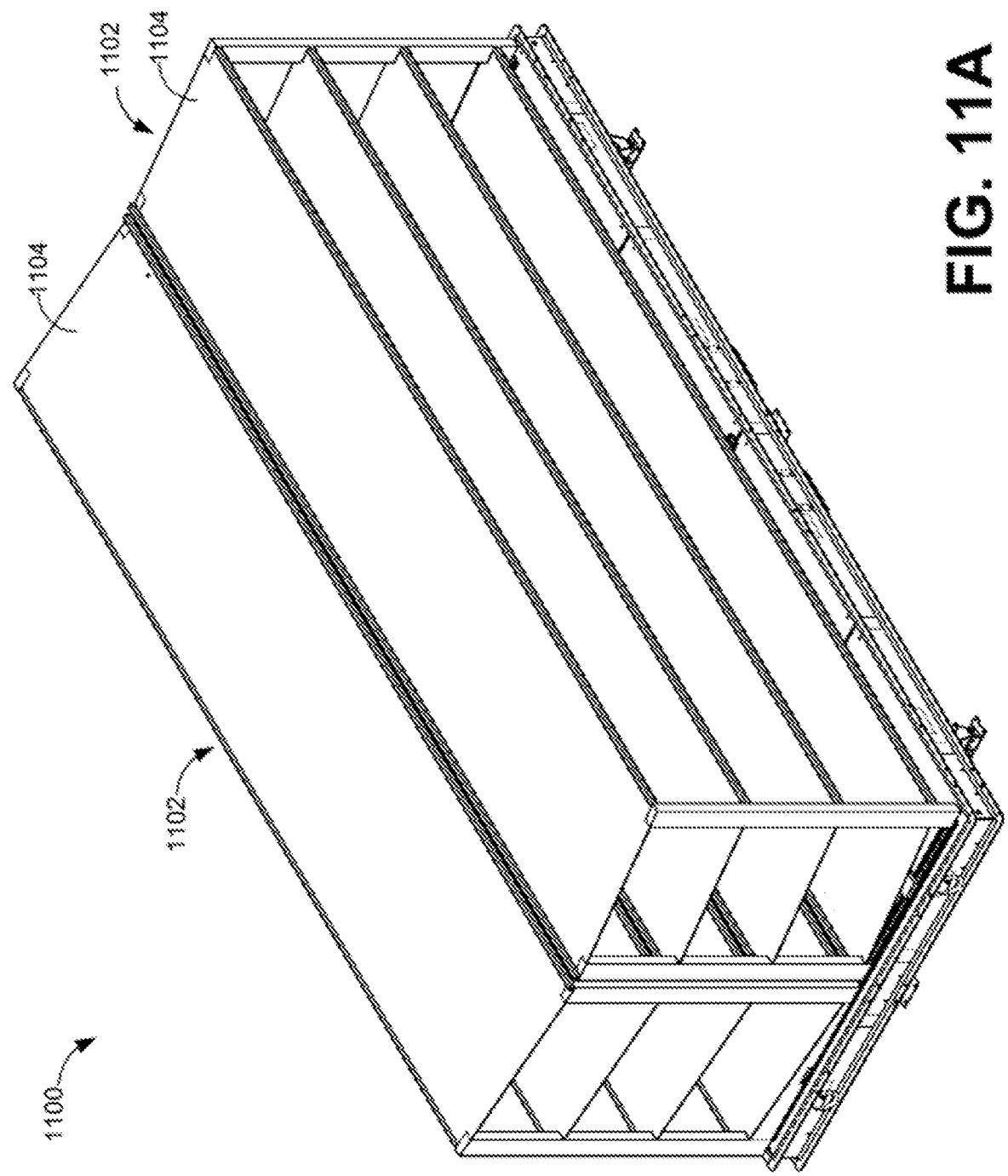
FIG. 11A illustrates a perspective view of an exemplary automated platform, according to one embodiment of the present disclosure.

As shown in FIG. 11A, a perspective view of an exemplary automated platform 1100 is shown, according to one embodiment of the present disclosure. In various embodiments, the automated platform 1100 may include some or all of the components of automated platform 100, and additionally include one or more shelving units 1102 and a central portion. In one or more embodiments, the central portion of the automated platform 1100 may be defined as an area about halfway across the width of the automated platform 1100. In certain embodiments, the central portion of the automated platform 1100 may be the same or substantially similar to the central walking aisle 1106 (see FIG. 11B). In one embodiment, the one or more shelving units 1102 may include one or more shelves 1104. In some embodiments, automated platform 1100 may be utilized in trailers or package delivery vehicles (e.g., local delivery vans, large delivery trailers, etc. that are utilized by mail carriers such as UPS, FedEx, Amazon, etc.). In at least one embodiment, the shelving units 1102, in a first position (e.g., unactuated state), are within the boundaries of the platform surface such that the shelving units 1102 or a portion of each of the shelving units 1102 are located at the central portion of the automated platform 1100. In one embodiment, as shown in FIG. 11A, the shelving units 1102 are in the first position.

In one or more embodiments, the shelving units 1102 may be loaded with various goods and/or parcels, and automated platform 1100 may move into a package delivery vehicle via a rear door (e.g., in the same process as described herein for automated platform 100 moving inside a trailer). In many embodiments, once the automated platform 1100 is inside the package delivery vehicle, the automated platform 1100 may cause the shelving units 1102 to actuate out (e.g., translate towards) to the side walls of the package delivery vehicle to a second position, forming a central walking aisle 1106 (see FIG. 11B). In several embodiments, the automated platform 1100, via an actuating system, may cause the shelving units to translate from the first position away from the central portion of the automated platform 1100 to the second position. In some embodiments, the actuating system may be a hydraulic system, a motor unit, a spring system, or any other type of system that may cause the shelving units 1102 to move towards the side walls of the package delivery vehicle.

In certain embodiments, the automated platform 1100 may include tracks 1108 to guide the shelving units 1102 as the shelving units 1102 are moved towards the side walls of the package delivery vehicle. In many embodiments, once the shelving units 1102 are extended to the side walls of the package delivery vehicle (e.g., the shelving units 1102 are at the second position), each shelving unit 1102 may be locked into place by a locking mechanism. In one embodiment, the locking mechanism may be a mechanical system that provides assistance to the coupling and uncoupling of each shelving unit 1102 to the package delivery vehicle and fixing in place the shelving units 1102 when in operation. In one or more embodiments, the locking mechanisms may be located on the side walls or floor or ceiling of the package delivery vehicle. In at least one embodiment, the locking mechanisms may be a magnetic system (e.g., a magnet on the wall and a magnet on a shelving unit 1102) such that the automated platform 1100 may cause the magnet on the shelving units 1102 to be active or inactive (e.g., when active, the magnets on the shelving units 1102 and on the walls pull towards each other, locking the shelving units 1102 in place).

Figure 11B:
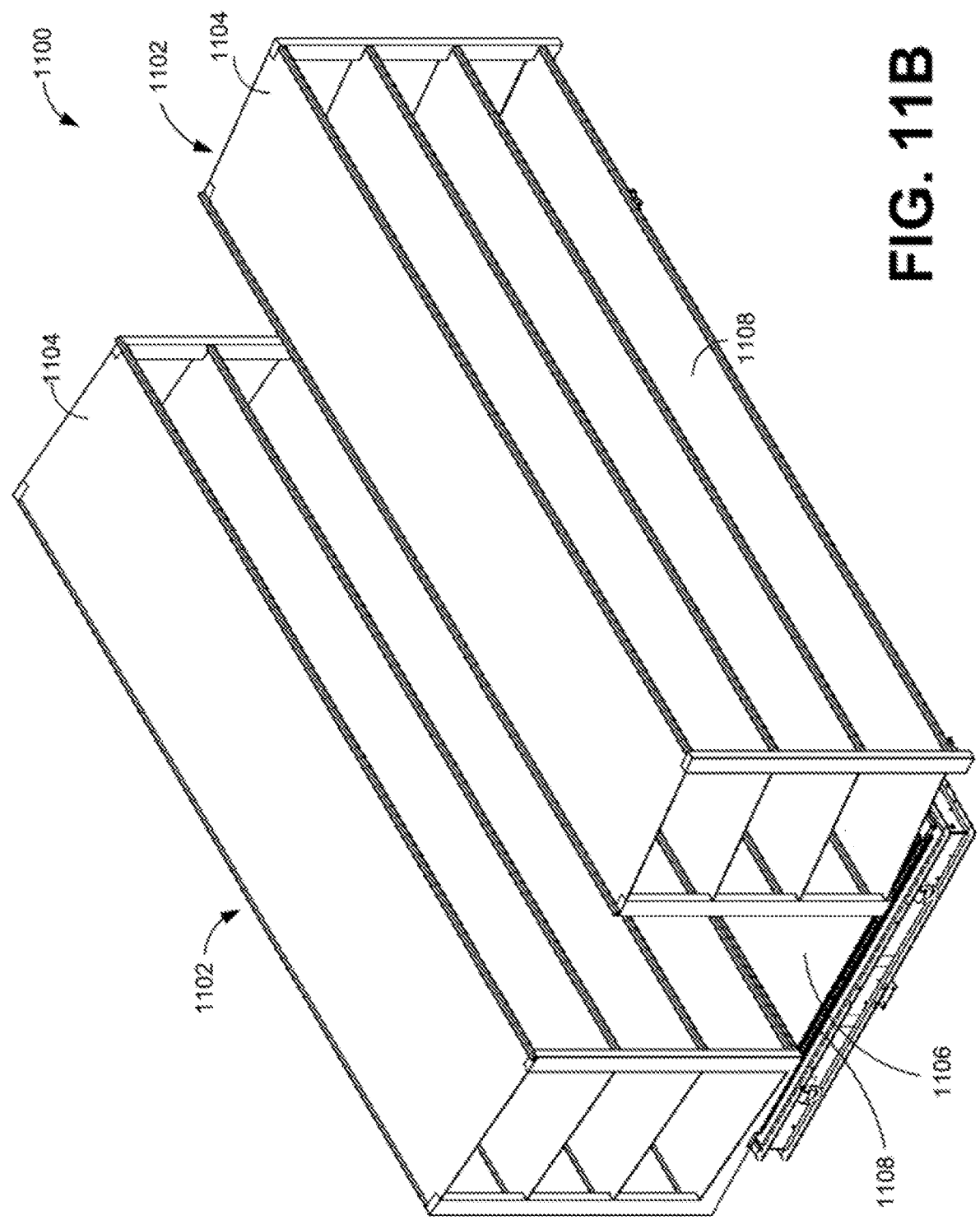
FIG. 11B illustrates a perspective view of an exemplary automated platform, according to one embodiment of the present disclosure.

As shown in FIG. 11B, a perspective view of an exemplary automated platform 1100 is shown, according to one embodiment of the present disclosure. In one embodiment, as shown in FIG. 11B, the shelving units 1102 are in the second position. In several embodiments, the automated platform 1100 has caused the shelving units 1102 to translate out (e.g., extend outwardly from the central portion) such that the central walking aisle 1106 is formed. In many embodiments, when the automated platform 1100 receives a command to unload, the automated platform 1100 may cause the locking mechanism to unlock, cause the shelving units 1102 to translate from the second position towards the central portion of the automated platform 1100 (e.g., the first position), and move out of the package delivery vehicle. In one embodiment, the automated platform 1100 may utilize one or more sensors as described herein to detect obstacles and to calculate a travel path.

In multiple embodiments, the automated platform 1100 may be sized such that the width, length, and height of the automated platform 1100 may fit inside the rear door of a package delivery vehicle. For example, in one or more embodiments, an automated platform 1100 with shelving units 1102 may be loaded with parcels or goods, and when the package delivery vehicle is at the loading dock, the automated platform 1100 may move from the loading dock into the rear access of the package delivery vehicle. In some embodiments, the automated platform 1100 may move up or down a ramp or dock leveler to move inside or out of the package delivery vehicle. In one embodiment, the automated platform 1100 and the shelving units 1102 may have a combined height between 2 feet and 15 feet (e.g., 5 feet, 7 feet, or 12 feet). In many embodiments, the width of an automated platform 1100 in the first position (e.g., shelving units 1102 have not been actuated outwards) may be within between 2 and 8.5 feet (e.g., 2 feet, 4 feet, 5 feet, 8.5 feet, etc.). In at least on embodiment, the shelving units 1102 in the second position may be up to 12 feet apart (e.g., if the trailer walls are 12 feet apart, the shelving units 1102 may translate so that each shelving unit 1102 is proximate to opposing trailer walls).

Figure 12:
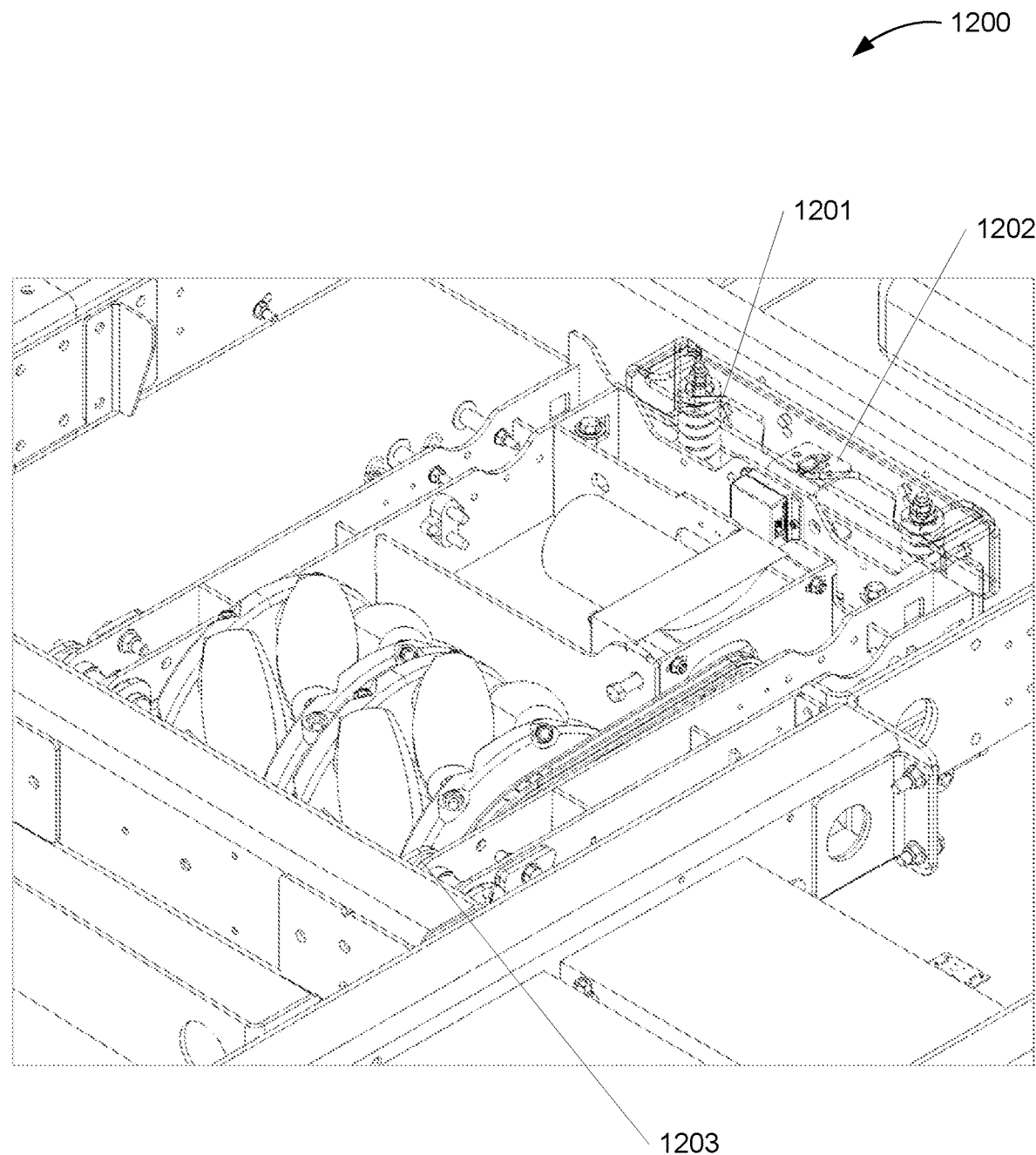
FIG. 12 illustrates a perspective view of a weight sensing suspension, according to one embodiment of the present disclosure.

As shown in FIG. 12, illustrated is a perspective view of a weight sensing suspension 1200, according to one embodiment of the present disclosure. In some embodiments, the weight sensing suspension 1200 can include suspension springs 1201, a distance sensor 1202, and chassis hinge attachments 1203. In at least one embodiment, the weight sensing suspension 1200 of the automated platform 100 can measure various weight and movement specific characteristics of the automated platform 100. In particular embodiments, the chassis hinge attachment 1203 facilitates a rigid connection between the wheel module 302 and the chassis of the automated platform 100, while still providing movement capabilities for the weight sensing suspension 1200. In certain embodiments, the electrical control system can receive data from the distance sensor 1202 and/or any other particular sensor of the weight sensing suspension 1200 to calculate and analyze specific characteristics of the payload and/or the automated platform 100. In various embodiments, the weight sensing suspension 1200 can include other sensors, such as an IMU, a 3D camera, and/or an infrared sensor to determine characteristics associated with the automated platform 100.

In certain embodiments, at a first end of the suspension springs 1201, the suspension springs 1201 attach to a non-moving, rigid position on the automated platform 100. In some embodiments, at an opposite end of the first end of the suspension springs 1201, the suspension springs 1201 attach to a movable top plate that can deflect vertically and horizontally. In some embodiments, the suspension springs 1201 can withstand the compression of at least 15,000 pounds, 15,000-20,000 pounds, or less than 20,000 pounds, as non-limiting examples. The electrical control system may include saved data on the known length and spring constant values of the suspension springs 1201.

In at least one embodiment, the distance sensor 1202 is attached to the non-moving, rigid position on the automated platform 100. In some embodiments, the distance sensor 1202 may include a time-of-flight based laser range finder, an ultrasonic sensor, an infrared (IR) sensor, and/or any particular sensor that measures a change in distance. In one or more embodiments, the distance sensor 1202 points in a direction of the top plate to measure the vertical deflection of the top plate. By measuring the vertical deflection of the top plate, the electrical control system can determine the compression distance in the suspension springs 1201 when the automated platform 100 carries a payload. For example, when the automated platform 100 does not carry a payload, the distance sensor 1202 may measure an expected or predetermined unloaded distance (e.g., a distance of 10 inches) to the top plate. Continuing this example, when the automated platform 100 carries a payload of 7,500 pounds, the distance sensor 1202 may measure a distance of 7.5 inches. Further continuing this example, the electrical control system may measure a compression of 2.5 inches in the suspension springs 1201, which can indicate a further increased load. In at least one embodiment, based on the compression of the suspension springs 1201, the electrical control system can determine the total mass of the payload, the applied downward force of the payload, and/or any other particular metric associated with the weight of a payload on the automated platform 100.

In at least one embodiment, the electrical control system can employ data produced by the IMUs to determine the angle configuration of the automated platform 100. For example, the electrical control system may extract data from the IMUs indicating that the automated platform is on a 7-degree inclined plane. Alternatively or in addition, the automated platform 100 can include one or more inclinometers for determining the angle configuration of the automated platform 100. In at least one embodiment, the electrical control system may combine the data from the IMUs and the distance sensors 1202 to determine accurate force distributions on the automated platform 100 corrected for the particular surface.

In some embodiments, each wheel module 302 may include its own independent weight sensing suspension 1200. The electrical control system may determine in real-time weight distributions across the surface of the automated platform 100. For example, the electrical control system can output an alarm or warning to a user or other recipient (e.g., loading personnel) that a corner of the automated platform 100 is sustaining too much weight. In at least one embodiment, the automated platform 100 may include a series of LED light distributed across the top surface to indicate areas that are sustaining too much weight. For example, a side with too much weight may have red LED lights active, while a side with green lights may indicate that the particular side may accept excess payload. In another example, the automated platform 100 may flash RED or glow RED when the payload exceeds a total weight.

In at least one embodiment, a series of automated platforms 100 may connect through a mesh network and distribute data associated with weight distributions of each particular automated platform 100. In some embodiments, the electrical control system of at least one automated platform 100 may determine the automated platform 100 carrying the most weight and the automated platform 100 carrying the least weight. Based on the determined weight distribution of each automated platform 100, the electrical control system may indicate which automated platform 100 should be loaded next, if an automated platform 100 is too full, if payloads should be more evenly distributed amongst automated platforms 100, and/or any other specific action associated with the series of automated platforms 100. The electrical control system may determine the ideal weight distribution of a trailer to maximize efficiencies during transportation. In some embodiments, based on the optimized weight distribution in a trailer, the automated platforms 100 may arrange themselves to best fit the desired weight distributions, orientations, and center of gravities.

In at least one embodiment, the electrical control system may determine the center of gravity of the payload based on data gathered by the weight sensing suspension 1200. In particular embodiments, the automated platform 100 may include distance sensors on each corner. In some embodiments, the electrical control system may determine the height of each corner relative to the ground to calculate weight distribution, ground structural integrity, obstacles, and/or any other particular metric based on the height of the automated platform 100 above the ground.

Figure 13:
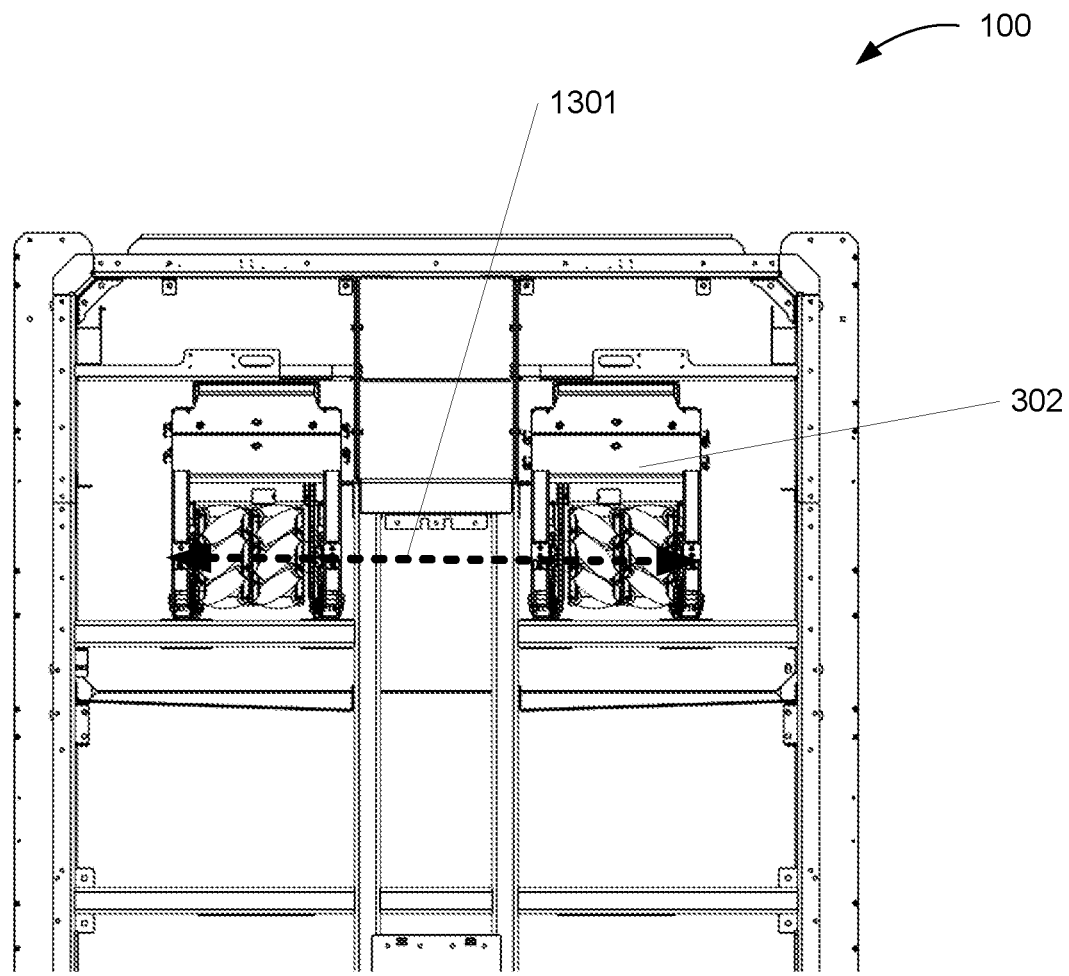
FIG. 13 illustrates an adjustable track width, according to one embodiment of the present disclosure.

As shown in FIG. 13, illustrated is a track width 1301, according to one embodiment of the present disclosure. In various embodiments, the automated platform 100 may include a track width 1301. In some embodiments, the track width 1301 measures the distance between two adjacent wheel modules 302. In one or more embodiments, the electrical control system can adjust the track width 1301 depending on the intended track of the automated platform 100. For example, the automated platform 100 may employ the LiDAR sensor(s) and/or the 3D camera(s) to determine the width of the particular encountered surface the automated platform 100 intends to progress over. Continuing this example, the electrical control system may automatically adjust the track width 1301 to traverse over the particular surface. In at least one embodiment, the track width 1301 may be at least 3 feet, 3-10 feet, 3-5 feet, 5 feet, 5-10 feet, 7 feet, or less than 10 feet, as non-limiting examples. In some embodiment, the automated platform 100 may include manual adjusting levers that allows a user to change the track width 1301 of the automated platform 100. For example, the track width 1301 may be set to 5 feet to traverse over a first ramp and adjusted to 7 feet to traverse over a second ramp. In particular embodiments, the track width 1301 is set during manufacturing and standardized for the automated platform 100. For example, the automated platform 100 may be manufactured with a non-adjustable track width 1301 set to at least 3 feet, 3-10 feet, 3-5 feet, 5 feet, 5-10 feet, 7 feet, or less than 10 feet, as non-limiting examples.

Figure 14:
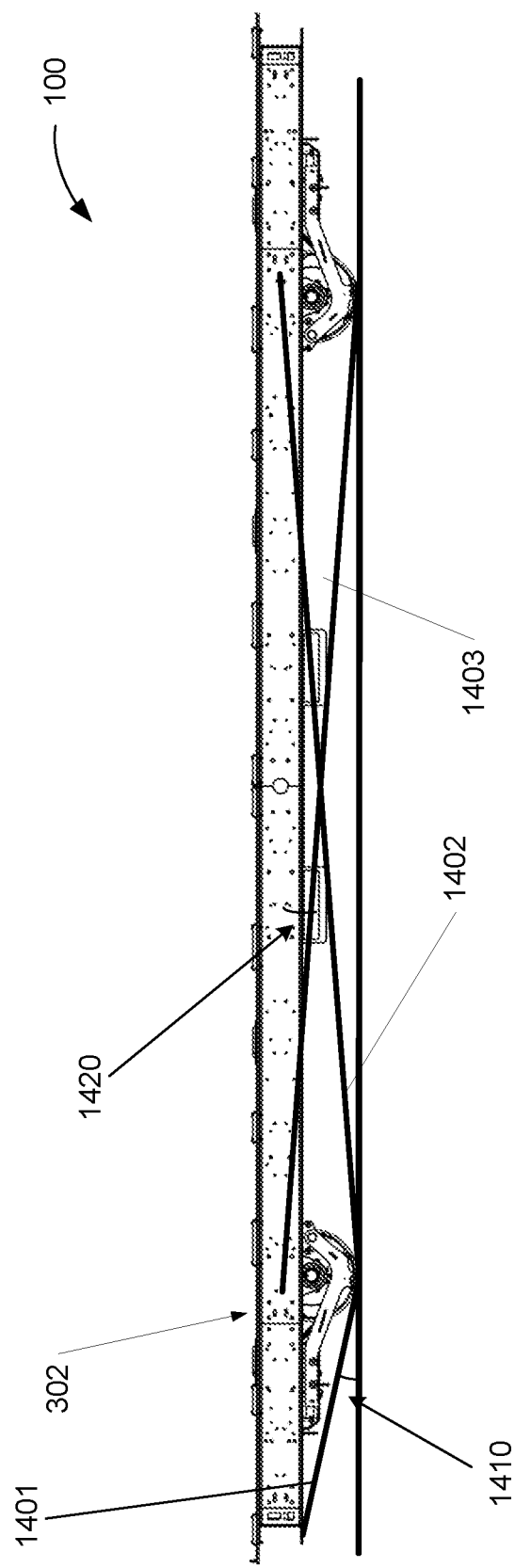
FIG. 14 illustrates a breakover and approach angle of an automated platform, according to one embodiment of the present disclosure.

As shown in FIG. 14, illustrated is a breakover angle and approach angle of the automated platform 100, according to one embodiment of the present disclosure. In various embodiments, the automated platform 100 can include a first guide line 1401, a second guide line 1402, and a third guide line 1403. The first guide line 1401 can be an imaginary line drawn between the bottom of the frontmost wheel(s) and the lowermost portion of the automated platform 100 (e.g., the lowermost portion of the chassis or any other component of the automated platform 100) located in the portion of the automated platform 100 that is between the frontmost wheel(s) and the front edge of the automated platform 100. The second guide line 1402 can be an imaginary line drawn between the bottom of the frontmost wheel(s) and the lowermost portion of the automated platform 100 (e.g., the lowermost portion of the chassis or any other component of the automated platform 100) located in the portion of the automated platform 100 that is between the frontmost wheel(s) and the center of the automated platform (and/or half the distance between the rearmost portion of the frontmost wheel(s) and the frontmost portion of the rearmost wheel (s)). The third guide line 1403 can be an imaginary line drawn between the bottom of the rearmost wheel(s) and the lowermost portion of the automated platform 100 (e.g., the lowermost portion of the chassis or any other component of the automated platform 100) located in the portion of the automated platform 100 that is between the center of the automated platform 100 (and/or half the distance between the rearmost portion of the frontmost wheel(s) and the frontmost portion of the rearmost wheel(s)) and the rearmost wheel(s) of the automated platform 100.

In some embodiments, for the automated platform 100 to traverse a variety of sloped surfaces, the components of the automated platform must be above the first guide line 1401 and the second guide line 1402.

In at least one embodiment, the angle formed between the ground and the first guide line 1401 can be defined as the approach angle 1410. In some embodiments, the approach angle 1410 may define the maximum slope the automated platform 100 may traverse onto. Stated otherwise, the approach angle addresses the ability of the automated platform 100 to overcome concave transitions and/or the most severe "valley" the automated platform 100 can pass over without running aground (e.g., becoming stuck at the front end of the automated platform 100). For example, for the automated platform 100 to traverse onto a sloped incline of 15 degrees, the approach angle 1410 may be greater than 15 degrees. In at least one embodiment, the approach angle 1410 can be at least approximately 2 degrees, at least approximately 5 degrees, between approximately 5 degrees and approximately 45 degrees, between approximately 5 degrees and approximately 25 degrees, between approximately 25 degrees and approximately 45 degrees, or less than approximately 45 degrees, as non-limiting examples.

In some embodiments, the acute angle formed between the intersection of the second guide line 1402 and the third guide line 1403 can be defined as the breakover angle 1420. In particular embodiments, the breakover angle defines the steepest edge transition the automated platform 100 may traverse onto. Stated otherwise, the breakover angle addresses the ability of the automated platform 100 to overcome convex transitions and/or the most severe "mountain" the automated platform 100 can pass over without high centering (e.g., becoming stuck at the middle portion of automated platform 100). For example, for the automated platform to transition from a 15-degree sloped surface to a flat surface, the breakover angle may be greater than 15 degrees. In at least one embodiment, the breakover angle can be any angle greater than 0 degrees, such as between approximately 0 degrees and approximately 5 degrees, between approximately 1 degree and approximately 10 degrees, least approximately 2 degrees, between approximately 2 degrees and approximately 8 degrees, between approximately 3 degrees and approximately 8 degrees, or less than approximately 9 degrees, as non-limiting examples. Other example breakover angles can be any angle less than 15 degrees.

Alternatively or in addition, the automated platform 100 can be assembled such that every portion of the automated platform 100 outside of predefined ground contact portions can have a minimum height relative to the ground (e.g., to ensure adequate ground clearance to provide the required breakover angle and/or approach angle). Predefined ground contact portions can be defined as portions or areas of the bottom of the automated platform 100 that include the wheel module 302 and the lifting legs 312. For example, each predefined ground contact portion can be a 1 foot by 1 foot area encompassing the wheel module 302 and the lifting legs 312. The minimum height can be approximately 2 inches, approximately 4 inches, in a range between approximately 2 inches and approximately 4 inches, or any other useful height.

In one or more embodiments, the wheel modules 302 can be configured to adjust the height 701 of the wheels (e.g., the height of the chassis relative to ground) to vary the approach and breakover angles of the automated platform 100. For example, the wheel module 302 can include a height adjustment system (e.g., via hydraulics, pneumatics, actuator/piston, rack and pinion, or the like) that can adjust the height 701 of the wheels. The height adjustment system can be based on the slope angle (e.g., as measured by the automated platform 100 or as already-known information) of the particular path of the automated platform 100. The height adjustment system can be part of (or an extension of) the fluid pressure system of the braking system 710, the lifting assembly 508, or any other actuating system discussed herein. Alternatively or in addition, the height adjustment system can be an altogether separate actuating system (e.g., fluid pressure or otherwise).

Figure 15:
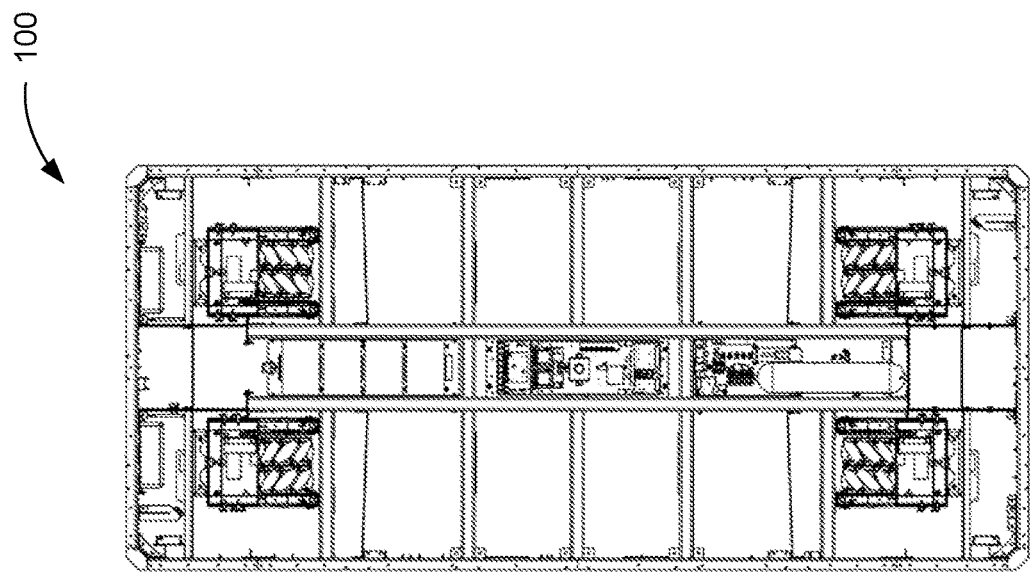
FIG. 15 illustrates a second automated platform and an automated platform, according to one embodiment of the present disclosure.
Figure 15:
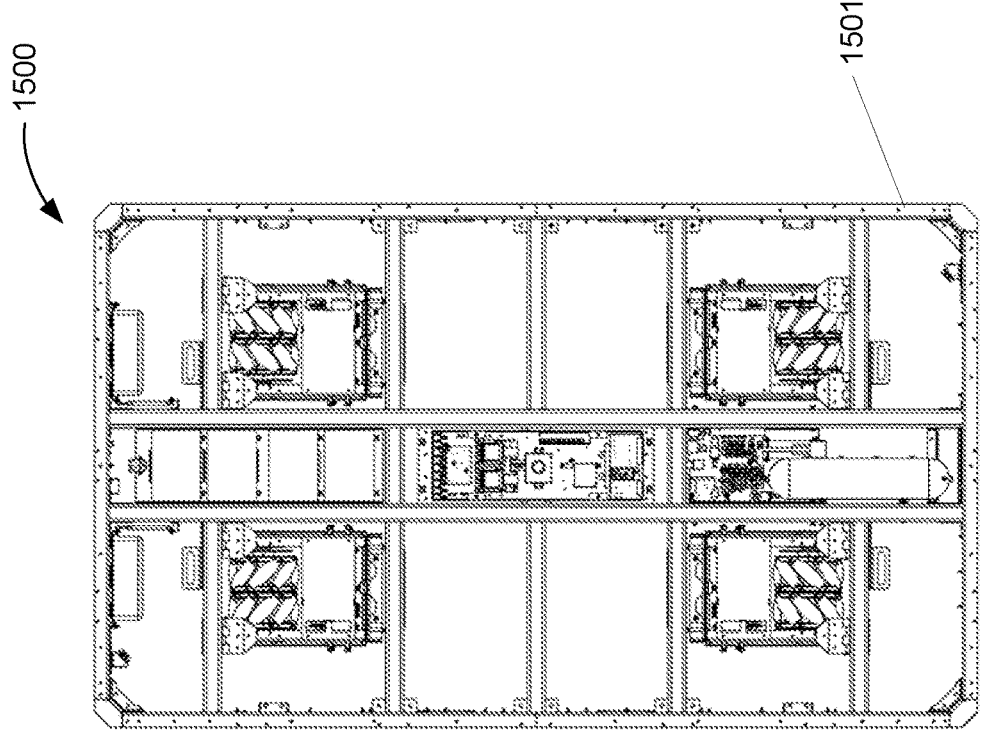

As shown in FIG. 15, illustrated is a second automated platform 1500 and the automated platform 100, according to one embodiment of the present disclosure. In one or more embodiments, the automated platforms 1500 and 100 may include a modular system. In various embodiments, the components of the automated platforms 1500 and 100 are interchangeable based on the particular needs of the tasks. In at least one embodiment, the second automated platform 1500 is substantially similar to the automated platform 100 with reduced length extensions 1501. In particular embodiments, the length extensions 1501 may reduce the length of the automated platform 100 at 16 feet to the length of the second automated platform to 12 feet. In one or more embodiments, the length of the automated platform 100 can be varied to at least approximately 10.0 feet, between approximately 10.0 feet and approximately 20.0 feet, between approximately 10.0 feet and approximately 15.0 feet, between approximately 15.0 feet and approximately 20.0 feet, approximately 16.667 feet, and/or less than approximately 20 feet, as non-limiting examples. For example, an automated platform 100 with a length of approximately 16.667 feet can fit five 40"×48" pallets (e.g., 5 pallets*40 inches/12=16 667 feet). In some embodiments, the length extensions may reduce or increase the size of the automated platform 100 to fit the requirements of the transportation task. In at least one embodiment, the length extensions 1501 are attached to the chassis using bolts, screws, and/or any other appending technique. The wheel modules 302 may be moved to accommodate for changing length extensions 1501 and to maintain proper approach and breakover angles.

Figure 16A:
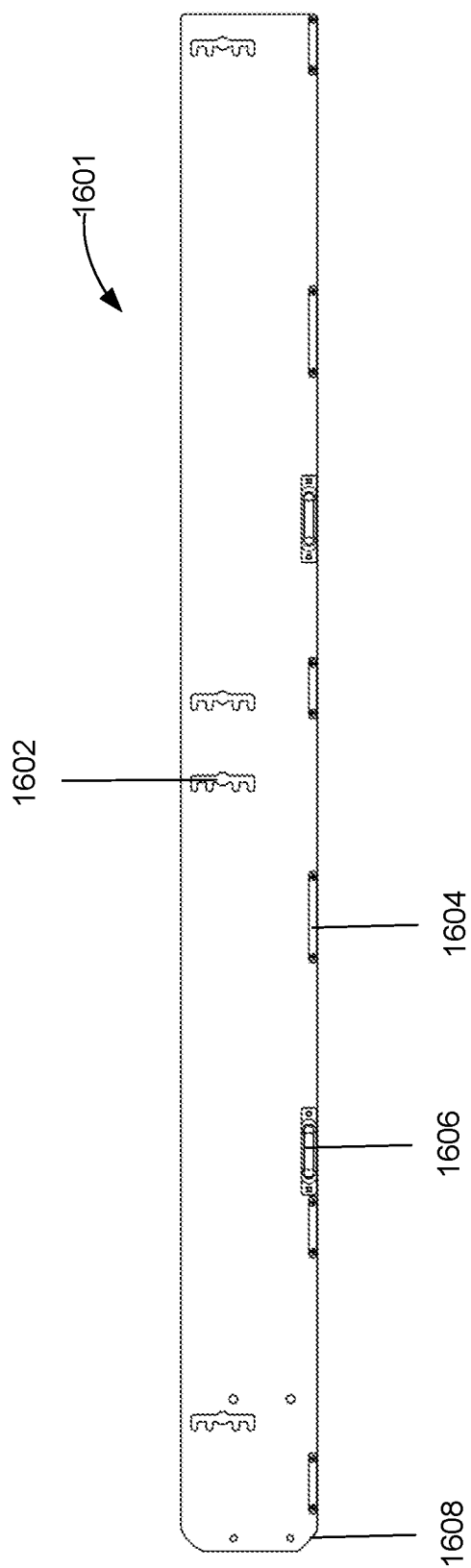
FIG. 16A illustrates an edge extension, according to one embodiment of the present disclosure.

As shown in FIG. 16A, illustrated are edge extensions 1601, according to one embodiment of the present disclosure. In various embodiments, the automated platform 100 may include edge extensions 1601. In some embodiments, the edge extensions 1601 may extend outward from the surface of the automated platform 100 to increase the surface area and width of the automated platform 100. As a non-limiting example, the edge extensions 1601 can be slideably attached to the top surface of the chassis (or any other portion of the automated platform 100) and can selectively slide outwardly away from the chassis to an extended position and slide inwardly toward the center of the chassis to a retracted position. In at least one embodiment, the edge extensions 1601 are placed above the surface of the automated platform 100. The edge extensions 1601 may secure onto the automated platform by bolting, screwing, interlocking, and/or any particular appending technique that can withstand the weight of a particular payload. In some embodiments, the edge extensions 1601 can be made of a material having a coefficient of friction of approximately 0.29 to approximately 1 (e.g., between the surface of the edge extension 1601 and the most slippery packaging material encountered during normal use (e.g., a hard plastic pallet). For example, the edge extensions 1601 can be made of the same materials as the automated platform 100 and be coated with a high-friction coating material. For example, the high coefficient of friction can allow for a payload to be secured on the automated platform 100 without any additional strapping. In certain embodiments, the edge extensions 1601 are removable to reduce the overall weight of the automated platform 100. In one or more embodiments, the edge extensions 1601 can be manually adjusted by loosening the locking mechanism of the edge extensions 1601 (e.g., bolts), moving the edge extensions 1601 outwardly from the automated platform 100, and retightening the locking mechanisms of the edge extensions 1601. The edge extensions 1601 can include connection points 1602 used to connect the edge extensions 1601 to the chassis.

In at least one embodiment, the edge extensions 1601 can be automatically extended using an extension actuation system. For example, the automated platform 100 may include an extension actuation system that dynamically and automatically extends or retracts the edge extensions 1601 based on commands from the electrical control system. As non-limiting examples, the extension actuation system can include an actuator (e.g., hydraulic, pneumatic), a rack and pinion, and/or the like, which can be configured to selectively extend and retract one or more corresponding edge extensions 1601.

In some embodiments, the automated platform 100 can employ one or more sensors to determine the necessary extension of the edge extensions 1601. For example, the automated platform 100 may use proximity sensors, LiDAR sensors, and/or any appropriate sensor to measure the distance between the edge extensions 1601 and objects surrounding the automated platform 100. Such sensors can be the same sensor(s) discussed elsewhere herein. Alternatively, such sensors can be separate and distinct from the various other sensors discussed elsewhere herein. In one or more embodiments, the automated platform 100 may automatically reduce the extension of the edge extensions 1601 if the sensors produce readings that indicate the automated platform 100 will make contact with a surrounding obstacle. In particular embodiments, the automated platform 100 may relay a message to the distribution company indicating that the edge extensions 1601 need reduction based on the measured path the automated platform 100 plans to traverse. In various embodiments, the edge extensions 1601 can be automatically and/or manually extended (e.g., if the onboard sensors and the electrical control system determine that there's adequate space to extend the edge extensions 1601) or retracted.

The edge extensions 1601 can include one or more lips 1604. The lips 1604 can be located on the edge of the edge extensions 1601. The lips 1604 can be a continuous raised edge located on the outermost portion of the edge extension 1061 used to prevent cargo from sliding off of the automated platform 100 while loading, unloading, or transport. The lips 1604 can include breaks at strategic positions such that forks can avoid the lips 1604 while moving payloads onto the automated platform 100. The lips 1604 can have varying heights based on the payload (e.g., 12 inches or less). The edge extensions 1601 can include E-track receivers 1606. The E-track receivers 1606 can be any receiver capable of receiving an E-track for securing a payload to the automated platform 100. The edge extensions 1601 can include one or more chamfers 1608 located at the corners of the edge extensions 1601. The chamfers 1608 can be a rounded, beveled, or diagonal cut at the corners of the edge extensions 1601. For example, the chamfers 1608 can refer to a tapered edge (e.g., a variable width that increases front to back). The chamfers 1608 can allow for glancing contact between the automated platform 100 and any opening through which the automated platform 100 is navigating. For example, the chamfers 1608 can allow for the edge of the automated platform 100 to slide past trailer doors. For example, a trailer door can have an opening that is 99 inches wide. The automated platform 100 can include the edge extensions 1601, which can expand the total width of the automated platform 100 to be 99 inches. If the automated platform 100 is not centered when entering the opening, the chamfers 1608 can allow for the edge of the automated platform 100 to have glancing contact with the trailer doors.

Figure 16B:
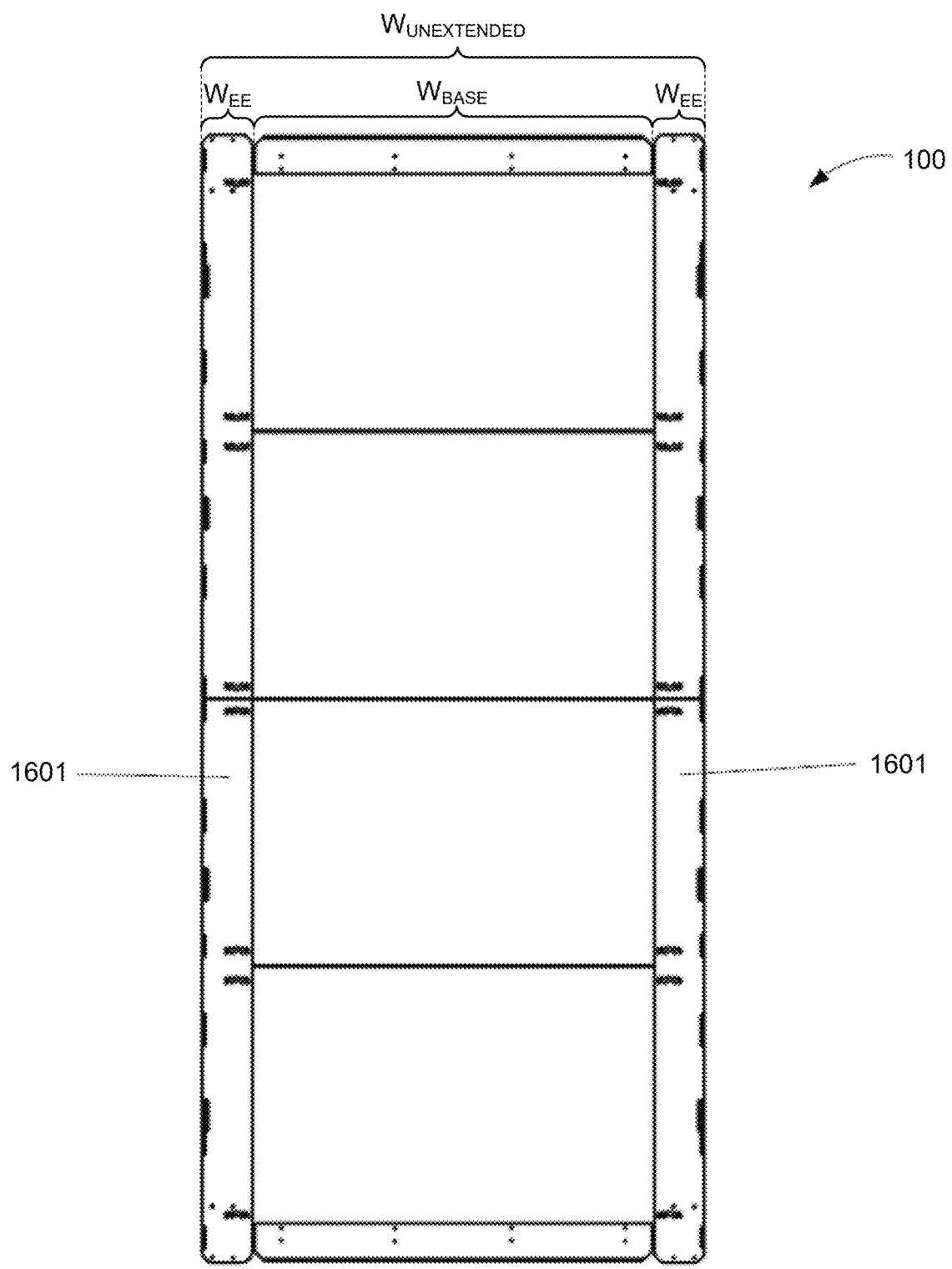
FIG. 16B illustrates a top view of edge extensions in a retracted position, according to one embodiment of the present disclosure.

As shown in FIG. 16B, illustrated are edge extensions 1601 in a retracted position on the automated platform 100. In at least one embodiment, the edge extensions 1601 may retract such that the edge extensions 1601 do not extend over the edge of the automated platform 100.

Figure 16C:
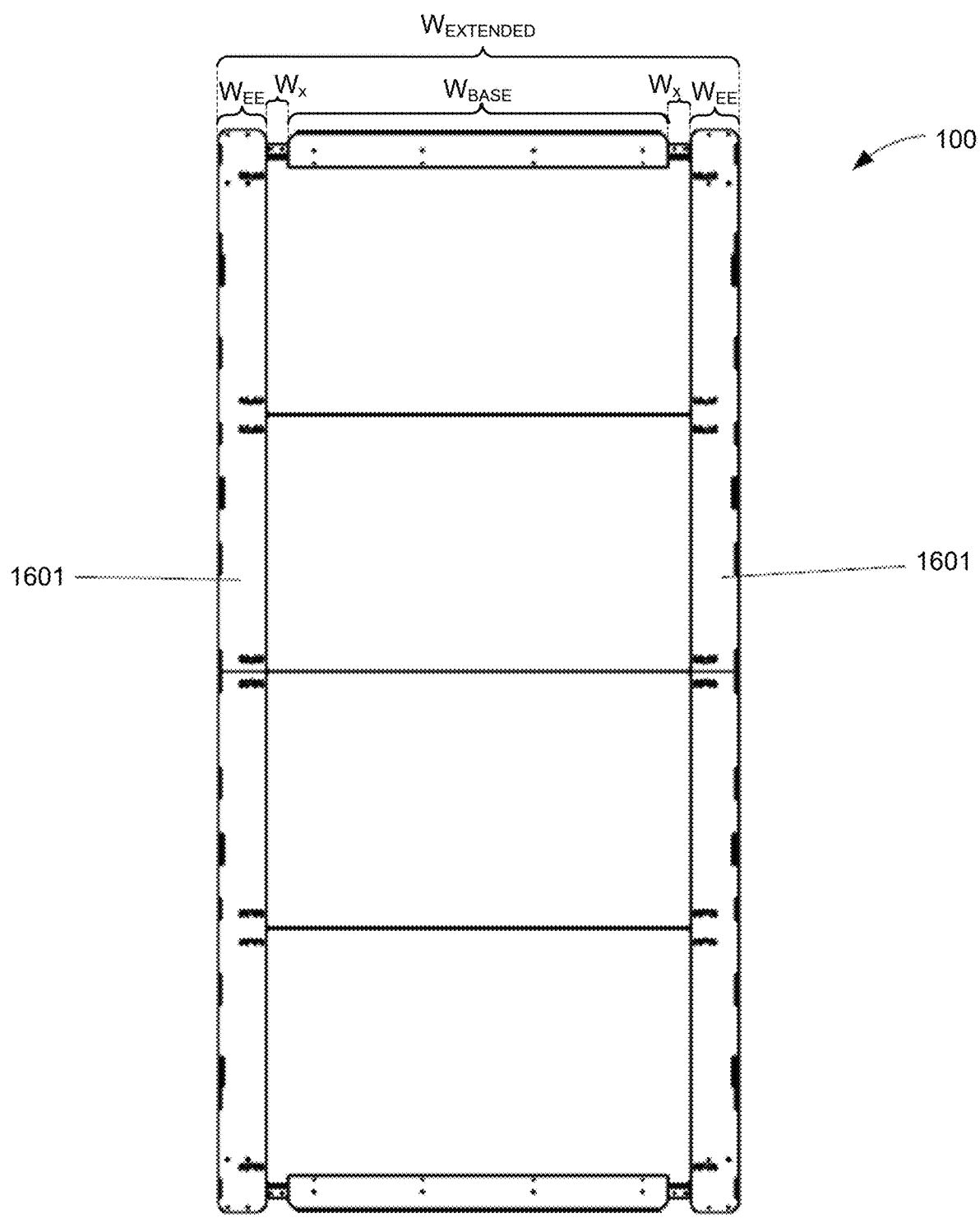
FIG. 16C illustrates a top view of edge extensions in an extended position, according to one embodiment of the present disclosure.

As shown in FIG. 16C, illustrated are edge extensions 1601 in an extended position on the automated platform 100. As a non-limiting example, and referring to FIGS. 16B and 16C for illustration, an unextended width $W_{UNEXTENDED}$ of the automated platform 100 can include a base width $W_{BASE}$ and two edge extension widths $W_{EE}$ (e.g., corresponding to two edge extensions 1601), whereas an extended width $W_{EXTENDED}$ of the automated platform 100 can include a base width $W_{BASE}$, the two edge extension widths $W_{EE}$, and two additional widths $W_x$ (e.g, by way of the edge extensions 1601 being moved outwardly in the extended position as compared to the retracted position). Accordingly, the automated platform 100 can have a larger width (e.g., $W_{EXTENDED}$) when the edge extensions 1601 are in the extended position than when the edge extensions 1601 are in the retracted position. In various embodiments the edge extensions 1601 may extend outwardly from the automated platform 100 by at least 1 inch, between approximately 1 inch and approximately 20 inches, between approximately 1 inch and approximately 4 inches, approximately 4 inches, between approximately 4 inches and approximately 10 inches, between approximately 10 inches and approximately 20 inches, and/or less than approximately 20 inches, as non-limiting examples. In one or more embodiments, the automated platform 100 may include an automated system that extends the edge extensions 1601 outwards to a specified length. For example, the edge extensions can be extended to varying widths by the automated system such that the automated platform 100 can be an appropriate width for the payload and have the appropriate clearance to fit through the necessary opening (e.g., a trailer door). In at least one embodiments, the edge extensions 1601 increase the total width of the automated platform 100 to measure at least approximately 80 inches, between approximately 80 inches and approximately 110 inches, between approximately 80 inches and approximately 100 inches, approximately 103 inches, between approximately 100 inches and approximately 110 inches, and/or less than approximately 110 inches, as non-limiting examples. For example, the edge extensions can increase the total width of the platform to measure approximately 99 inches. For example, the edge extensions can increase the total width to 90 inches.

As shown in FIG. 17, illustrated is exemplary computing architecture 1700. As will be understood, computing architecture 1700 can provide the computing functionality described herein. The exemplary computing architecture 1700 represents merely one approach or embodiment of the present system, and other aspects are used according to various embodiments of the present system.

In various embodiments, the control system 506 can be a computing device. The computing device can include any device capable of accessing a network including, but not limited to, a computer, smartphone, tablets, or other device. The computing device can include a processor and storage. The computing device can include a display on which various user interfaces can be rendered to allow users to configure, monitor, control, and command various functions of automated platform 100. In various embodiments, computing device can include multiple computing devices. Regardless, the computing device can include one or more processors and memory having instructions stored thereon that, when executed by the one or more processors, cause the computing device to perform one, some, or all of the actions, methods, steps, or functionalities provided herein. In various embodiments, the control system 506 be any device capable of accessing the mesh network, LTE, Bluetooth, or any other network communication system. In various embodiments, the control system 506 can be any computing device capable of accessing the network 1702.

The network 1702 can include, for example, the Internet, intranets, extranets, wide area networks (WANs), local area networks (LANs), wired networks, wireless networks, mesh networks, LTE, Bluetooth, any other suitable networks, or any combination of the foregoing.

The control system 506 can include computing environment 1704. The elements of the computing environment 1704 can be provided via one or more computing devices that may be arranged, for example, in one or more server banks or computer banks or other arrangements. Such computing devices can be located in a single installation or may be distributed among many different geographical locations. For example, the computing environment 1704 can include one or more computing devices that together may include a hosted computing resource, a grid computing resource, or any other distributed computing arrangement. In some cases, the computing environment 1704 can correspond to an elastic computing resource where the allotted capacity of processing, network, storage, or other computing-related resources may vary over time. Regardless, the computing environment 1704 can include one or more processors and memory having instructions stored thereon that, when executed by the one or more processors, cause the computing environment 1704 to perform one, some, or all of the actions, methods, steps, or functionalities provided herein.

The computing environment 1704 can include the fluid pressure control (e.g., hydraulic control and/or pneumatic control), the electrical control, and the movement control. Said another way, the computing environment 1704 can be responsible for controlling and communicating with the various control systems of the automated platform 100, including the fluid pressure control (e.g., hydraulic control and/or pneumatic control), the electrical control, and the movement control described herein.

The control system 506 can be in communication with sensors 1706, which can include any sensors on the automated platform including environmental sensors, current sensors, voltage sensors, hydraulic pressure sensors (for measuring the payload weight), IoT components, obstacle detection sensors, range sensors, 2D or 3D light detection and ranging (LiDAR) sensors, ultrasonic ranging sensors, monocular cameras, three-dimensional (3D) cameras, infrared (IR) sensors, a humidity sensor, a microphone, a gas detection sensor or system, and any other applicable sensors. The control system 506 can communicate with the computing device 1712 via the network 1702. The computing device 1712 can be any computing device capable of communicating with the automated platform 100. In various embodiments, a user controlling the automated platform 100 can communicate with the automated platform 100 via the computing device 1712.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. An automated platform comprising:
an omnidirectional wheel;
a lifting leg assembly comprising a leg configured to move between a retracted position and an extended position; and
a pressurized fluid assembly comprising a bag configured to be filled with, and emptied of, a working fluid, wherein the pressurized fluid assembly is configured to:
selectively fill the bag with at least some of the working fluid to thereby move the leg toward the extended position such that the leg is in contact with a surface underlying the automated platform and the leg lifts the omnidirectional wheel off the surface; and
selectively remove the at least some of the working fluid from the bag to thereby move the leg toward the retracted position, wherein a side profile of the leg is fully contained with an outer edge of a side profile of the omnidirectional wheel when the leg is in the retracted position.

2. The automated platform of claim 1, wherein the pressurized fluid assembly is in communication with a processor configured to control a flow of the working fluid between a tank and the bag.

3. The automated platform of claim 2, wherein the pressurized fluid assembly further comprises:

a compressor configured to pressurize the working fluid, wherein the compressor is in fluid communication with to the tank;

a valve configured to control the flow of the working fluid to the bag, wherein the valve is coupled to the bag via a working fluid line; and an emergency release valve configured to selectively empty the bag of the working fluid.

4. The automated platform of claim 3, wherein:

the omnidirectional wheel is one of a plurality of omnidirectional wheels;

the lifting leg assembly is one of a plurality of lifting leg assemblies, each lifting leg assembly corresponding to at least one of the plurality of omnidirectional wheels;

the bag is one of a plurality of bags, each bag corresponding to a particular one of the plurality of lifting leg assemblies;

the valve is one of a plurality of valves, each valve corresponding to a particular one of the plurality of bags; and each valve is located between (i) the compressor and the tank and (ii) the particular one of the plurality of bags such that the plurality of valves are configured to separately and independently control each bag of the plurality of bags.

5. The automated platform of claim 1, further comprising a chassis connected to the omnidirectional wheel and in mechanical communication with the leg via at least a pivot point and one or more springs.

6. The automated platform of claim 5, wherein the one or more springs are configured to assist in retracting the leg in response to the bag being emptied of the working fluid.

7. The automated platform of claim 1, wherein the leg comprises a rubber foot with a Shore A hardness of approximately 40 A to approximately 100 A.

8. An automated platform comprising:

a chassis having a front edge, a rear edge, and a top surface;

a processor configured to control movement of the automated platform;

two front omnidirectional wheels coupled to the chassis in proximity to the front edge, the two front omnidirectional wheels being located at a first distance from the front edge of the chassis; and two rear omnidirectional wheels coupled to the chassis in proximity to the rear edge, the two rear omnidirectional wheels having a second distance from the front edge of the chasses, the second distance different from the first distance;

wherein a first guide line is a first imaginary line intersecting (i) a lowermost portion of the automated platform within a portion of the automated platform located between the front edge and a frontmost portion of the two front omnidirectional wheels and (ii) a lowermost portion of the two front omnidirectional wheels;

wherein a second guide line is a second imaginary line intersecting (i) the lowermost portion of the two front omnidirectional wheels and (ii) a lowermost portion of the automated platform positioned between the two front omnidirectional wheels and a middle location positioned at half the distance between the two front omnidirectional wheels and the two rear omnidirectional wheels;

wherein a third guide line is a third imaginary line intersecting (i) the middle location and (ii) a lowermost portion of the two rear omnidirectional wheels;

wherein the automated platform has an approach angle of less than approximately 9 degrees, the approach angle being defined as an angle formed at an intersection between the first guide line and a ground line tangential to the lowermost portion of the two front omnidirectional wheels; and wherein the automated platform has a breakover angle less than approximately 9 degrees, the breakover angle being defined as an angle formed at an intersection between the second guide line and the third guide line.

9. The automated platform of claim 8, further comprising one or more sensors configured to detect obstacles in a path of the automated platform.

10. The automated platform of claim 9, wherein the processor is configured to:

receive sensor data from the one or more sensors, the sensor data indicative of the detected obstacles; and calculate an updated path based at least in part on the sensor data.

11. The automated platform of claim 8, further comprising one or more edge extensions configured to expand the top surface of the chassis to allow ten standard pallets to fit on the top surface, each standard pallet having a base measuring 40 inches by 48 inches.

12. The automated platform of claim 11, wherein the one or more edge extensions comprise a material with a coefficient of friction between 0.29 and 1, the coefficient of friction being between the material and a packaging material.

13. The automated platform of claim 8, further comprising one or more weight sensors configured to detect a payload weight of objects loaded onto the automated platform.

14. The automated platform of claim 8, wherein a first width between the two front omnidirectional wheels and a second width between the two rear omnidirectional wheels are each 6 feet or less.

15. The automated platform of claim 8, wherein the automated platform can travel onto a sloped surface having a slope of 9 degrees or less.

16. The automated platform of claim 8, wherein the approach angle is at least 2 degrees.

17. The automated platform of claim 8, wherein the breakover angle is at least 2 degrees.

18. An automated platform, comprising:

a chassis having a front edge, a rear edge, and a top surface;

a controller configured to control movement of the automated platform; and one or more edge extensions disposed along an edge of the top surface, wherein:

each of the one or more edge extensions being configured to selectively move between a retracted position and an extended position, wherein the automated platform has a first width when the one or more edge extensions are in the retracted position and the automated platform has a second width when the one or more edge extensions are in the extended position, the second width being greater than the first width, and each of the one or more edge extensions includes a chamfer at a front outer corner of the corresponding edge extension, wherein each of the one or more edge extensions includes a lip extending upwardly and being configured to prevent an object from overhanging the automated platform.

19. An automated platform, comprising:
a chassis having a front edge, a rear edge, and a top surface;
a controller configured to control movement of the automated platform; and
one or more edge extensions disposed along an edge of the top surface,
wherein:
   each of the one or more edge extensions being configured to selectively move between a retracted position and an extended position, wherein the automated platform has a first width when the one or more edge extensions are in the retracted position and the automated platform has a second width when the one or more edge extensions are in the extended position, the second width being greater than the first width, and
   each of the one or more edge extensions includes a chamfer at a front outer corner of the corresponding edge extension, wherein the controller is configured to:
receive data indicative of one or more dimensions of an object to be loaded onto the automated platform; and
output instructions for the one or more edge extensions to move to a new position to accommodate the one or more dimensions of the object.

20. The automated platform of claim 19, further comprising one or more sensors configured to detect obstacles in a path of the automated platform.

* * * * *